(12) United States Patent
Takeda et al.

(10) Patent No.: US 6,381,381 B1
(45) Date of Patent: Apr. 30, 2002

(54) OPTICAL SWITCHING DEVICE AND IMAGE DISPLAY DEVICE

(75) Inventors: Takashi Takeda, Suwa; Masatoshi Yonekubo, Hara-mura; Hirokazu Ito, Okaya; Shunji Kamijima, Hara-mura, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/381,495

(22) PCT Filed: Nov. 27, 1998

(86) PCT No.: PCT/JP98/05366

§ 371 Date: Nov. 23, 1999

§ 102(e) Date: Nov. 23, 1999

(87) PCT Pub. No.: WO99/36824

PCT Pub. Date: Jul. 22, 1999

(30) Foreign Application Priority Data

| Jan. 20, 1998 | (JP) | 10-009148 |
| May 13, 1998 | (JP) | 10-130776 |
| Aug. 28, 1998 | (JP) | 10-243834 |

(51) Int. Cl.[7] .................................. G02B 6/26
(52) U.S. Cl. ......................... 385/16; 385/40; 359/222
(58) Field of Search ....................... 385/16–19, 30, 385/40, 41; 359/222, 223, 224

(56) References Cited

U.S. PATENT DOCUMENTS

| 4,113,360 A | | 9/1978 | Baur et al. |
| 4,954,789 A | | 9/1990 | Sampsell |
| 5,636,072 A | * | 6/1997 | Shibata et al. ............... 359/896 |
| 5,771,321 A | * | 6/1998 | Stern ............................ 385/31 |
| 5,774,257 A | * | 6/1998 | Shibata et al. ............... 359/291 |
| 6,028,978 A | * | 2/2000 | Takeuchi et al. ............. 385/147 |

FOREIGN PATENT DOCUMENTS

| EP | 0 675 477 | 10/1995 |
| EP | 0 818 700 | 1/1998 |
| EP | 0 927 984 | 7/1999 |
| JP | 2-254405 | 10/1990 |
| JP | 3-209208 | 9/1991 |
| JP | 7-287176 | 10/1995 |
| JP | 10-78549 | 3/1998 |

* cited by examiner

Primary Examiner—Hemang Sanghavi
Assistant Examiner—Omar Rojas, Jr.

(57) ABSTRACT

An optical switching device comprises: a light guide including a total reflection plane capable of totally reflecting light thereby transmitting the light; a switching part capable of, at a position where its extraction plane is in close contact with the total reflection plane, capturing evanescent light and reflecting the captured light thereby outputting it; and a driving part for driving the optical switching part. The light guide, the switching part, and the driving part are laminated in this order into a multilayer structure. The employment of the multilayer structure makes it possible to optimize the respective layers independently of one another. The extracted light does not pass through the driving part. This allows the driving part to be optimized so as to achieve an optical switching device capable of operating at a high speed with low power consumption. Thus, it is possible to provide a low-loss and high-contrast optical switching device using an evanescent wave, which can respond at a high speed.

40 Claims, 29 Drawing Sheets

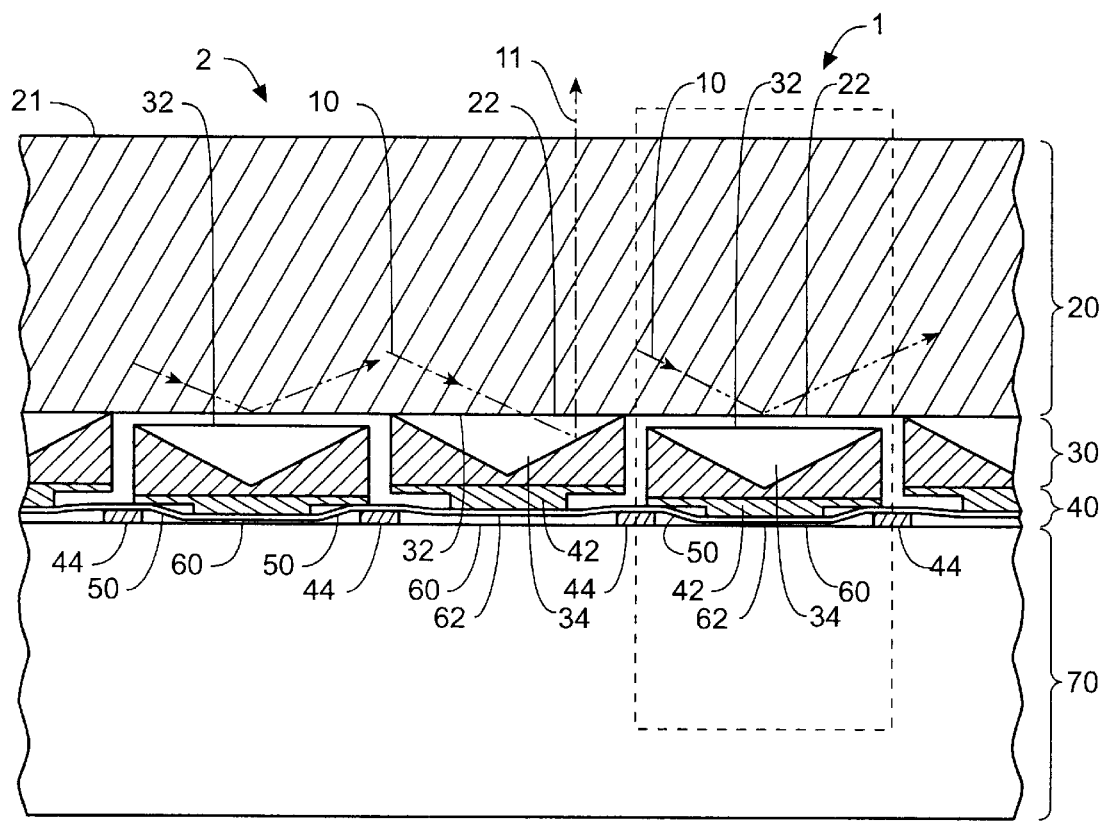
FIG._1
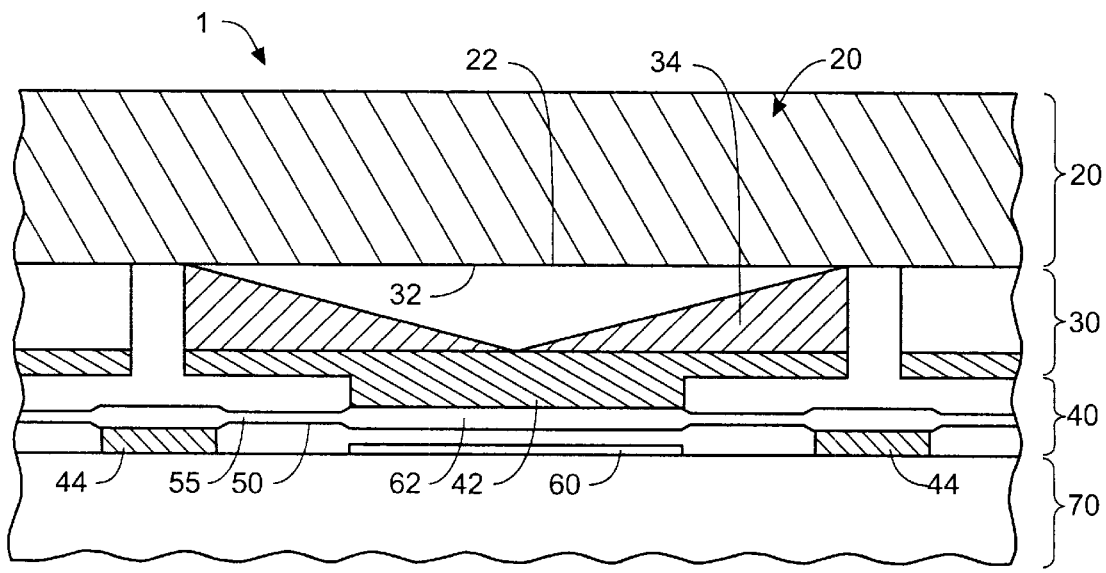
FIG._7

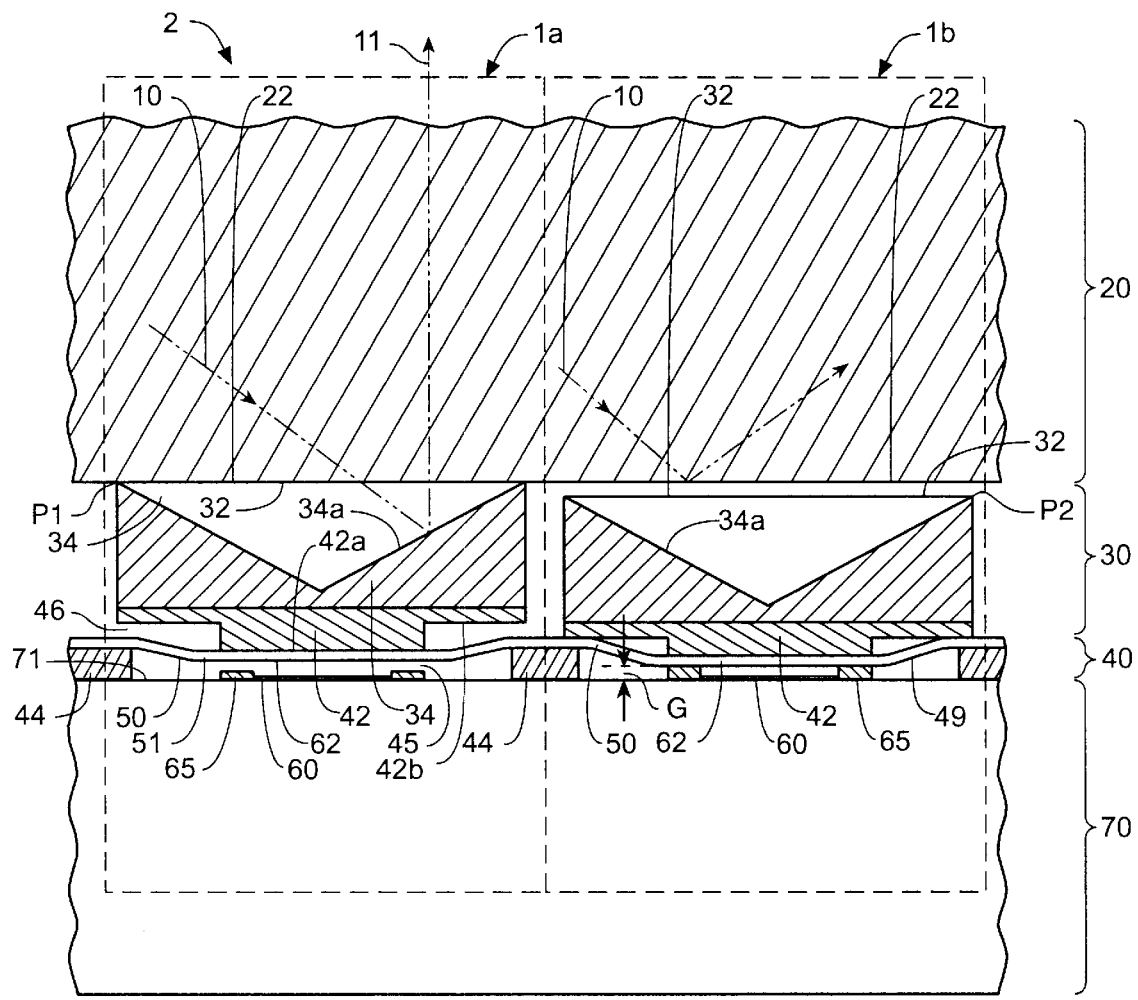
FIG._2

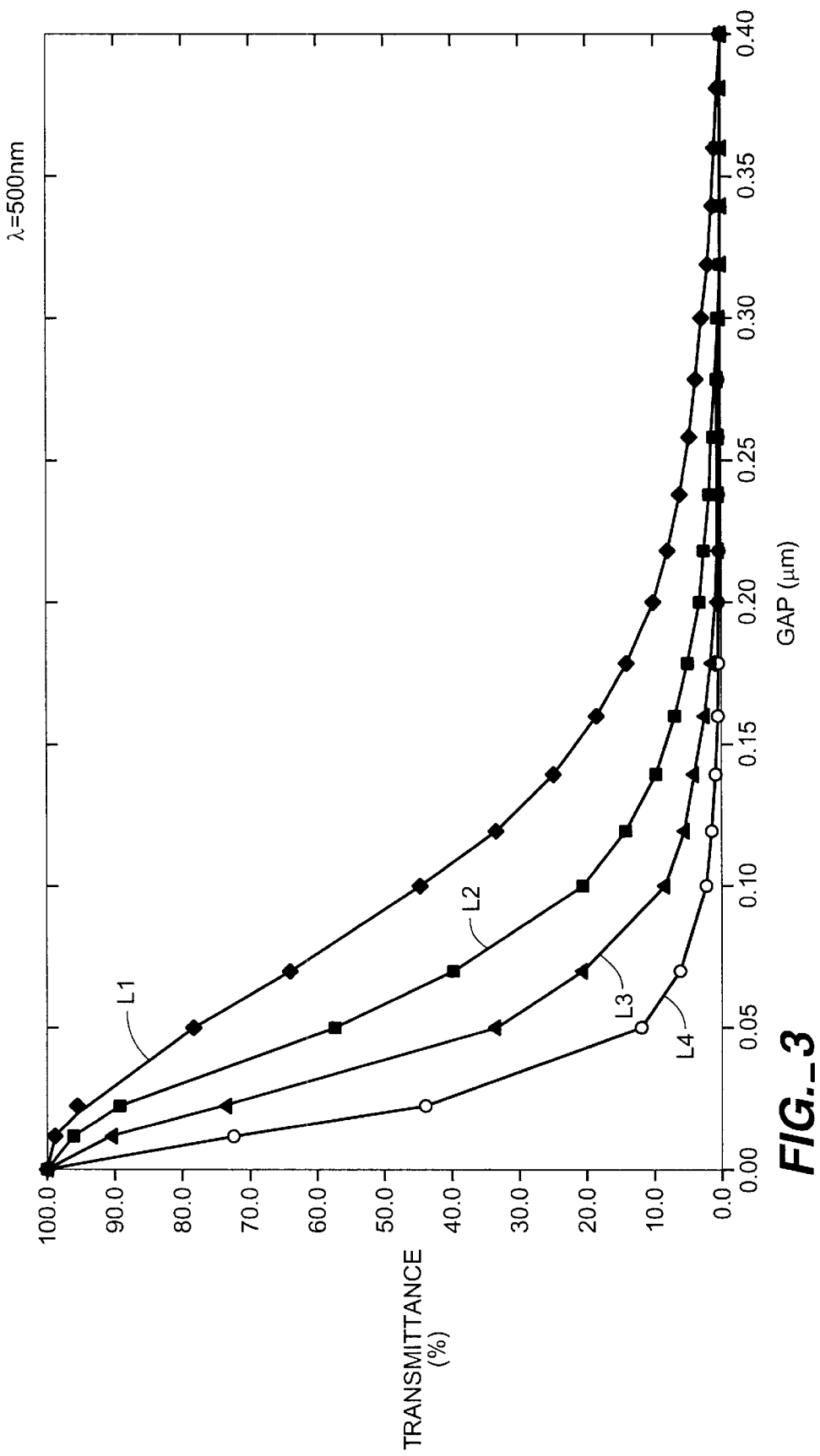
FIG._3

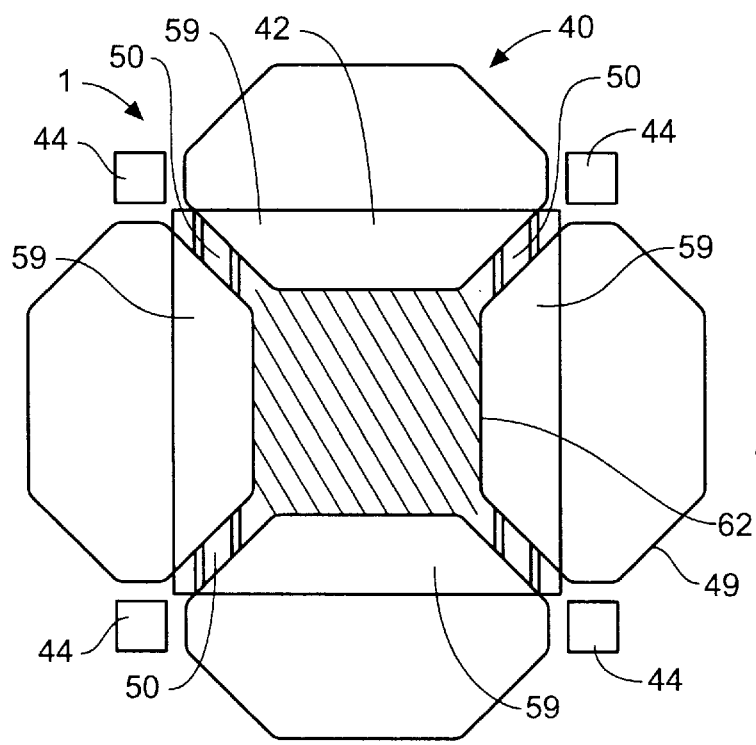
FIG._4
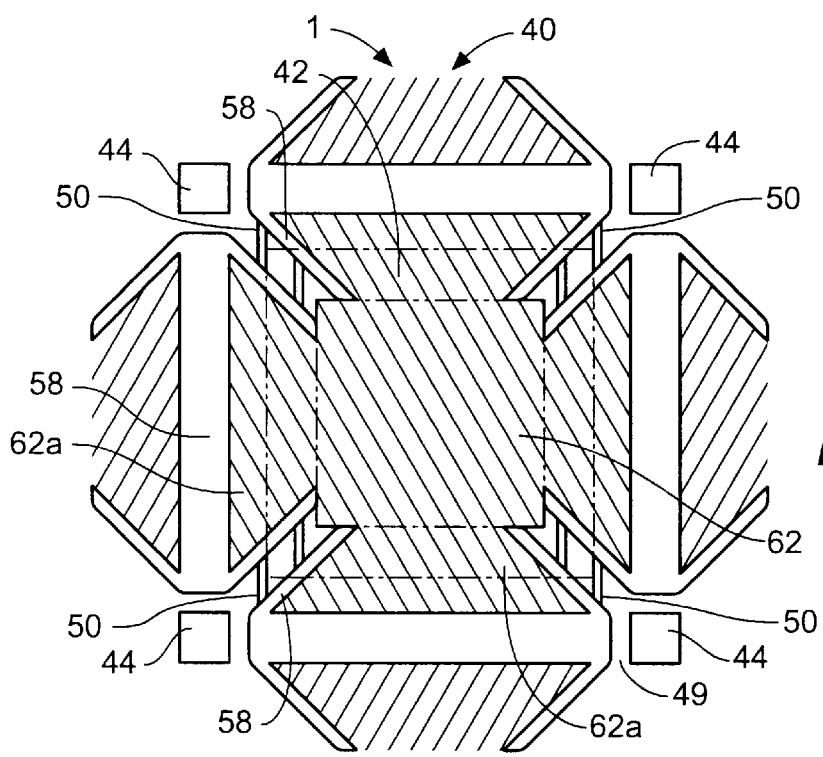
FIG._5

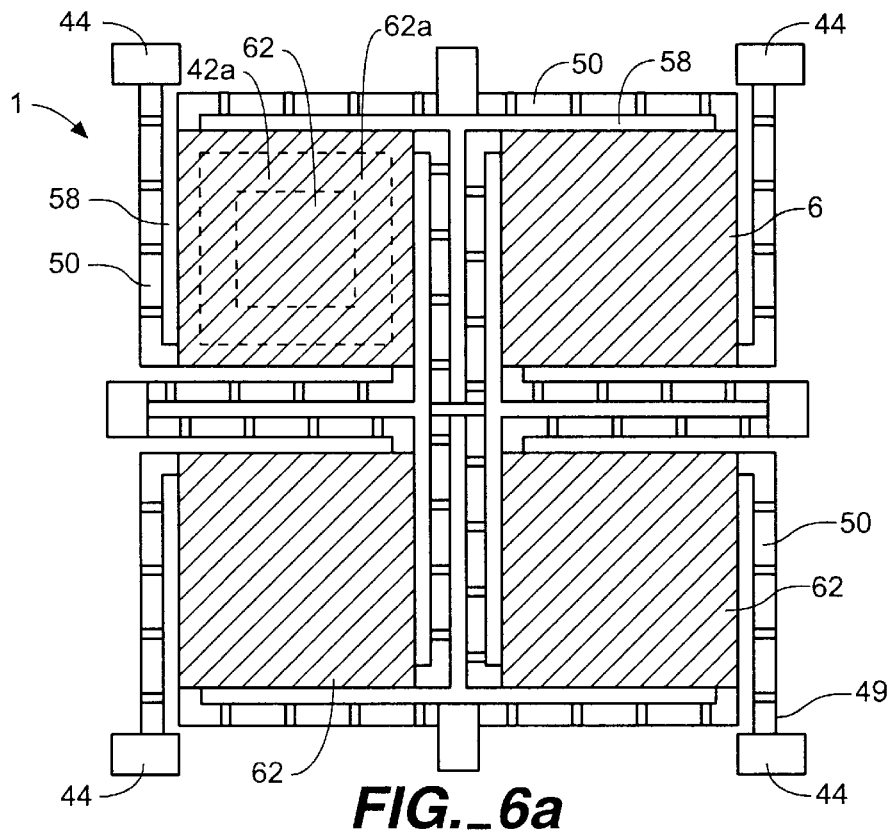
*FIG._6a*
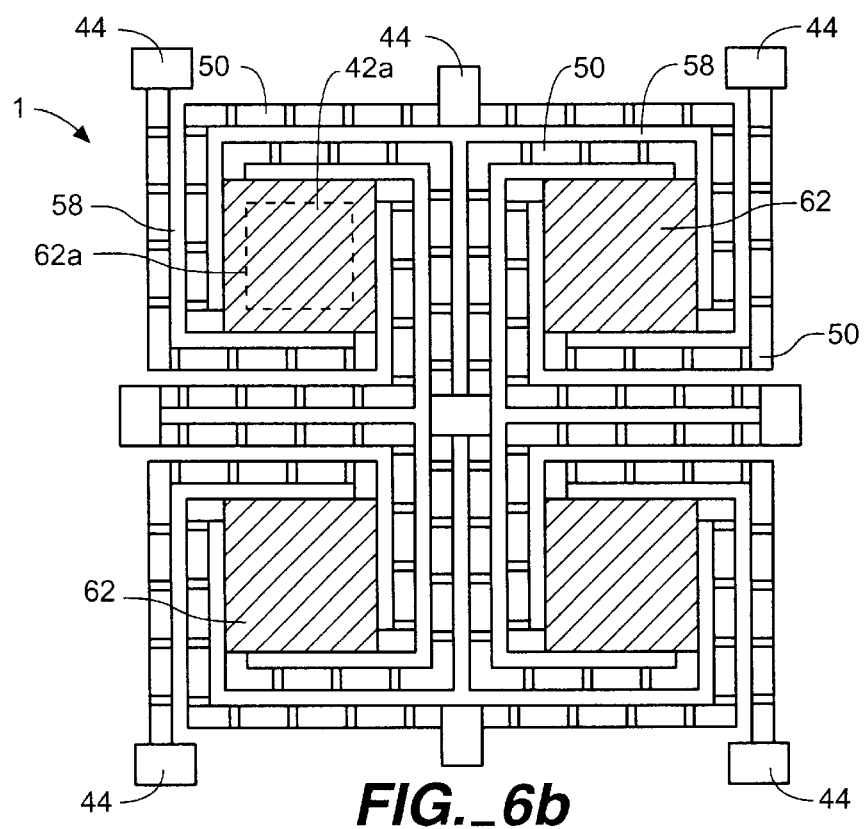
*FIG._6b*

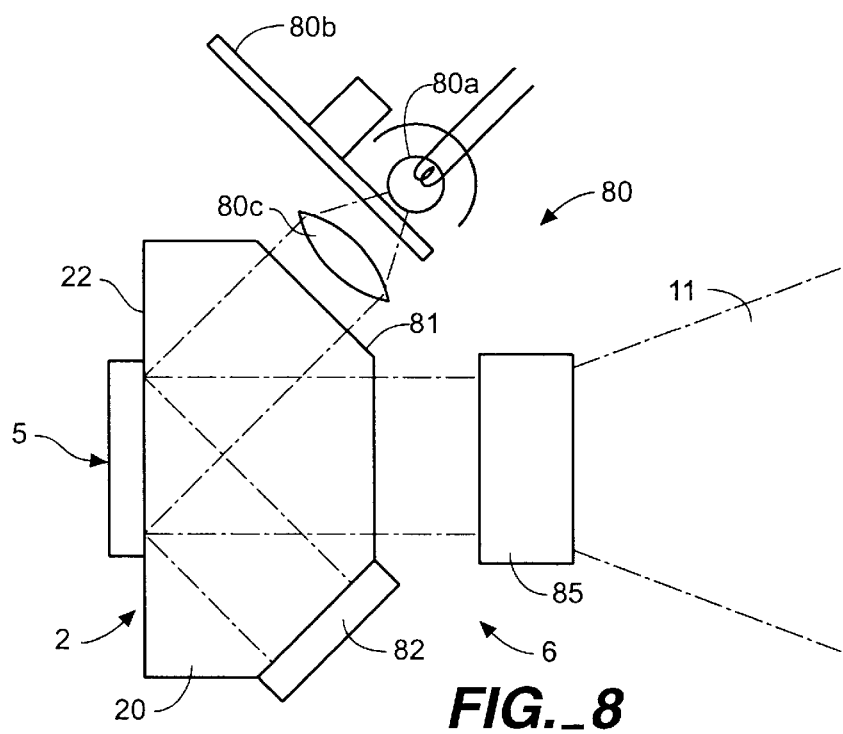
FIG._8
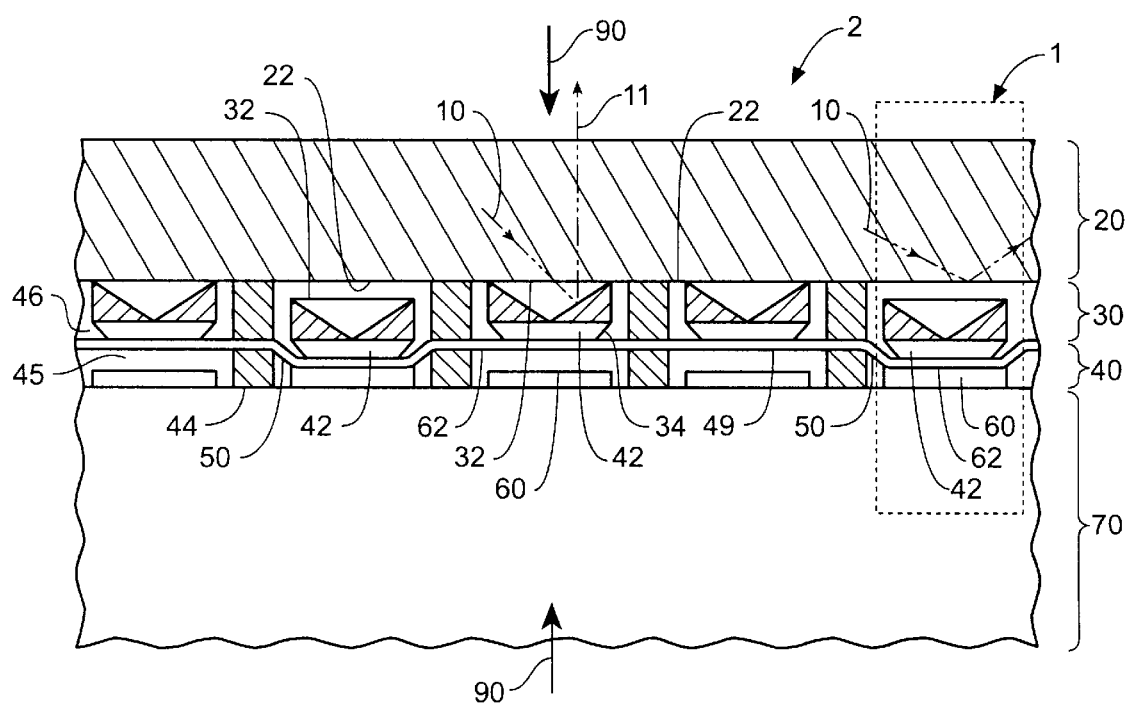
FIG._9

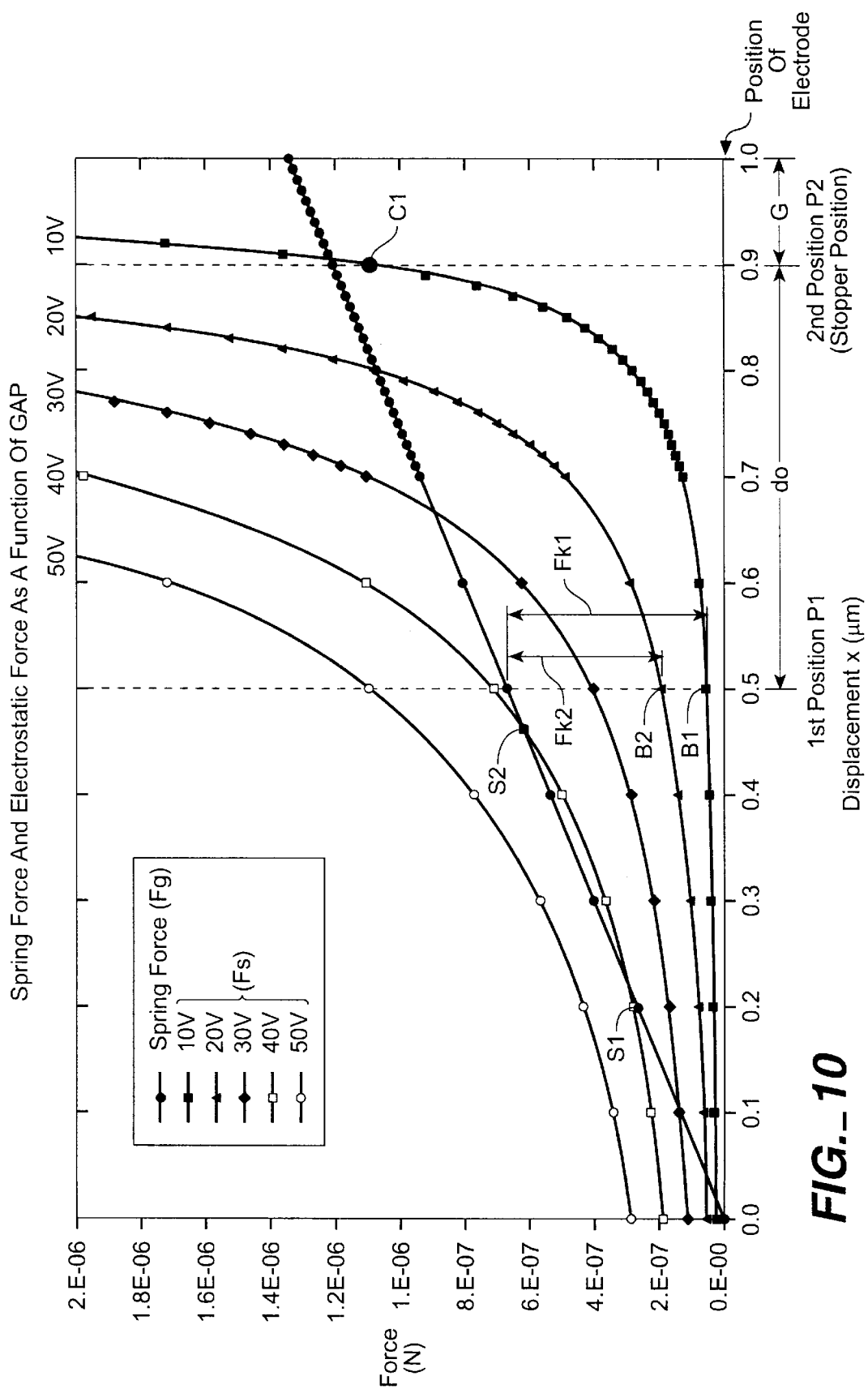
FIG._10

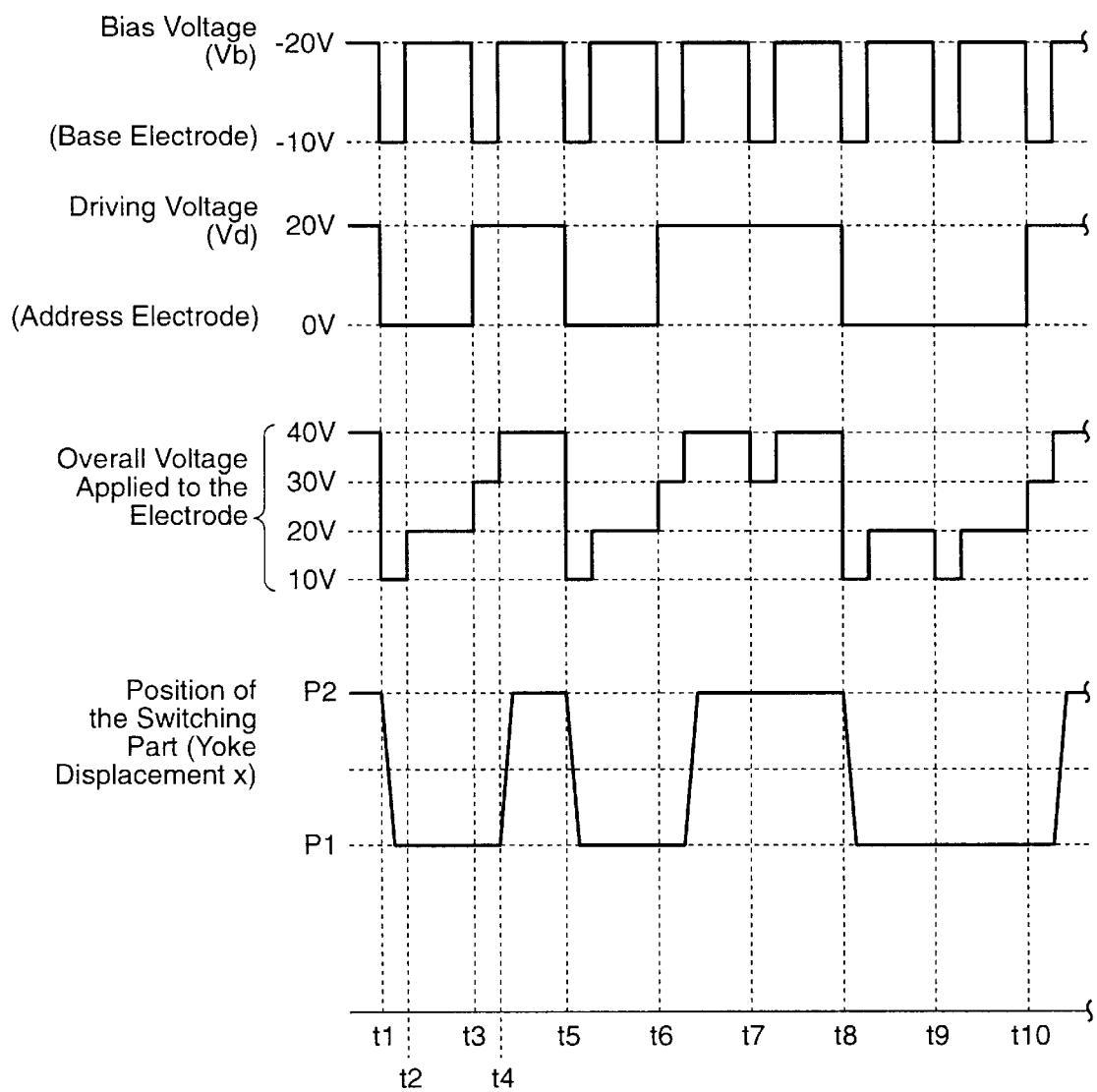
FIG._11

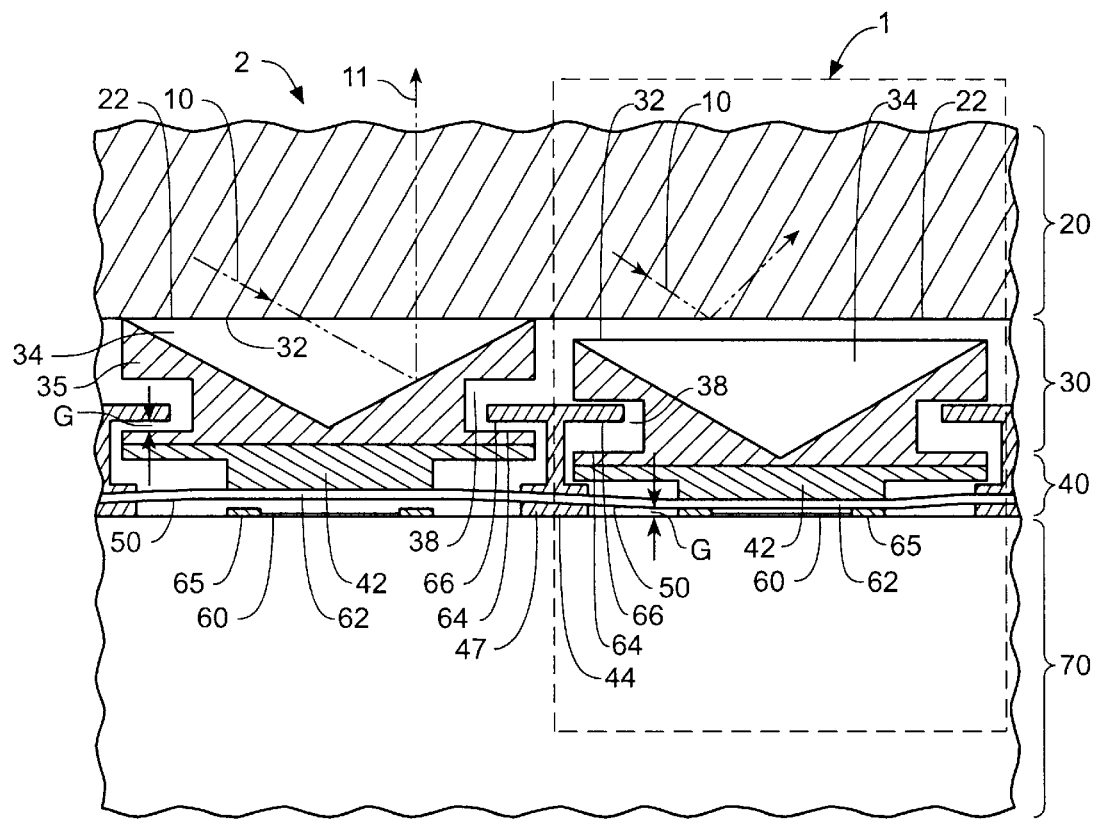
FIG._12
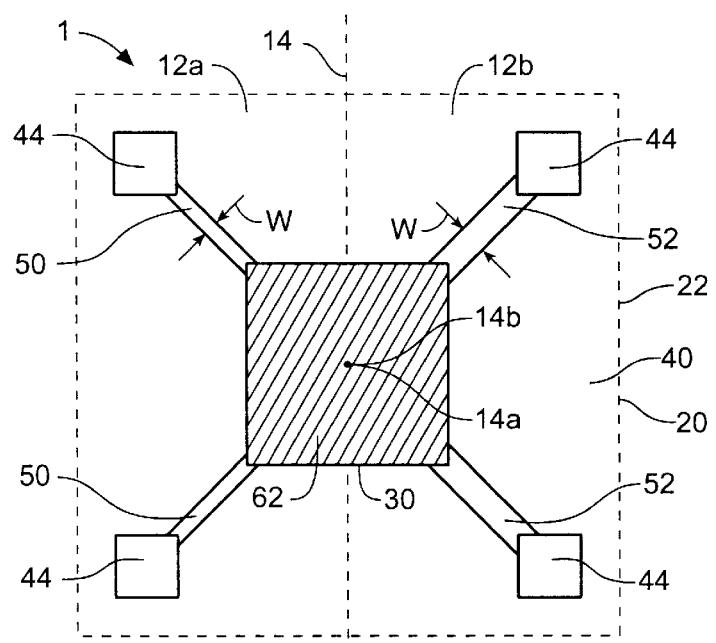
FIG._17

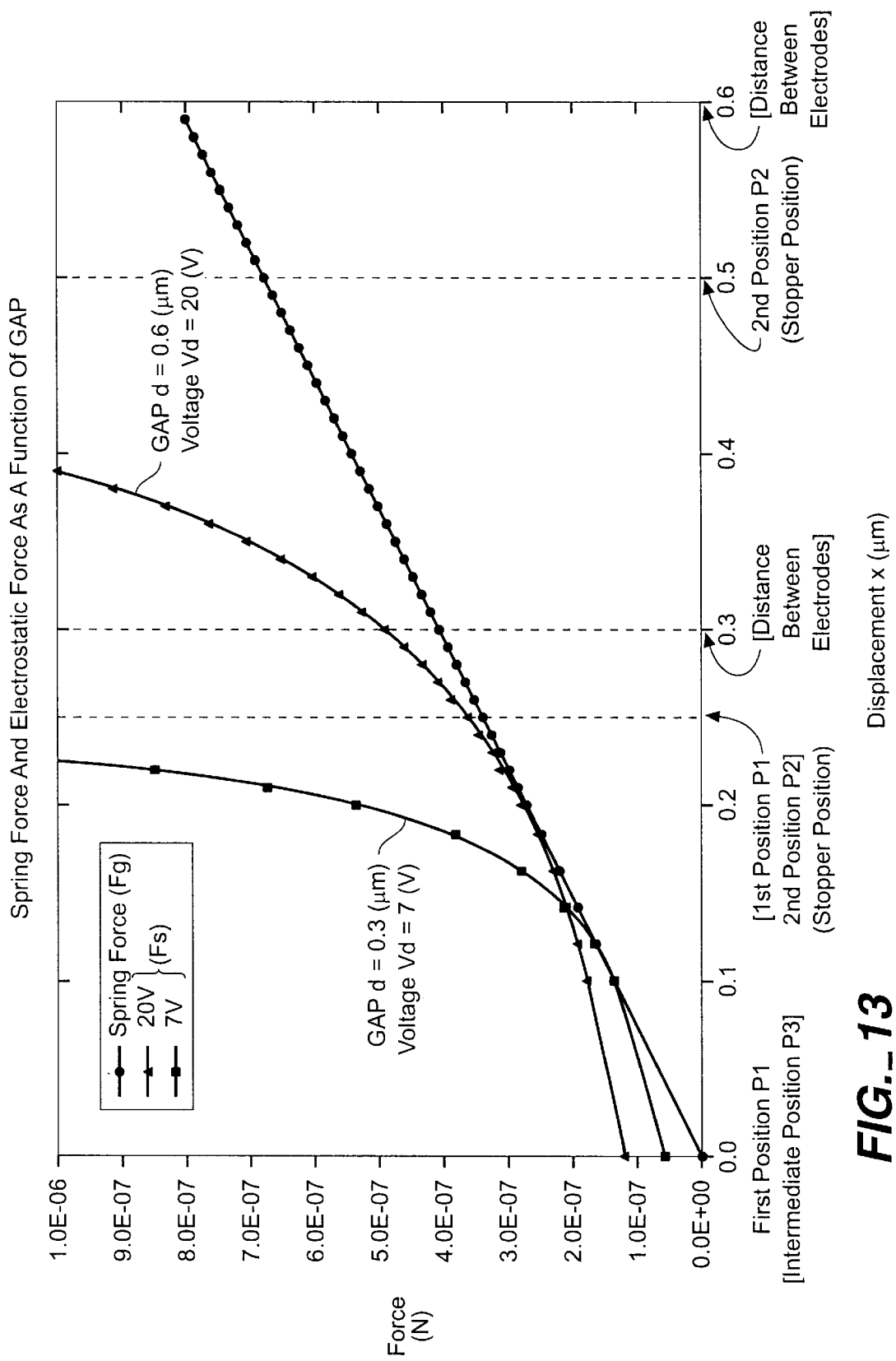
FIG._13

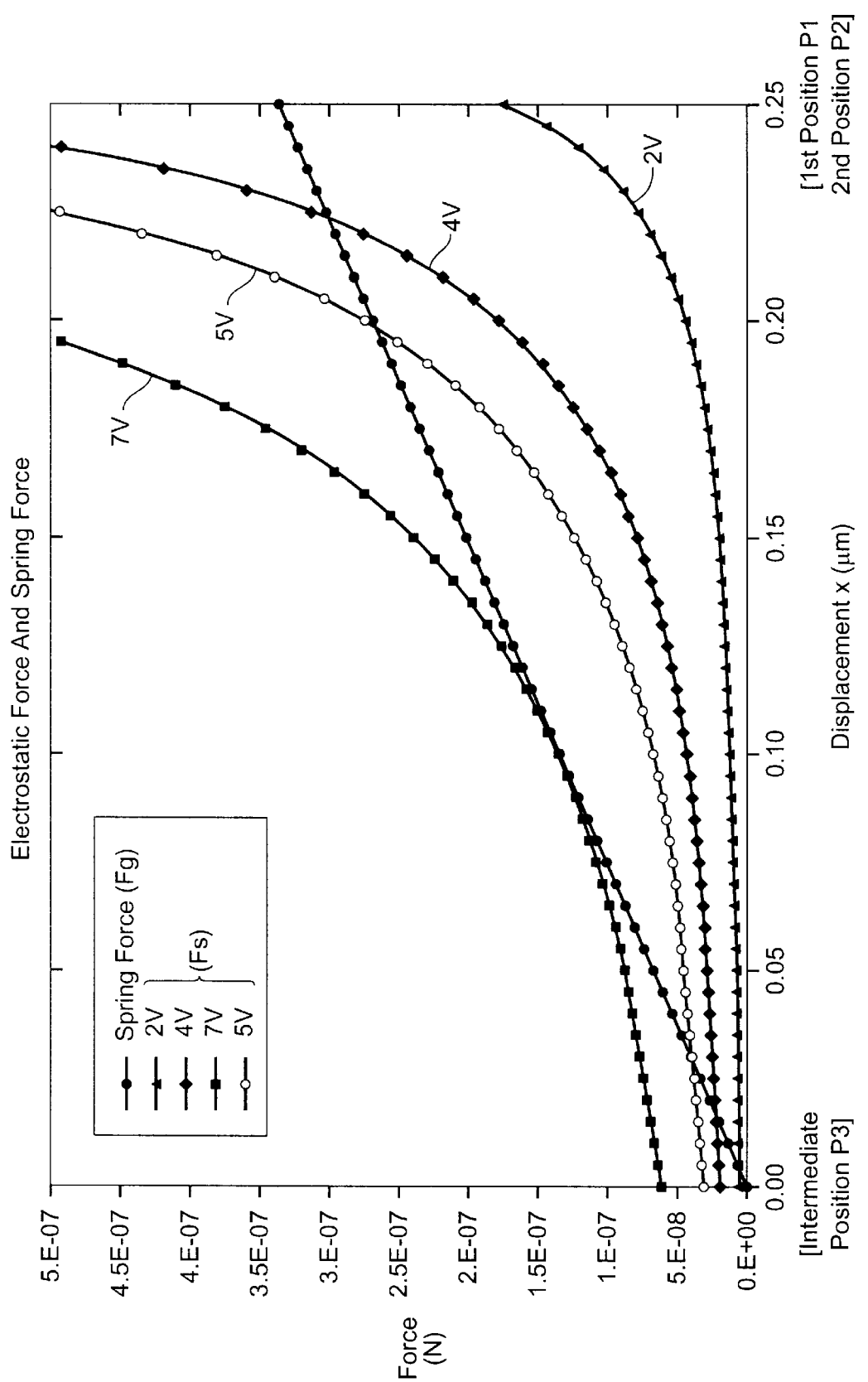
FIG._14

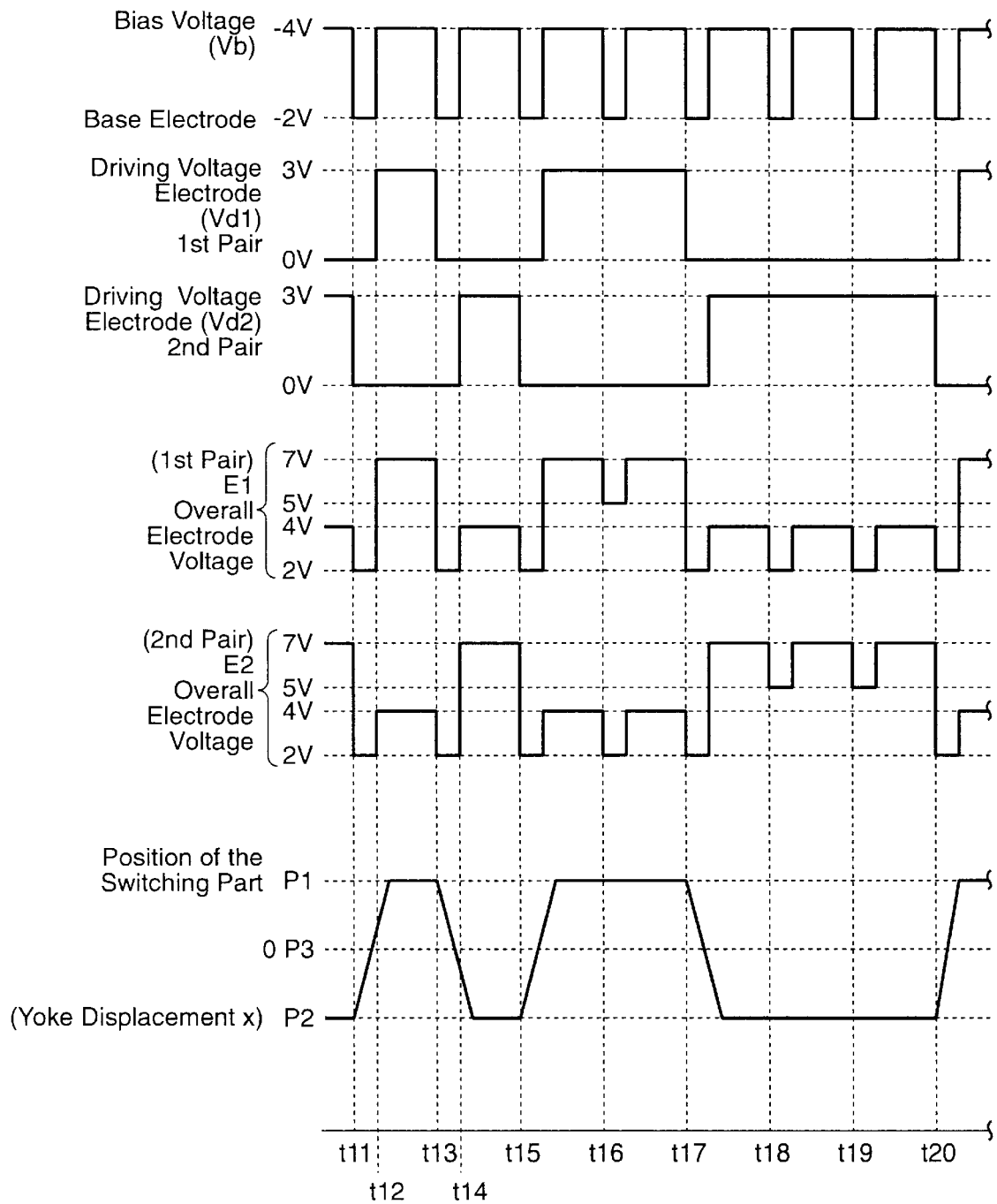
FIG._15

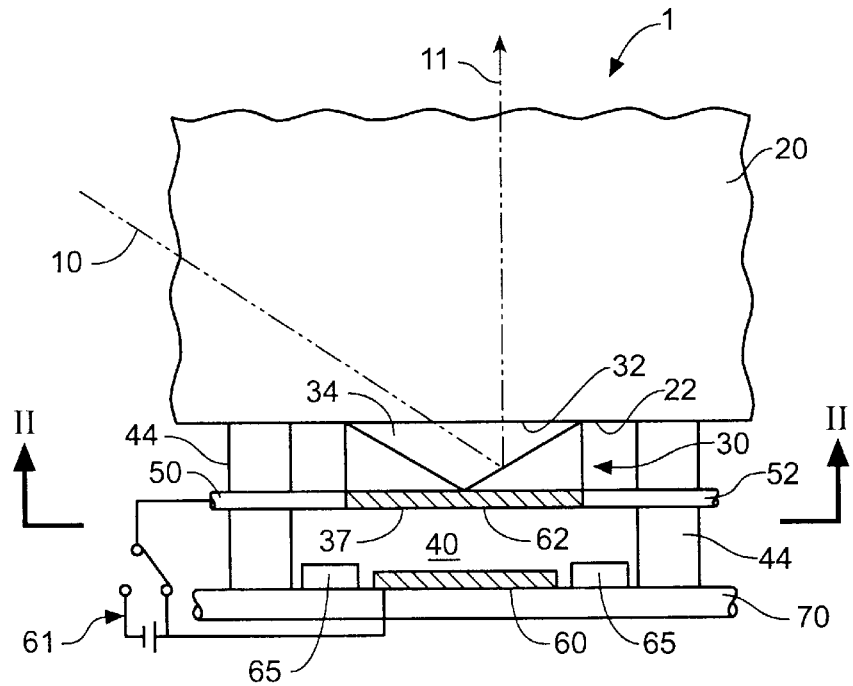
FIG._16a
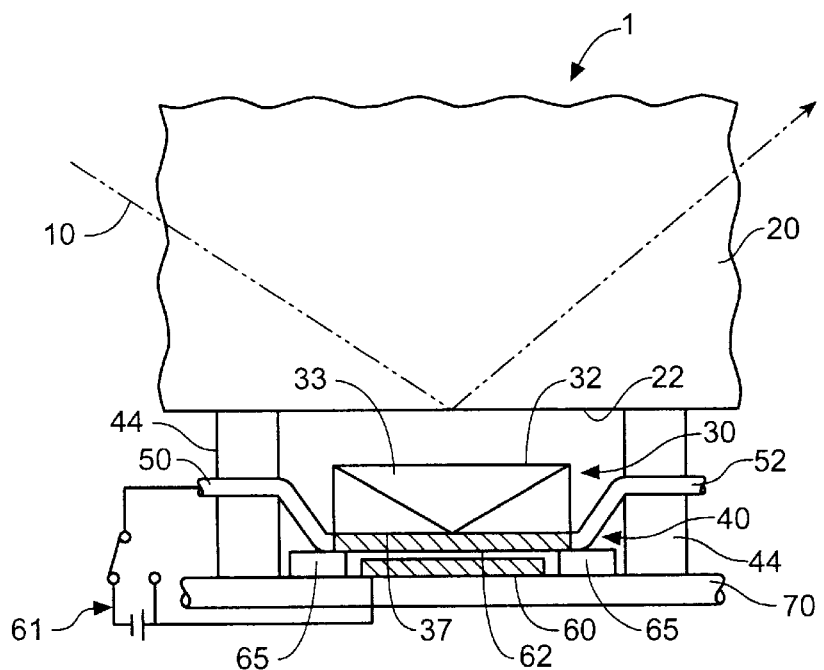
FIG._16b

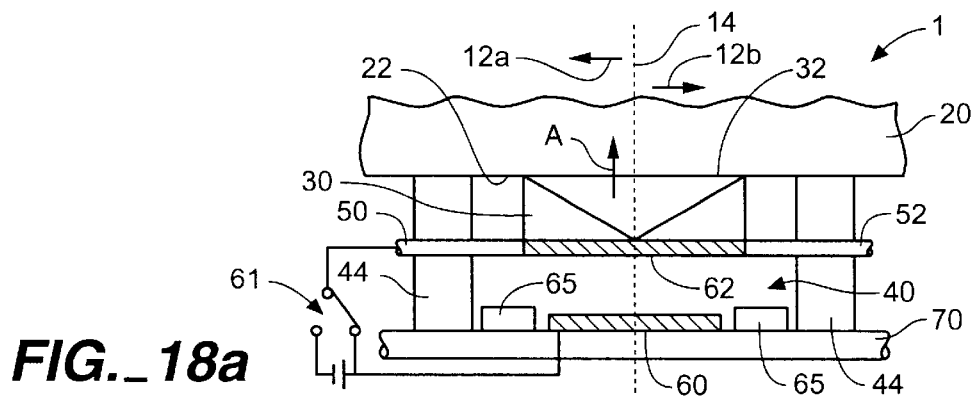
*FIG._18a*
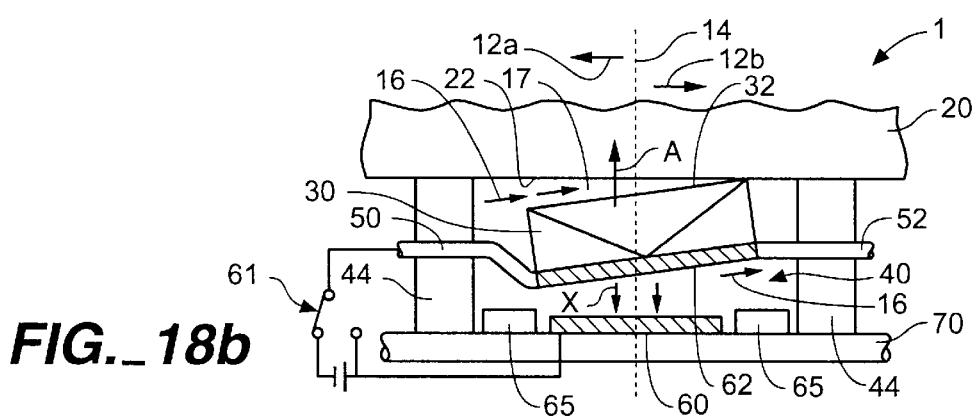
*FIG._18b*
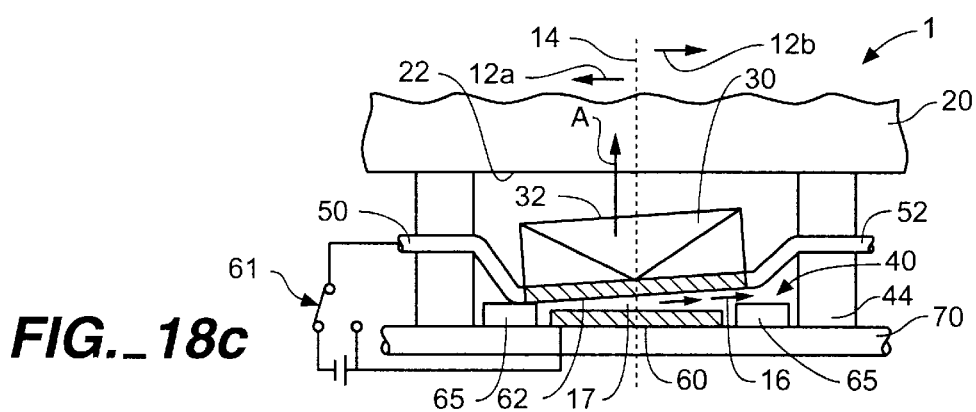
*FIG._18c*
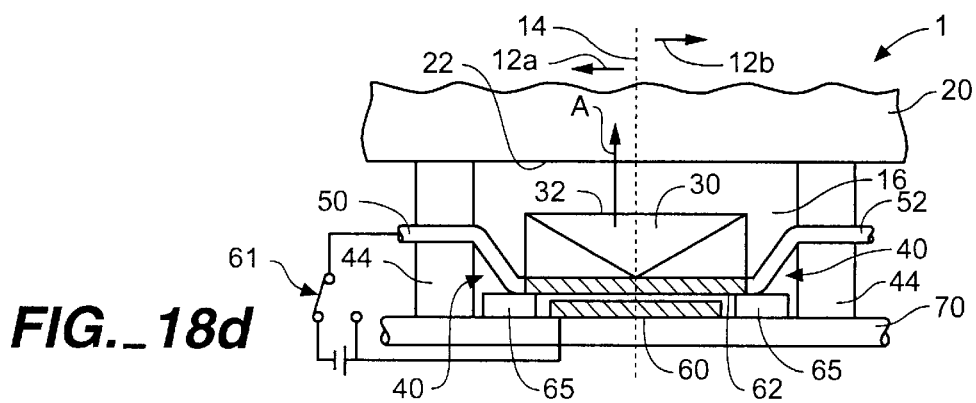
*FIG._18d*

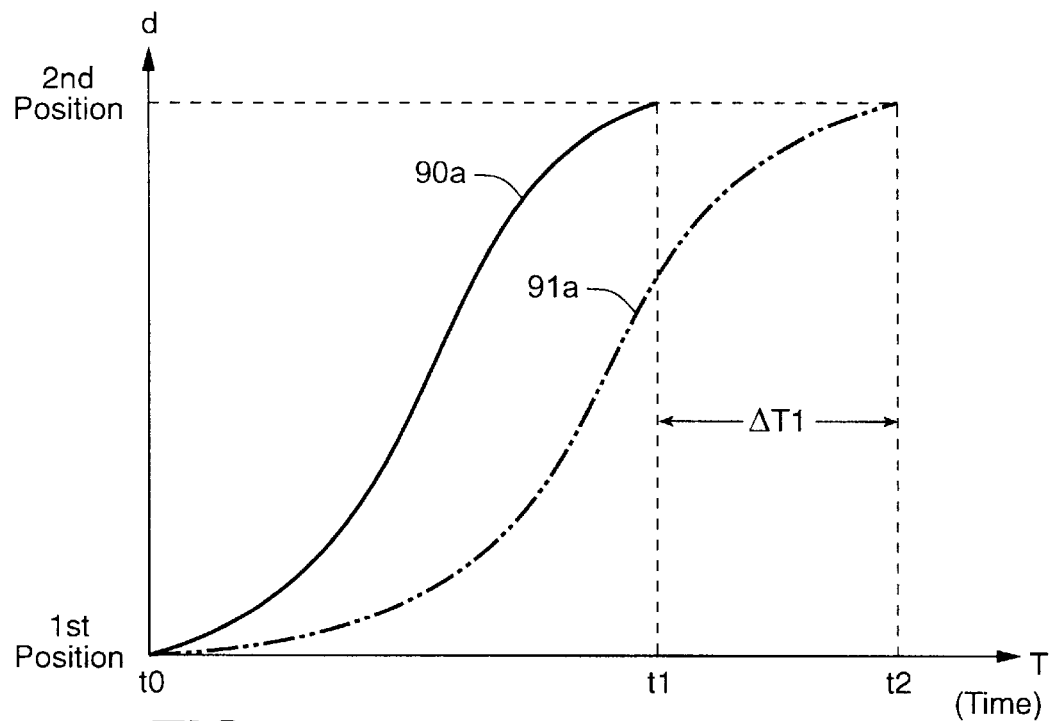
FIG._19a
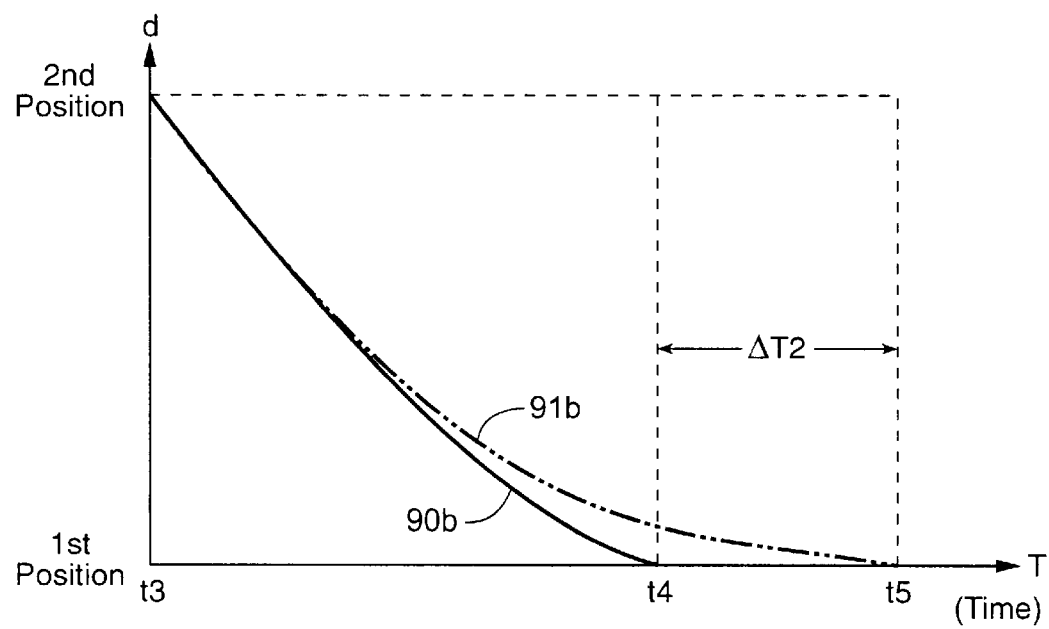
FIG._19b

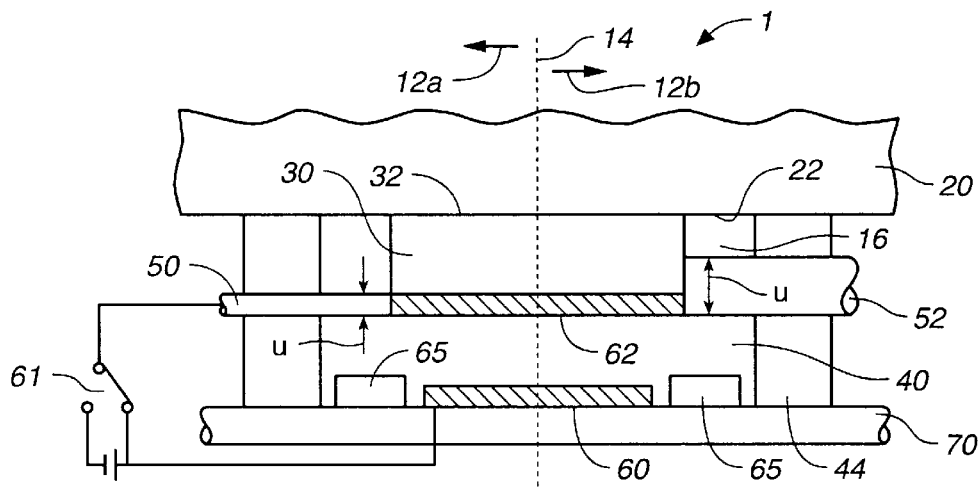
FIG._20
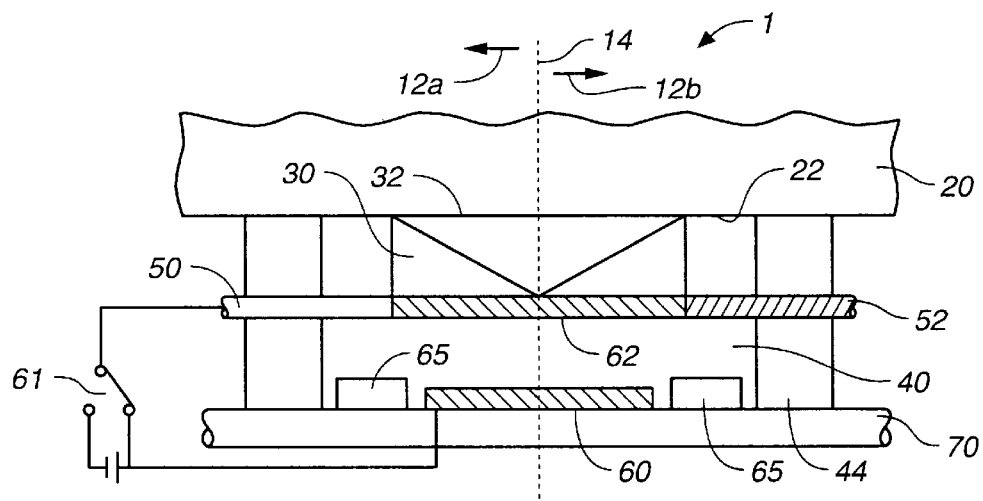
FIG._21
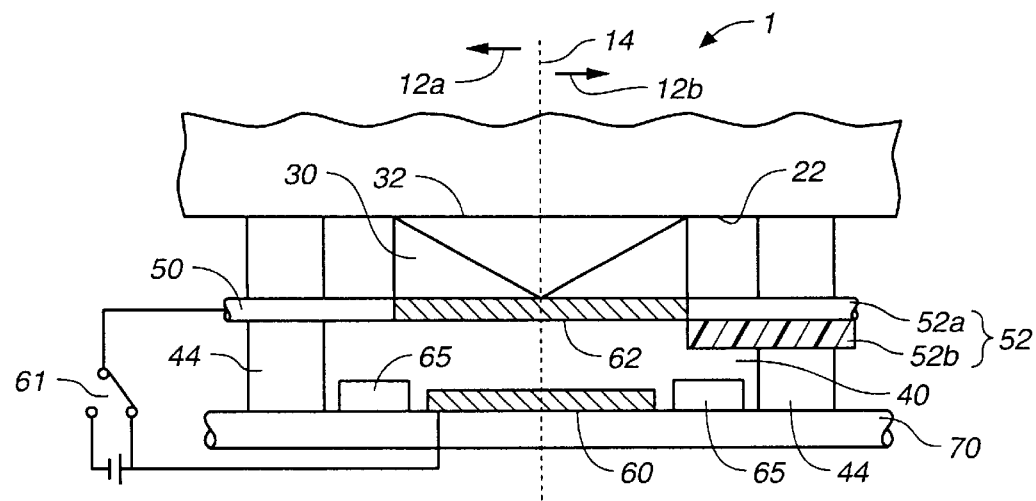
FIG._22

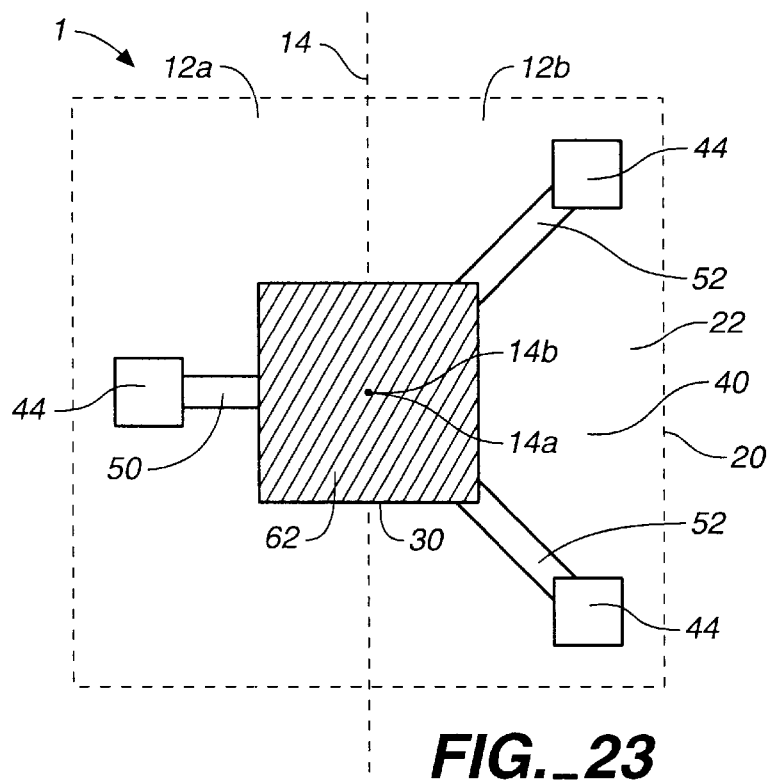
FIG._23
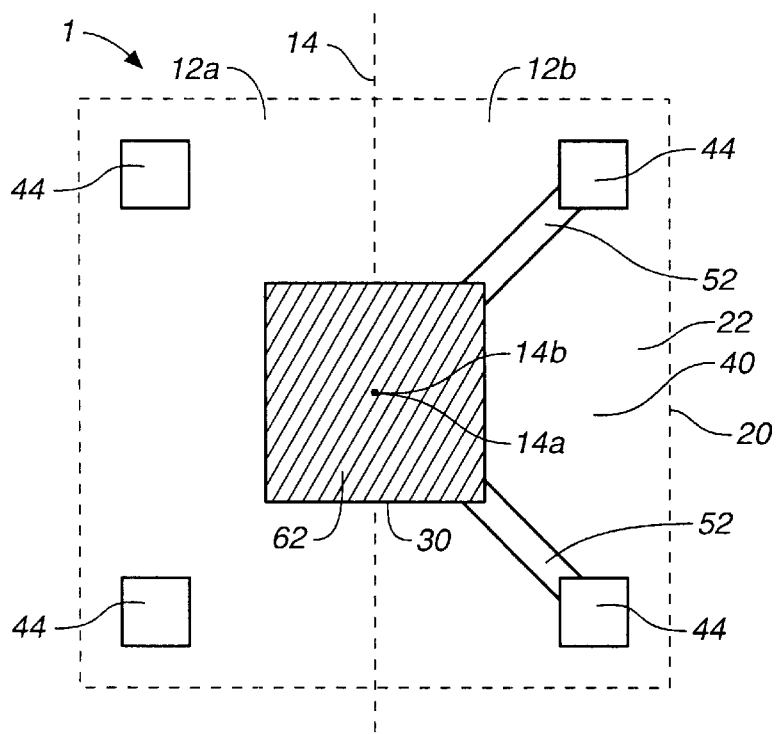
FIG._24

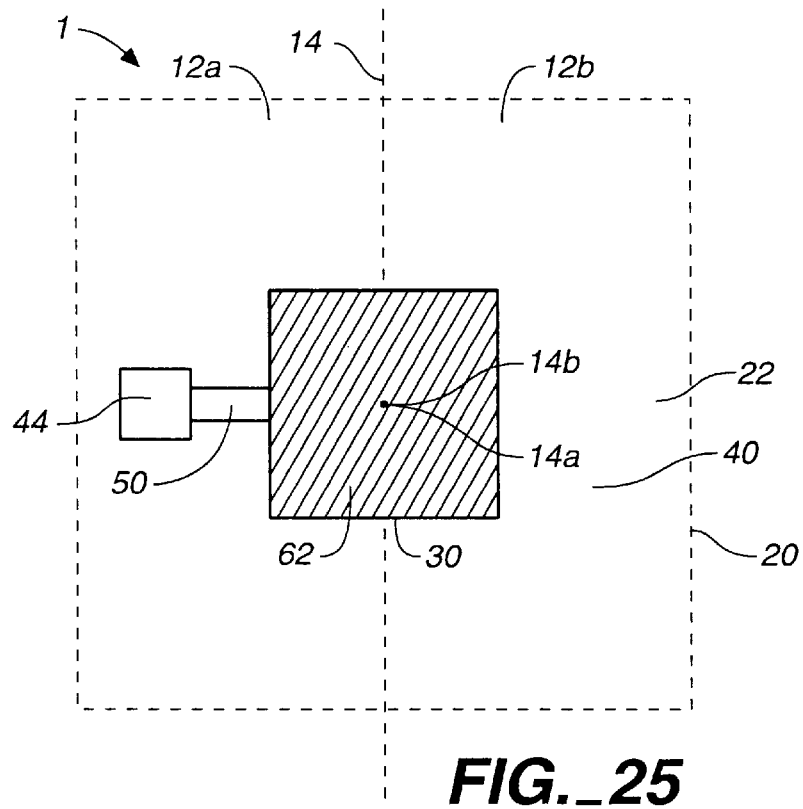
FIG._25
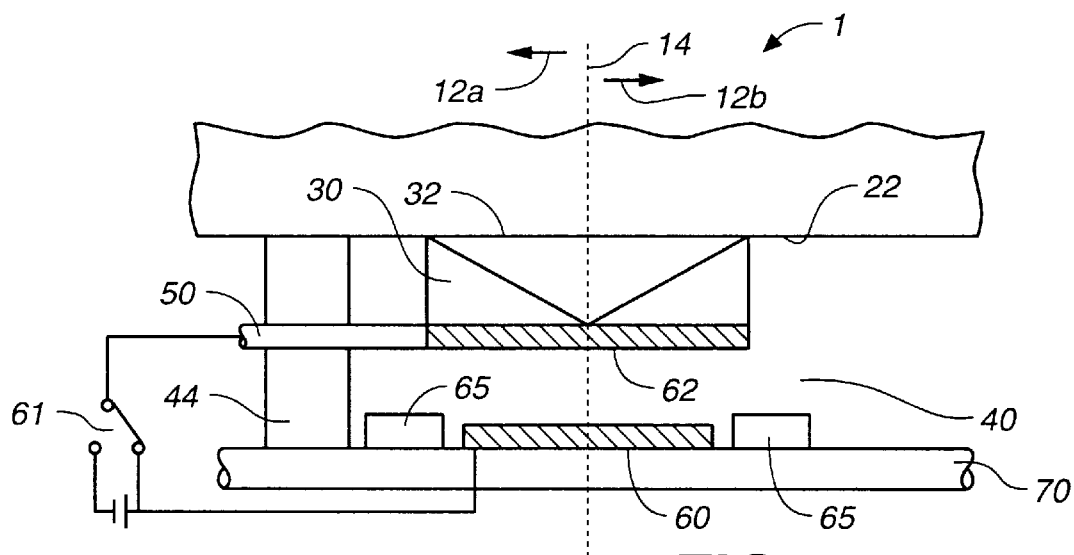
FIG._26

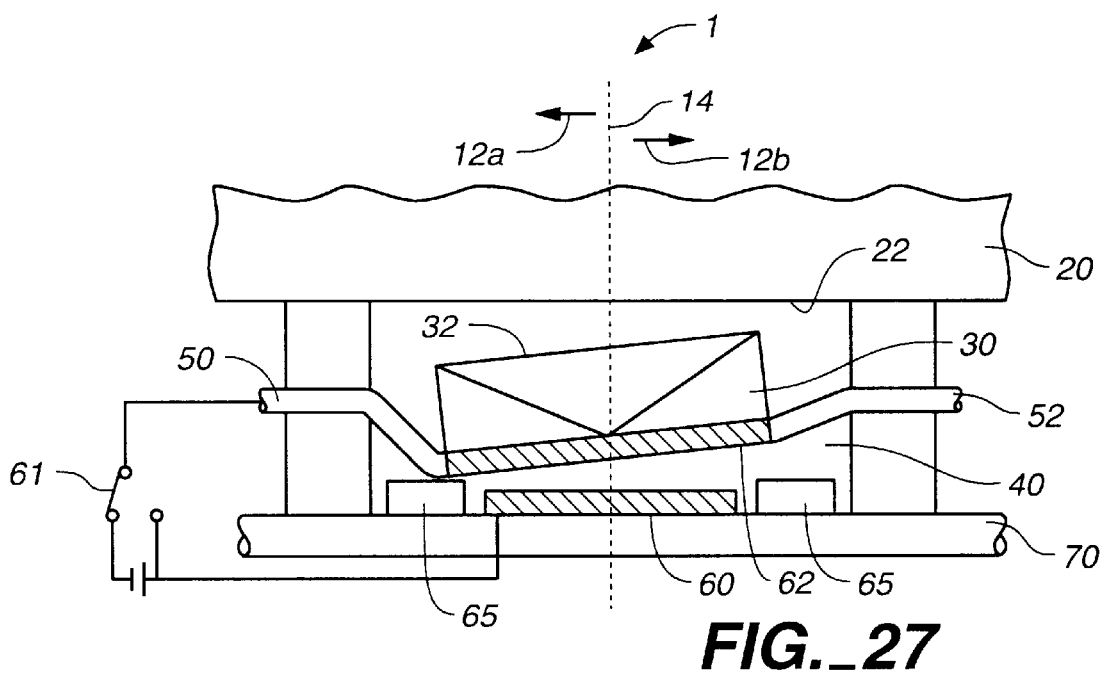
*FIG._27*
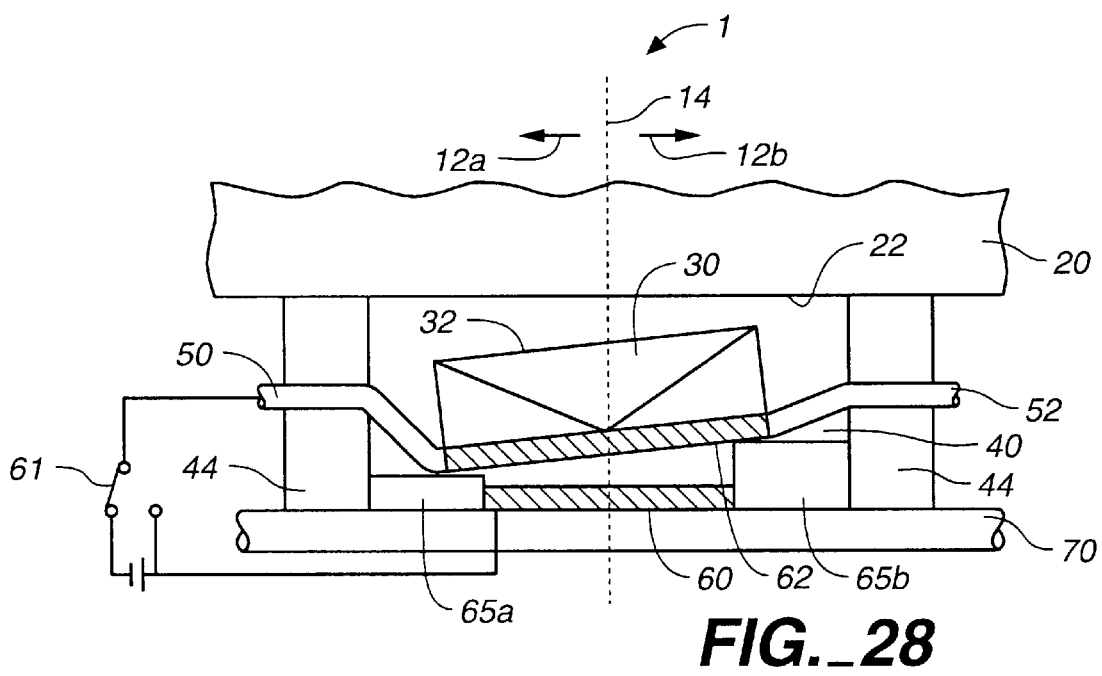
*FIG._28*

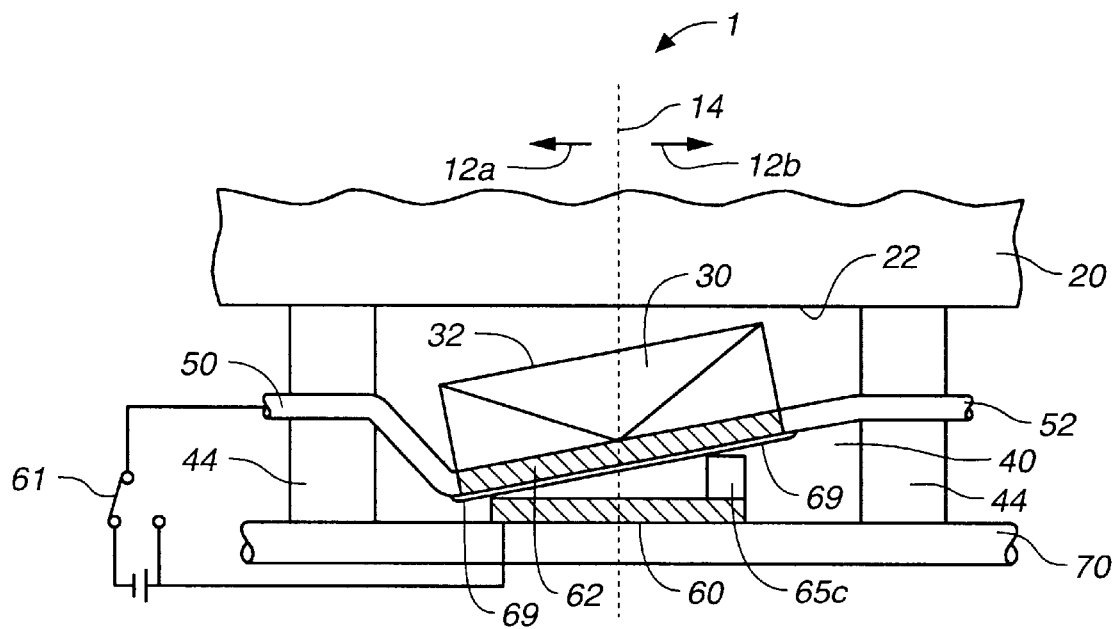
FIG._29
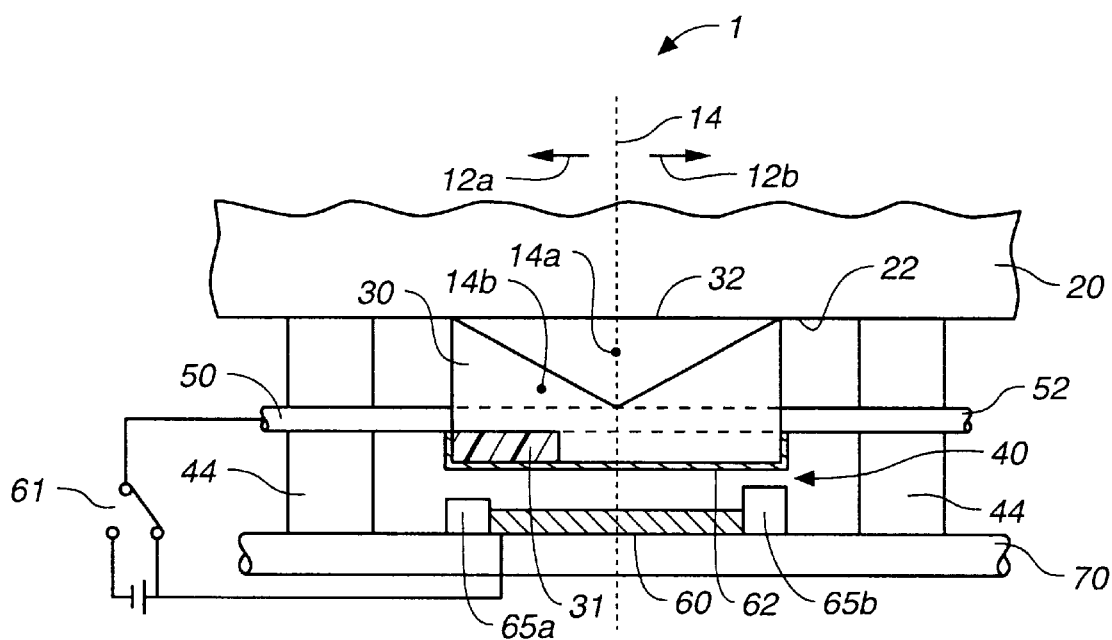
FIG._30

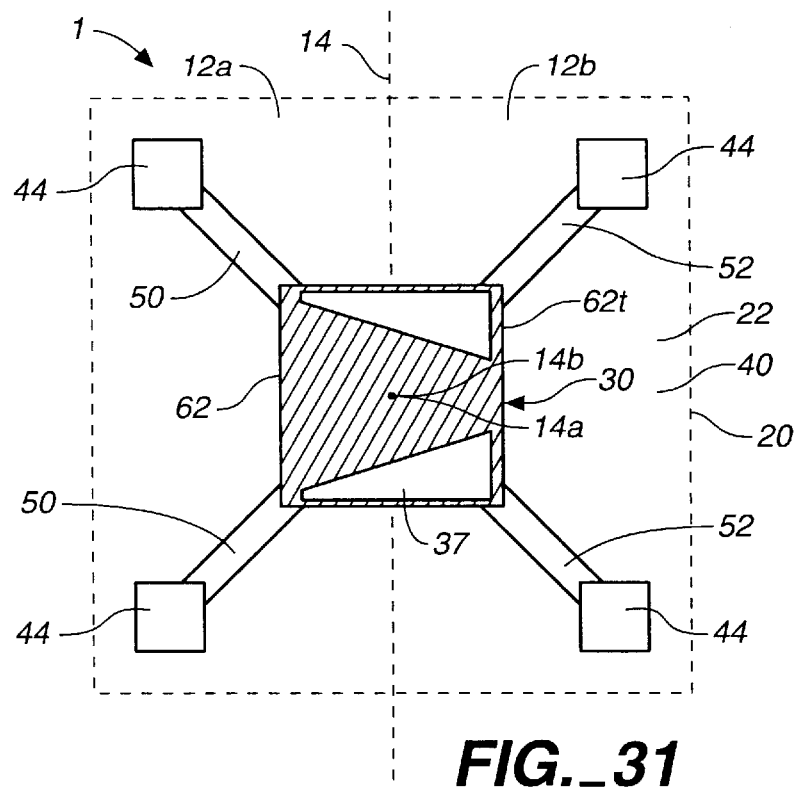
FIG._31
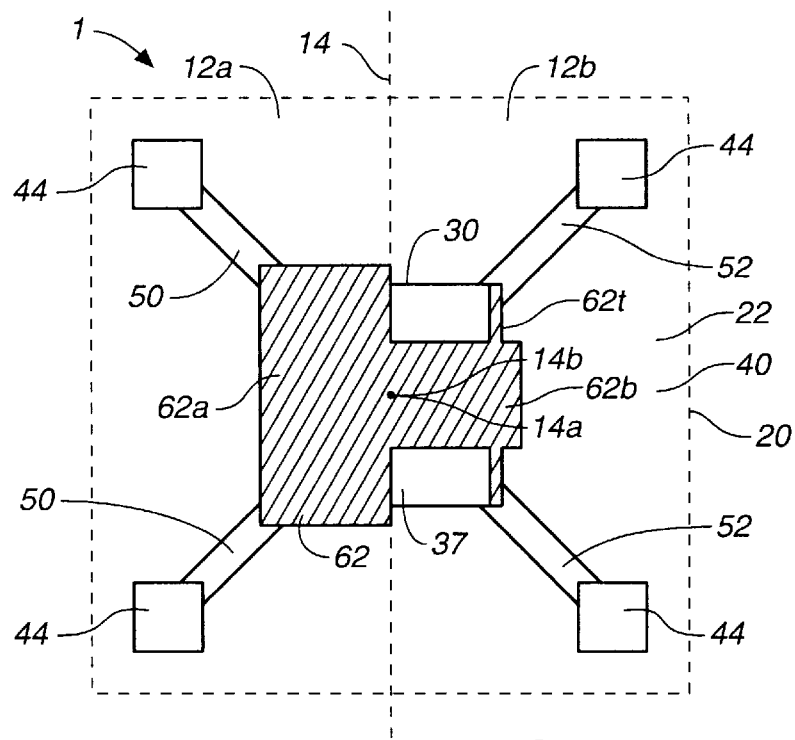
FIG._32

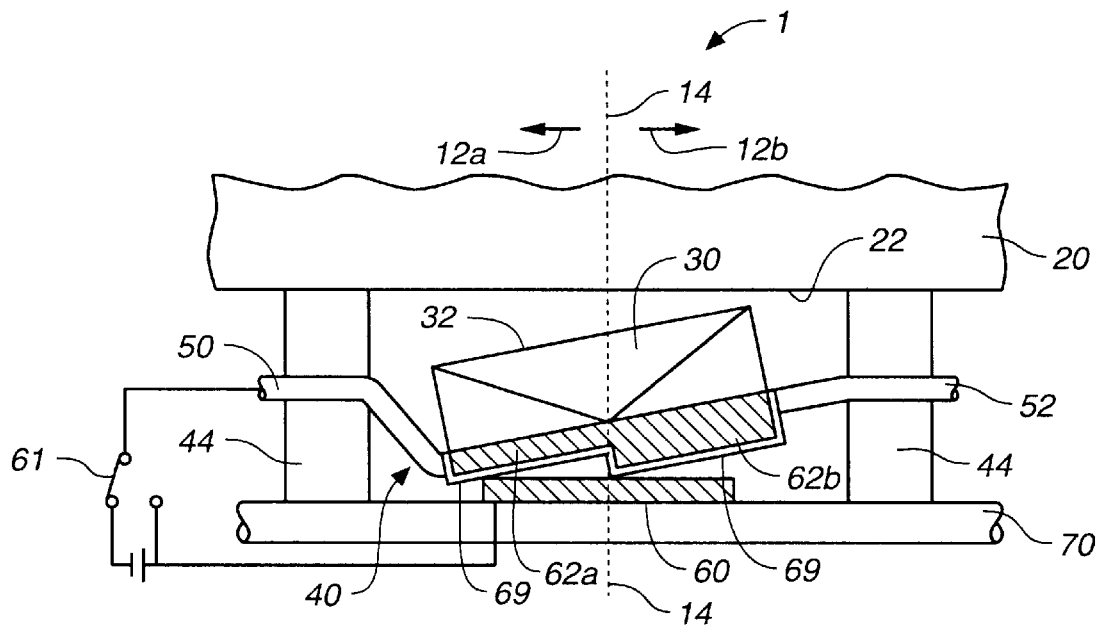
FIG._33
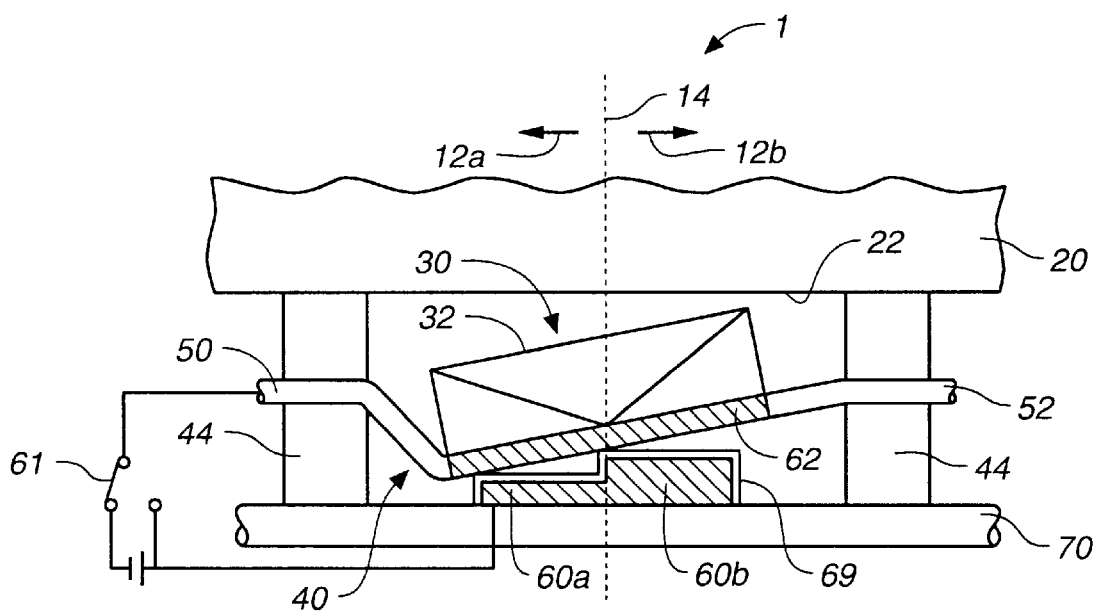
FIG._34

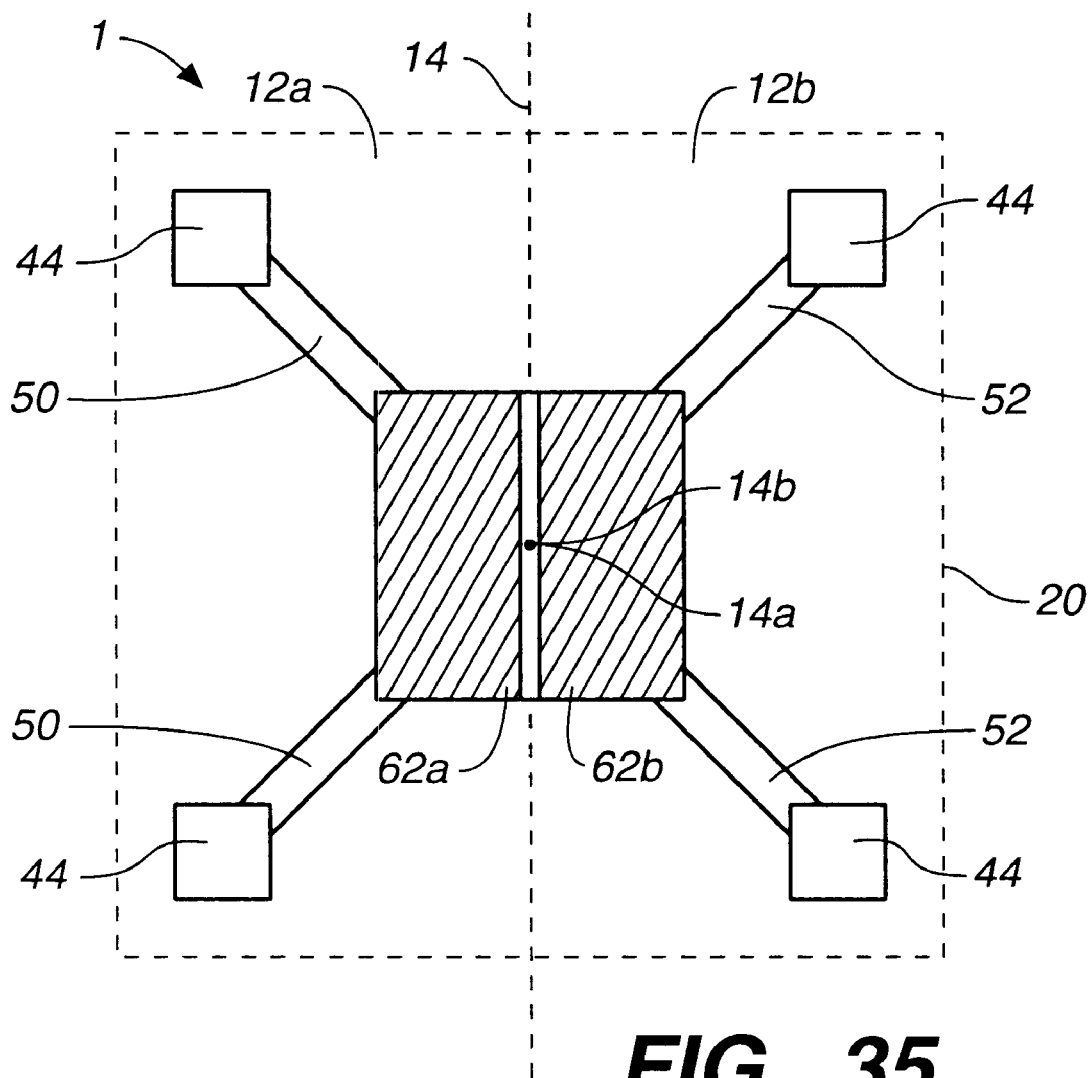
FIG._35

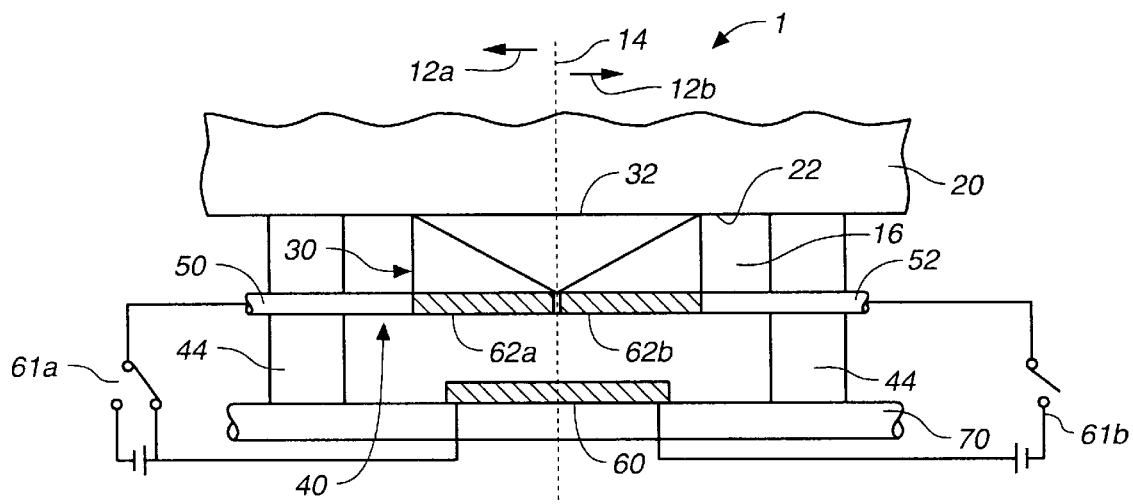
FIG._36a
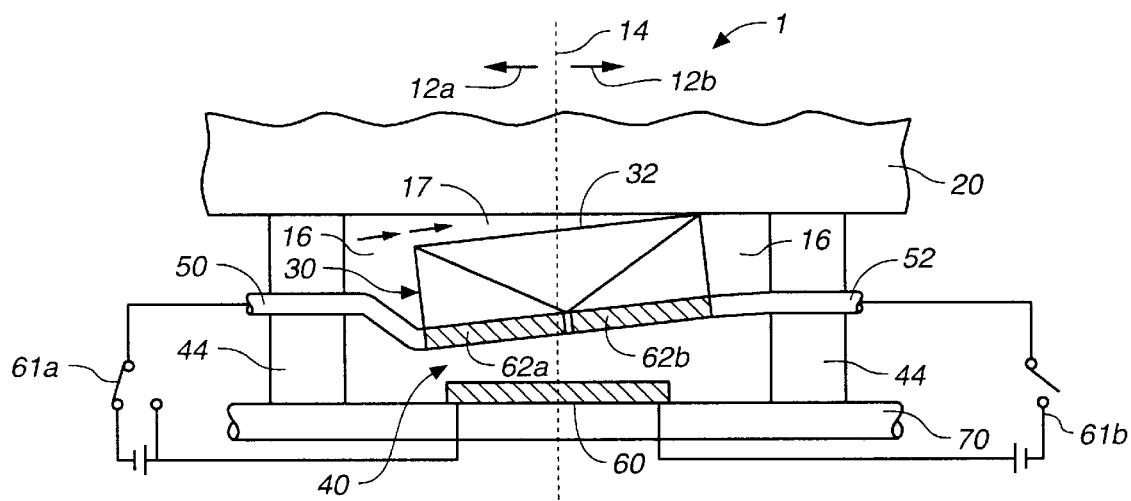
FIG._36b

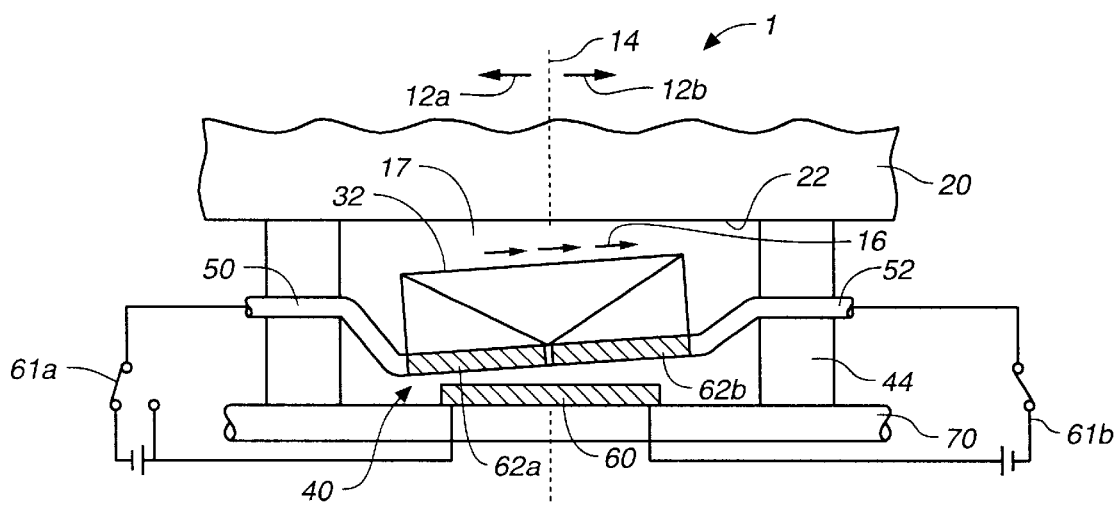
FIG._37a
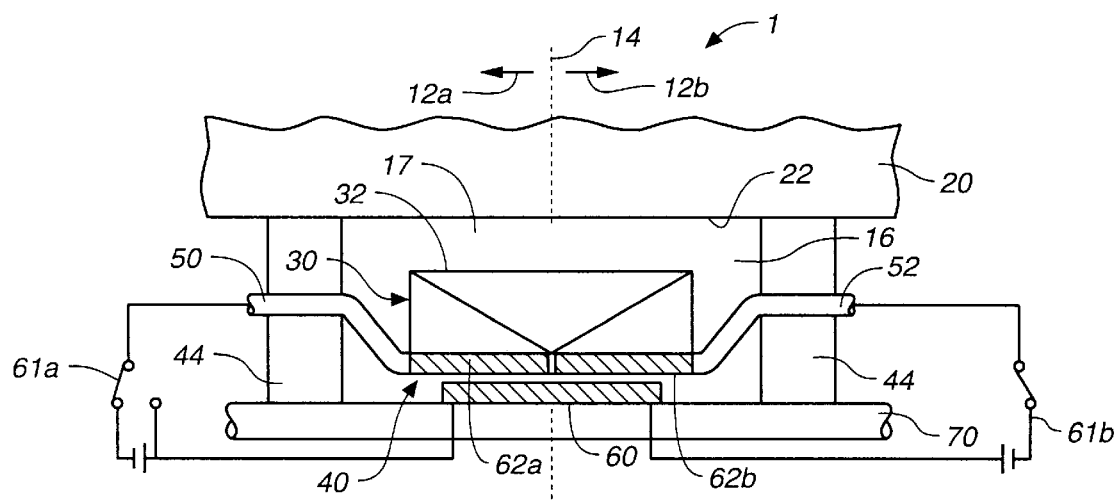
FIG._37b

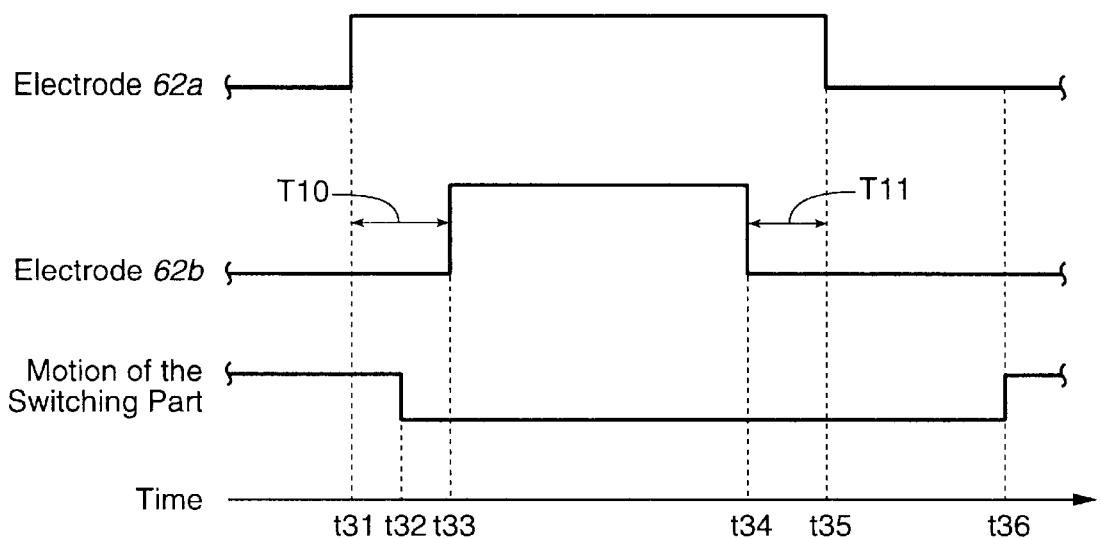
FIG._38
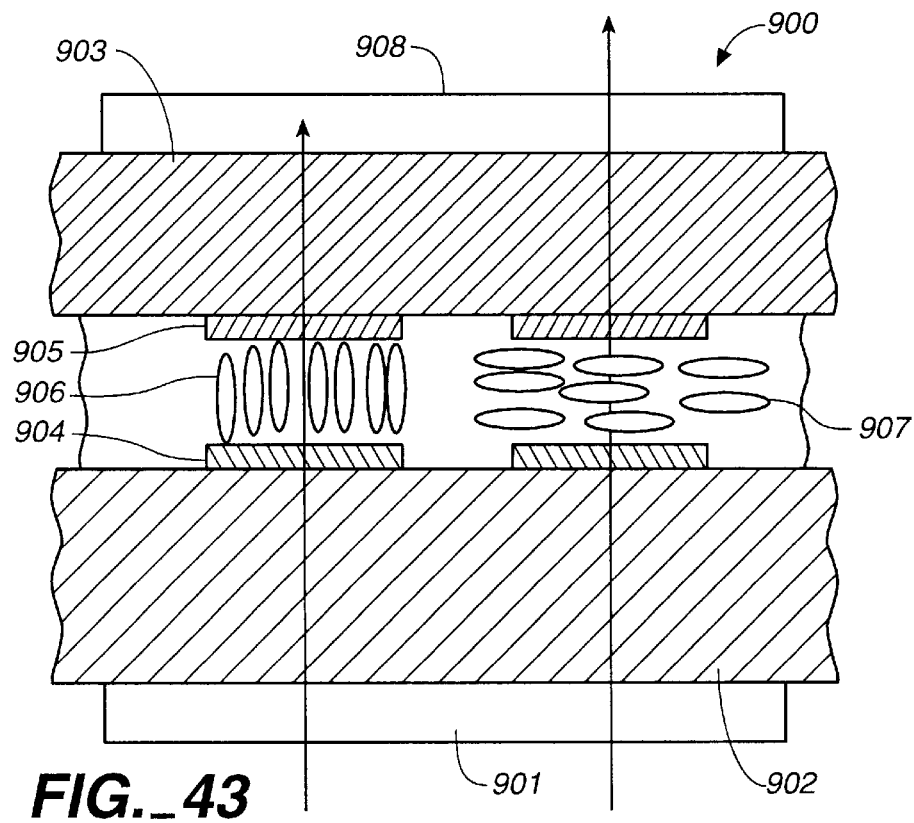
FIG._43

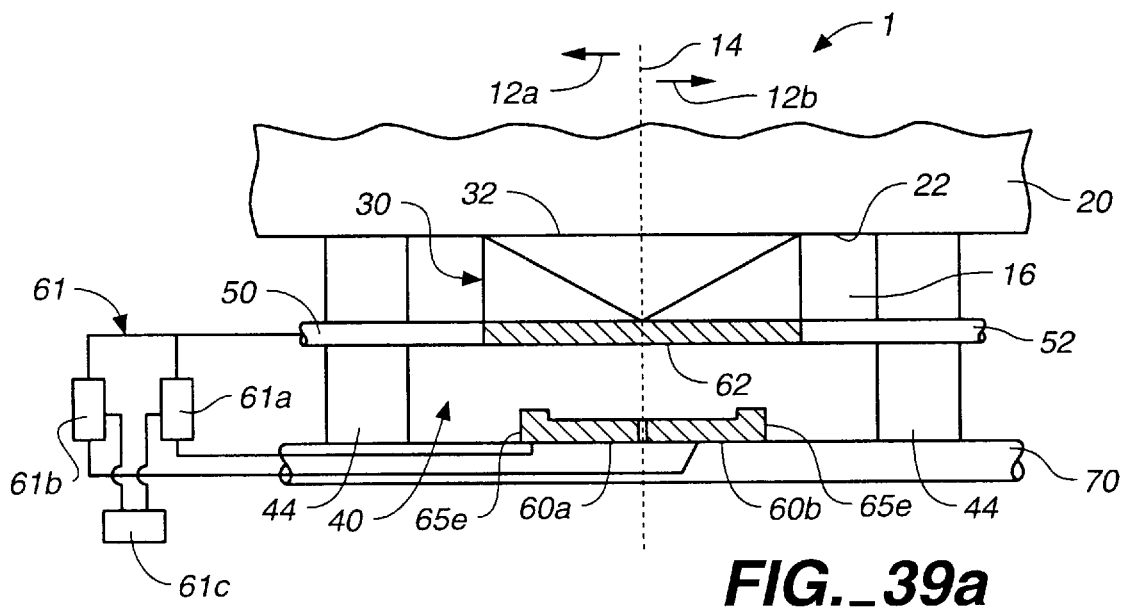
FIG._39a
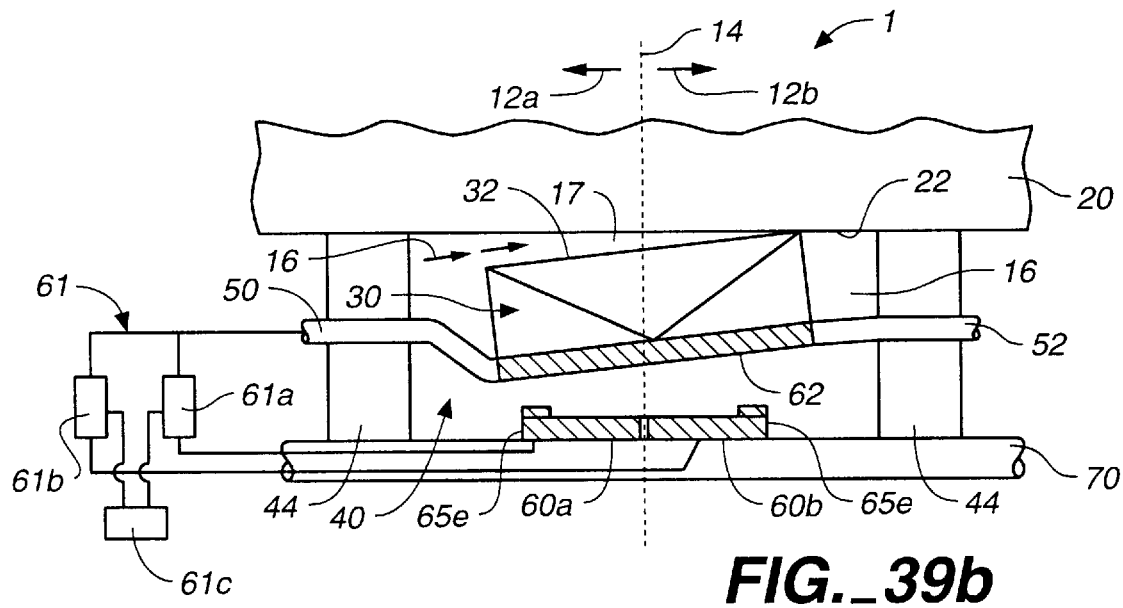
FIG._39b

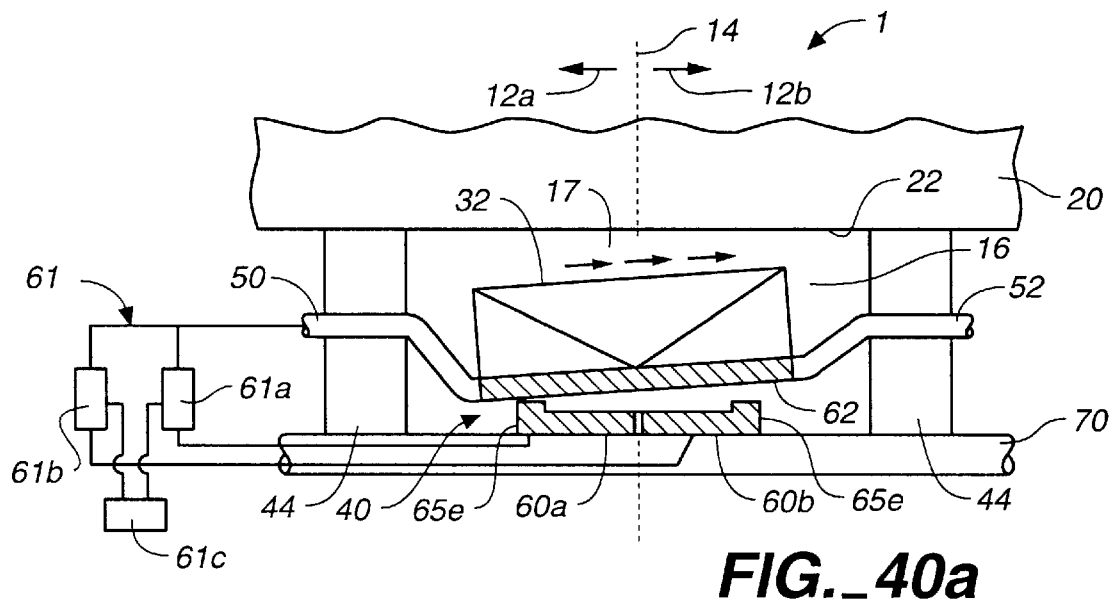
FIG._40a
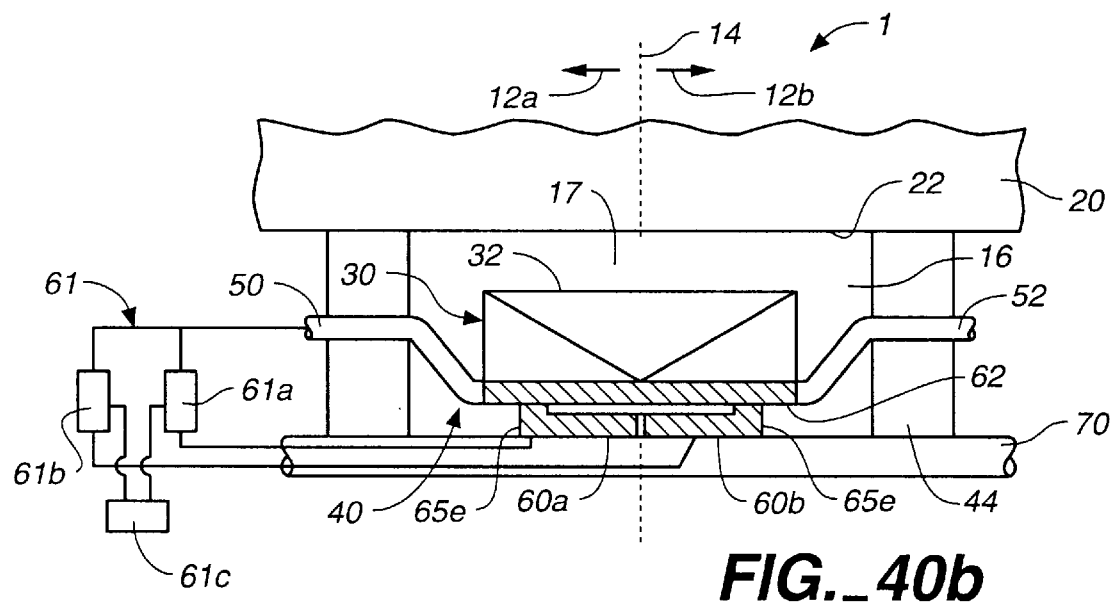
FIG._40b

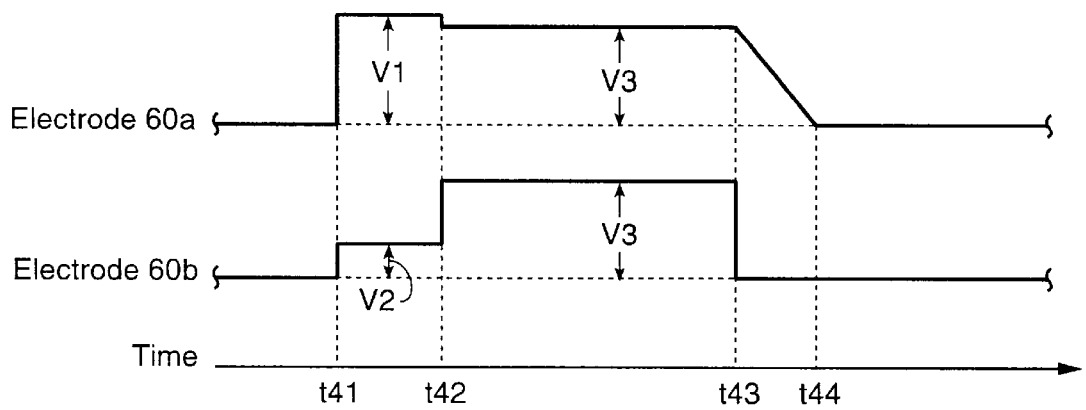
FIG._41
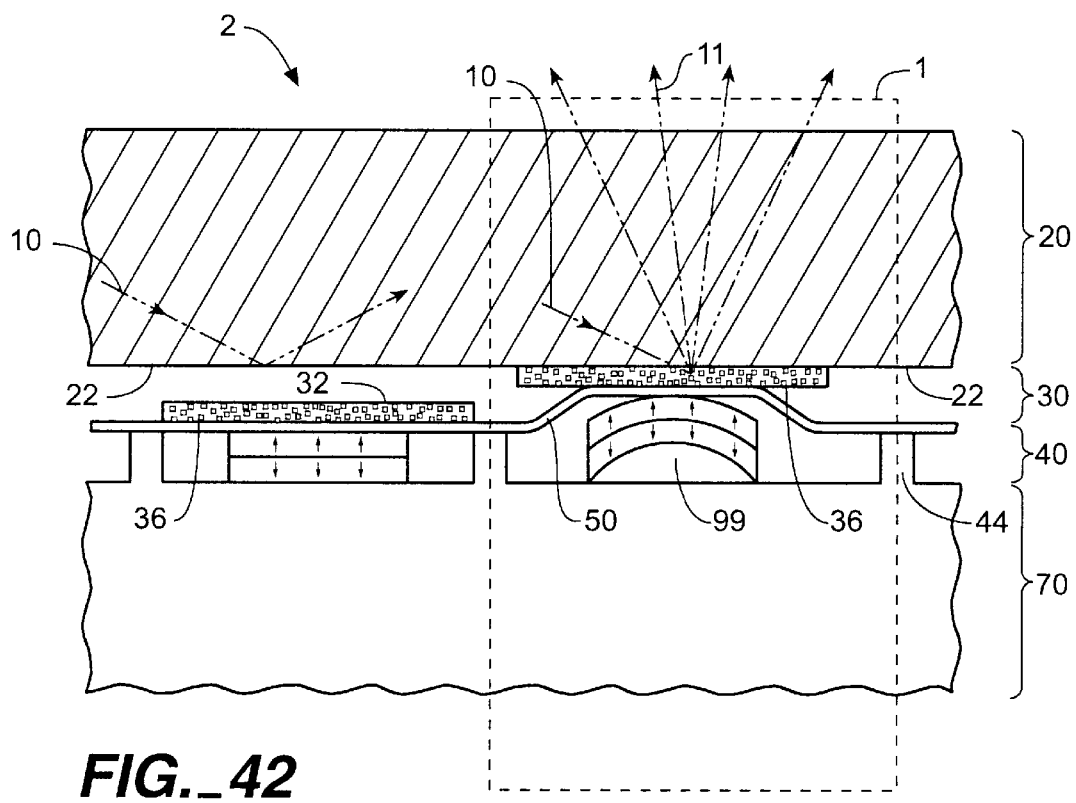
FIG._42

OPTICAL SWITCHING DEVICE AND IMAGE DISPLAY DEVICE

BACKGROUND OF THE INVENTION

1. Technical Field

The present invention relates to an optical switching device (light valve) for use in optical communication, optical processing, optical memory devices, optical printers, image display devices, etc., and more particularly, to an optical switching device suitable for use in an optical image display device and to an optical image display device.

2. Background Art

Conventionally, an optical switching device using a liquid crystal is known in the art. FIG. 43 schematically illustrates an optical switching device 900 according to a conventional technique. As shown in FIG. 43, the optical switching device 900 includes polarizers 901 and 908, glass plates 902 and 903, transparent electrodes 904 and 905, and liquid crystals 906 and 907. In this optical switching device, optical switching is performed by applying a voltage between the transparent electrodes so as to modify the orientations of liquid crystal molecules thereby rotating the polarization plane. A conventional image display device is produced by disposing such optical switching devices (liquid crystal cells) in a two-dimensional fashion into the form of a liquid crystal panel. In this image display device, representation of gray scales is accomplished by controlling the alignment of liquid crystal molecules by adjusting the applied voltage.

However, liquid crystals are slow in response. The response time of liquid crystals is several msec at best. This makes it difficult to employ optical switching devices using a liquid crystal in applications which need a short response time, such as optical communication, optical processing, an optical memory such as a hologram memory, an optical printer, etc. Another problem of optical switching devices using a liquid crystal is a reduction in the light utilization efficiency caused by a polarizer.

In the art of the image display device, increasingly high image quality is required. To meet such a requirement, it is needed to provide an optical switching device capable of representing gray scales more precisely than optical switching devices using a liquid crystal.

Thus, it is an object of the present invention to provide a low-loss optical switching device capable of responding at a high speed. It is another object of the present invention to provide an optical switching device capable of forming a high-quality image with a uniform contrast.

DISCLOSURE OF THE INVENTION

According to the present invention, to achieve the above objects, there is provided an optical switching device which extracts evanescent light from a light guide capable of transmitting light by means of total reflection, wherein extraction of light is performed when a light-transmissive extraction plane of a switching part is brought into contact with the light guide. Light can be turned on and off at a high speed by moving the switching part by a small distance nearly equal to one wavelength or less. The switching part is formed to be of a reflective type. The light guide, the optical switching part, and driving means for driving the switching part are disposed in this order in a direction in which light is illuminated, thereby forming the optical switching device in a multilayer structure. Thus, an optical switching device can be realized which can output a large amount of light with a low loss and which can respond at a high speed. That is, the switching part according to the present invention includes: the light guide with a total reflection plane capable of transmitting light by means of total reflection; the switching part including a light-transmissive extraction plane capable for extracting evanescent light leaking through the total reflection plane; and driving means for moving the switching part to a first position at which the extraction plane is within an extraction range which allows an evanescent light to be extracted and a second position at which the extraction plane is out of said extraction range, wherein the light guide, the switching part and the driving means are disposed in this order in a direction in which light is output.

In the optical switching device according to the present invention, the light guide, the switching part, and the driving means for driving the switching part may be disposed one on another in this order into a multilayer structure in which the functions of the light guide, the switching part, and the driving means are implemented in the respective layers substantially independently of one another. This makes it possible to easily optimize the respective parts. In the optical switching device according to the present invention, light is reflected by the switching part toward the light guide, and no light passes through the driving means. Therefore, it is possible to optimize the driving means without having to consider optical conditions.

This allows the switching part to be supported on the driving means, and thus it becomes unnecessary for the light guide to have a structure on the side facing the optical switching part. Thus, the light guide can be constructed in the form of a simple flat panel. Because the light guide is not required to include a part for supporting the switching part, the entire area of the light guide on the side where the total reflection plane is formed can be used as a plane through which light is extracted, that is, as a plane the switching part is brought into contact with. Thus it is possible to realize an optical switching device having a large aperture area through which light is output, that is, having a large aperture ratio, which allows a large amount of light to be output. Furthermore, by employing the panel structure, it becomes possible to use a plane opposite to the total reflection plane as an output plane through which the extracted light is output to the outside. The driving means may be formed on an integrated circuit substrate for controlling the driving means. The optical switching device may be integrated with an integrated circuit chip for controlling an image.

A pixel may be formed by one or a combination of a plurality of optical switching devices according to the present invention. If a plurality of optical switching devices are disposed in a two-dimensional fashion, and if the light guide is adapted to be capable of transmitting white light or three primary color light, an image display device can be obtained. This image display device can display a high-resolution image at a high speed. Furthermore, the image display device can be constructed into the form of a multi-layer structure, which allows the image display device to be produced at low cost. The image display device may be integrated with an integrated circuit chip.

To realize the switching part of the reflective type, a light outputting member for outputting extracted light may be formed using a microprism or a light-dispersive material such that light extracted through the extraction plane is reflected by the light outputting member. The direction of the output light may be controlled so that light is output in a direction substantially perpendicular to the total reflection plane.

The driving means may include a supporting member for elastically supporting the switching part and electrostatic driving means for driving the switching part by means of electrostatic force acting between a pair of electrodes whereby the switching part may be moved to the first and second positions. Preferably, the supporting member urges the switching part at the first position toward the light guide when no electrostatic force is exerted by the electrostatic driving means. The electrostatic driving means can be easily controlled by electric power. However, the driving force provided by the electrostatic driving means varies with a variation in voltage or current. In contrast, a driving force provided by an elastic element is stable because it is generated mechanically. In view of the above, the supporting member formed of an elastic material is employed to stably generate a driving force thereby urging the extraction plane of the switching part into close contact with the total reflection plane of the light guide so as to turn on the optical switching device, whereas a driving force supplied by the electrostatic driving means which can be easily controlled by electric power is employed to move the extraction plane away from the switching part so as to turn off the optical switching device. This makes it possible to provide an optical switching device having high controllability and capable of stably outputting a desired amount of light.

Preferably, the supporting member is adapted to have a residual deformation when the switching part is at the first position so that the extraction plane is urged, in the on-state, by the elastic force of the supporting member against the total reflection plane of the light guide thereby ensuring that the extraction plane is in intimate contact with the total reflection plane. This makes it possible to provide an optical switching device having high brightness in the on-state and high on-off contrast. Furthermore, the residual deformation of the supporting member makes it possible to accommodate a variation in the distance between the light guide and the switching part or a variation between the switching part and the driving means due to vibrations, a temperature variation, or aging effects.

The switching part is preferably supported by the supporting member via a spacer. The spacer may serve to reduce the distance between electrodes and provide a space in which the supporting member is allowed to be elastically deformed. Such a spacer may be formed in a T shape or inverted trapezoidal shape in cross section with the driving means located below. The reduction in the distance between electrodes allows a reduction in the driving voltage and an increase in the operation speed.

By employing a spacer having such a shape, it becomes possible to employ, as the supporting member, a spring member in the form of a plate one end of which is supported by a post located near the boundary of the switching part and the other end of which is connected to the switching part. This makes it possible to realize a spring member having a large effective length whereby the force for urging the switching part may be properly adjusted. Thus, it is possible to adjust the elastic force such that on/off operations can be performed in a highly reliable fashion even if the driving force supplied by the electrostatic force is small. Furthermore, the employment of the T-shaped or inverted trapezoidal-shaped spacer allows the spring member to have a sufficiently large effective length without causing a reduction in the area of the switching part. Therefore, it is possible to provide an optical switching device having a large aperture area through which light is output. A plurality of such optical switching devices may be employed to form an image display device in such a manner that optical switching devices are located in a seamless fashion substantially without being spaced from each other.

The spring member may be formed in an arbitrary shape such as a coil shape. However, if the spring member is formed such that its one end is supported by a post located near the boundary of the switching part (device) and the other end is connected to the optical switching part, then it is possible to position the optical switching part by the spring member. In this case, if the spring member is formed in the shape of a plate having a slit or opening near the boundary, interference among adjacent optical switching devices can be prevented. Furthermore, it also becomes possible to adjust the elastic modulus of the spring member to a value optimum for driving the switching part.

More specifically, such a plate-shaped spring may be formed to have a small width and radially extend from the optical switching part wherein one end of the spring member is supported by the post disposed near the boundary. In addition to such a spring member, the electrode may be formed in such a manner as to radially expand from the switching part thereby expanding the area of the electrode. This makes it possible to obtain a large driving force using a small voltage. That is, it is possible to reduce the driving voltage. The spring member may also be in the form of a plate including a part extending in a spiral fashion along the boundary. This allows the effective length of the spring to be increased without increasing the area thereof. Thus, it is possible to reduce the voltage required to drive the optical switching part thereby reducing power consumption. The spring member may also include parts extending in a double spiral fashion. The spring member may also be formed in such a manner that the bending part of the spring (the central part between two supporting points) has a thickness smaller than the other parts so that the spring member has a reduced elastic modulus which provides effects equivalent to those obtained by increasing the effective length of the spring. When an image display device is formed using a plurality of optical switching devices, a plurality of plate-shaped springs serving as supporting members may be disposed at regular intervals near boundaries between adjacent optical switching devices such that supporting members may be shared by adjacent optical switching devices.

The post may be a protrusion extending along a long length at the boundary between adjacent optical switching devices. Alternatively, a plurality of posts may be disposed at proper intervals along the boundary. This allows a reduction in space occupied by the posts, and the remaining space can be used for the electrode or another element. The posts may be disposed at random locations or at locations determined according to a particular rule so as to provide a high-stability optical switching device and an image display device having a symmetric structure which can be easily assembled.

The spring member may be formed using an electrically conductive thin-film such as a boron-doped silicon thin-film such that the thin-film also serves as an electrode of the electrostatic driving means.

An auxiliary post may be disposed between the light guide and the spring member. In this case, if the spring member is formed in the shape of a plate having neither a slit nor an opening, as opposed to the above-described example, then it is possible to enclose the side where the switching part is disposed in a substantially hermetic fashion such that the side where the switching part is disposed has a lower pressure than the side where the driving means is disposed, whereby the spring member is pressed by the ambient pressure against the auxiliary post thereby ensuring that the gap between the switching part and the light guide is maintained uniform. Furthermore, the pressure difference allows the switching part to be in intimate contact with the light guide when the switching part is in the on-state. This makes it possible to provide a high-contrast optical switching device capable of operating in a stable fashion.

If the inside of the optical switching device with the switching part includes a hermetically enclosed space, and if the driving means is disposed in the hermetically enclosed space, then it is possible to reduce the pressure in the enclosed space or replace air in the enclosed space with gas such as an inert gas with a low pressure. This allows a reduction in the gas flow resistance during a switching process. As a result, friction with gas due to a damper effect or the like is greatly reduced. Therefore, it is possible to reduce the driving voltage and increase the driving speed. Furthermore, it is possible to perform on/off switching operations at a high speed. Thus, it is possible to provide an optical switching device capable of responding at a high speed.

Driving the Switching Part

In the optical switching device in which the switching part is driven by a combination of elastic and electrostatic forces, it is important that the switching part can be driven by a driving voltage which is as small as possible.

If the distance along which the switching part moves in each on-to-off or off-to-on switching operation is denoted by d, and the driving voltage is denoted by Vd, then the elastic force Fg and the electrostatic force Fs exerted on the switching part during the switching operation can be represented as follows:

$$Fg = K \times x \quad (1)$$

$$Fs = C \times Vd^2/(d-x)^2 \quad (2)$$

where x is the moving distance of the switching part, K is the elastic modulus of the supporting member, and C is a constant which is proportional to the area of the electrode and which depends on the dielectric constant. When the switching part is at rest after the on/off switching motion, the elastic force Fg and the electrostatic force Fs are balanced. Therefore, to reduce the driving voltage Vd, it is desirable to reduce the elastic force Fg. A reduction in the moving distance d is also desirable. However, if the elastic modulus K is reduced, the moving speed of the switching part decreases. As a result, a reduction in the response speed occurs. On the other hand, if the moving distance x is reduced, it becomes difficult to obtain a sufficiently high on-off contrast. For the above reason, it is difficult to reduce the driving voltage Vd. If the elastic force Fg and the electrostatic force Fs are balanced at the on- or off-position, there is possibility that the attitude of the switching part becomes instable and degradation of the light modulation performance occurs. In switching devices using an evanescent wave, even a slight gap between the total reflection plane and the extraction plane can cause a reduction in the amount of extracted light.

In view of the above, the present invention provides a technique of driving the switching part in a highly reliable fashion at a high speed so as to obtain high optical contrast, using a reduced driving voltage Vd under the same conditions regarding the moving distance d and the elastic modulus K.

To this end, in the present invention, a fixed bias voltage with the same polarity as that of the driving voltage is applied between the electrodes by which the switching part is driven, thereby reducing the voltage required to drive the switching part. Furthermore, in order to hold the switching part at the on-position in a stable fashion under the application of the bias voltage, the holding force at the on-position is set to a value greater than the force created by the bias voltage. To this end, there is provided driving control means for applying to the electrostatic driving means a driving voltage for driving the switching part and a fixed bias voltage which is equal in polarity to the driving voltage and which provides a holding force capable of stably holding the switching part at least at the first position by means of electrostatic force or elastic force. The invention also provides a method of controlling a spatial optical modulation device, comprising a control step for applying to the electrostatic driving means a driving voltage for driving the switching part and a fixed bias voltage which is equal in polarity to the driving voltage and which provides a holding force capable of stably holding the switching part at least at the first position by means of electrostatic force or elastic force.

The application of the fixed bias voltage allows a reduction in the driving voltage which is applied to drive the switching part, and thus allows a reduction in the power supply voltage applied to the driving control means. Therefore, the control circuit serving as the driving control means is allowed to have a lower breakdown voltage, and it is possible to construct the control circuit in a simpler configuration. Furthermore, the power consumption can be reduced. By providing a holding force large enough to hold the switching part at the first position, it is assured that the switching part is maintained in a stable state with respect to the orientation when the bias voltage is applied. This allows the bias voltage to be continuously applied even when the switching part is at the first position. This means that the control of the bias voltage is not needed or can be simplified.

Preferably, there is provided a stopper for assuring a minimum gap between the electrodes at one of the first and second positions at which the holding force is provided by the driving voltage thereby preventing the electrostatic force generated by the bias voltage from becoming infinitely large when the switching part is at the first or second position and thus assuring that the electrostatic force is within a predetermined range. Preferably, the bias voltage is selected such that the electrostatic force generated by the bias voltage when the switching part is at the stopper position is smaller than the elastic force of the supporting member. This allows the switching part to be moved only by turning on and off the driving voltage. That is, it is allowed to maintain the bias voltage at a fixed value without controlling the bias voltage.

Alternatively, the bias voltage may be periodically applied such that the electrostatic force generated by the bias voltage becomes smaller than the elastic force of the supporting member when the switching part is at the first or second position. More specifically, the bias voltage may be changed in synchronization with an operating clock signal so that the switching part is allowed to be moved, at particular times corresponding to the timing of the operating clock signal, from the first or second position by the elastic force of the supporting member. Therefore, only by varying the bias voltage at predetermined intervals without having to control the bias voltage in synchronization with the driving voltage, it is possible to move the switching part in response to the driving voltage. This makes it easy to control the bias voltage. Furthermore, this technique also allows the bias voltage to have a value greater than the elastic force of the supporting member. Thus, it is possible to further reduce the driving voltage.

Furthermore, because the employment of the stopper for assuring the minimum gap between the electrodes assures that the electrostatic force created by the bias voltage falls within a predetermined range, it is possible to move the switching part in response to the driving voltage if the bias voltage is periodically changed to a value so that the electrostatic force created by the bias voltage at the stopper position becomes smaller than the elastic force of the supporting member. This makes it possible to limit the variation of the bias voltage within a small range. As a result, it is possible to form the circuit for controlling the bias voltage in a simple fashion, and a reduction in power consumption can be achieved.

The switching part may be moved by the supporting member from the second position to the first position and may be held at the first position by the elastic force provided by the supporting member. More specifically, the bias voltage at the first position is set not such that the electrostatic force created by the bias voltage is in equilibrium with the elastic force of the supporting member but such that the electrostatic force created by the bias voltage becomes smaller than the elastic force of the supporting member thereby assuring a stable holding force at the first position. As described above with reference to equation (2), the electrostatic force varies in inverse proportion to the square of the distance. Therefore, if the supporting member is set to have a proper displacement at the first position such that an elastic force is provided by the supporting member at the first position, then it is possible to drive the switching part in a stable fashion using a driving voltage smaller than a value which produces absolutely no equilibrium with the elastic force of the supporting member at any point. In this case, the driving voltage is allowed to produce equilibrium with the elastic force of the supporting member at one or more points, as long as there is no equilibrium point in the range between the first position and the second position. This technique allows the driving voltage to be reduced without applying a bias voltage. If this technique is combined with the application of bias voltage, then it is possible to further reduce the driving voltage.

Alternatively, the supporting member may be formed to be capable of supporting the switching part at a substantially central position between the first and second positions when no electrostatic force is exerted on the switching part, and the electrostatic driving means may include a first pair of electrodes for holding the switching part at the first position and a second pair of electrodes for holding the switching part at the second position. If a driving voltage is alternately applied to the first and second pairs of electrodes, a holding force can be provided by the electrostatic force at the respective positions. In this technique, each pair of electrodes is responsible for moving the switching part one-half the distance between the first and second positions. Because the distance between each pair of electrodes for creating the electrostatic force becomes one-half the distance in previous examples, the driving voltage can be greatly reduced, as can be understood from equation (2). This allows the driving voltage to be reduced even when no bias voltage is applied. Of course, this technique can be combined with the application of bias voltage to further reduce the driving voltage.

As described above, the optical switching device and the method of controlling the same according to the present invention allow the driving voltage to be reduced without changing either the distance between the first and second positions associated with the switching part or the elastic modulus of the supporting member. This makes it possible to drive the high-speed and high-contrast optical switching device using a small driving voltage. The control method according to the present invention is not limited to the optical switching device described above, but it can be applied to any spatial optical modulation device in which a switching element is mechanically moved thereby modulating light. Thus, it is possible to provide a spatial optical modulation apparatus capable of operating at a high speed with small power consumption at low cost.

Controlling the Attitude of the Switching Part

In the art of the optical switching device using evanescent light, it is always important to improve the operating speed. In view of the above, the present invention provides a technique of further increasing the operating speed of the optical switching device or the spatial optical modulation device which modules light by moving the switching part including the flat extraction plane.

The inventors of the present invention have investigated the operation of optical switching devices including an element in the form of a flat plate such as an extraction plane. The investigation has revealed that when the switching part moves a small distance at a high speed in the switching operation, the resistance of air or fluid such as an inert gas between the extraction plane of the switching part and the total reflection plane or the resistance of air or fluid which occurs when the switching part moves acts as a non-negligible force against the motion of the switching part, and that the operating speed can be greatly improved by reducing such resistance of the fluid. One technique of reducing the fluid resistance is to operate the optical switching device in a vacuum as described above with reference to one embodiment of the invention. However, to obtain a vacuum ambient in which the switching part or the driving part is disposed, an additional member such as a pressure-resistant container is required, which causes increases in the size of the device and cost. Furthermore, in production, an additional processing step is required to obtain the vacuum ambient. In the case of an optical switching device which can be used only in a vacuum ambient, if leakage occurs during operation, abrupt degradation in performance occurs or the optical switching device becomes inoperative. Thus, such a type of optical switching device has a problem associated with reliability. Thus, the present invention provides a technique of reducing the fluid resistance by controlling the motion (attitude) of the switching part, as described below. More specifically, in an early, intermediate, or final stage of the moving process, the driving means tilts the orientation of the extraction plane of the switching part with respect to a first direction in which the extraction plane faces when the switching part is at the first position. By tilting the switching part in the early stage of the moving process, it becomes possible for a fluid to smoothly flow into a space which is created as a result of separation of the switching part which occurs when the switching part start to move. That is, the fluid resistance can be reduced.

If the switching part is then moved while maintaining the tilted state, the inclination of the flat plane element with respect to the moving direction results in a reduction in the fluid resistance exerting on the moving switching part. The tilt of the switching part in the final stage of the moving process allows the fluid to smoothly escape from the space decreasing in volume as the switching part comes into the final resting position. Thus, the fluid resistance is reduced also in this case. As described above, the fluid resistance can be reduced by tilting the flat plane element at least in one of the early stage, main stage, and the final stage of the moving process of the switching part. If the flat plane element is tilted in all of the early stage, main stage, and the final stage of the moving process or in any two of those, a further reduction in the fluid resistance can be achieved. The reduction in the resistance during the movement of the switching part results in an increase in the moving speed and an increase in the modulation speed. Because this technique allows the fluid resistance to be reduced without reducing the pressure in the ambient in which the switching part is disposed or without needing a vacuum ambient, the optical switching device can be operated at a high speed in a common environment without having to placing the optical switching device in a pressure container. Thus, it is possible to provide a high-speed and high-reliability optical witching device at low cost.

In the optical switching device using evanescent light according to the present invention, when the extraction plane of the switching part in contact at the first position with the total reflection plane moves away from the total reflection plane or when the extraction plane of the switching part comes into contact with the total reflection plane, motion of the fluid is limited. This causes an increase in resistance against the movement of the switching part. This problem can be avoided by tilting the switching part in the early stage or the final stage of the movement process thereby making it possible for the fluid to flow into or escape from a space between the extraction plane and the total reflection plane. This allows a great improvement in the operating speed.

Of course, this method of controlling the attitude may also be applied to various types of spatial modulation devices other than the optical switching device using a flat plane element according to the invention.

The attitude of the switching part may be controlled by applying a driving force having a distribution asymmetric about the center of gravitation of the switching part to the switching part thereby bringing the switching part into an asymmetric state, that is, into a tilted state. Using this technique, it is possible to tilt the switching part in the early stage, the main stage, or the final stage of the moving process. One method of applying a driving force having an asymmetric distribution is to form the switching part such that it has a center of gravitation at a point shifted from the geometric center thereby allowing a driving force symmetric with respect to the geometric shape of the switching part to behave as a force asymmetric about the center of gravitation of the switching part thus tilting the switching part.

Another method is to form the driving means including a supporting member for elastically supporting the switching part such that the supporting member has an elastic modulus distribution which is, at least partially, asymmetric about the center of gravitation of the switching part thereby allowing a driving fore asymmetric about the center of gravitation of the switching part to be applied to the switching part. In the case where the driving means includes electrostatic driving means consisting of a first electrode disposed on the switching part and a second electrode disposed at a location opposing the first electrode, the shape of the first electrode or the second electrode or the distance between the first and second electrodes may be, at least partially, asymmetric about the center of gravitation of the switching part thereby allowing an asymmetric driving fore to be applied to the switching part.

Still another method is to divide the first or second electrode into a first and second parts which are asymmetric to each other about the center of gravitation of the switching part and apply electric power to the first and second parts in such a manner that the timing of applying electric power or the voltage of the electric power is different between the first and second parts thereby applying an asymmetric driving force to the switching part.

When the switching part is at the second position, it is not necessarily required that the orientation of the switching part is parallel to the orientation at the first position. If the switching part is adapted to rest at the second position while maintaining the tilted orientation, it is possible to make a smooth transition to or from a tilted state in the early stage, the main stage, and the final stage of the moving process. As a result, the fluid resistance is further reduced, and the operating speed is improved.

One method of maintaining the tilted orientation of the switching part at the second position is to form the supporting member of the driving means such that its elastic modulus becomes asymmetric about the center of gravitation of the switching part. Another method is to form the first and second electrodes such that the distance between the first and second electrodes becomes asymmetric. Still another method is to form the supporting post the switching part comes into contact with at the second position such that the distance between the supporting post and the switching part becomes asymmetric about the center of gravitation of the switching part.

BRIEF DESCRIPTION OF THE DRAWINGS

FIG. 1 is a cross-sectional view schematically illustrating the construction of an optical switching device according to a first embodiment of the present invention.

FIG. 2 is a cross-sectional view illustrating, in an enlarged fashion, the construction of the optical switching device shown in FIG. 1.

FIG. 3 is a graph illustrating the transmittance of an evanescent wave as a function of the distance between a total reflection plane and an extraction plane.

FIG. 4 is a schematic diagram illustrating the construction, seen from the side of a substrate, of a spring member of the optical switching device shown in FIG. 1.

FIG. 5 is a schematic diagram illustrating an example of a spring member different from that shown in FIG. 4.

FIG. 6 is a schematic diagram illustrating another example of a spring member different from that shown in FIG. 4.

FIG. 7 is a schematic diagram illustrating still another example of a spring member different from that shown in FIG. 4.

FIG. 8 is a schematic diagram illustrating an example of a projector using the image display device shown in FIG. 1.

FIG. 9 is a schematic diagram illustrating the construction of another optical switching device.

FIG. 10 is a graph illustrating the elastic force (spring fore) and the electrostatic force in the optical switching device shown in FIG. 1 as a function of the moving distance (displacement) of the switching part.

FIG. 11 is a timing chart illustrating the operation of driving the optical switching device shown in FIG. 1 by a driving voltage together with a varying bias voltage.

FIG. 12 is a schematic diagram illustrating an example of the construction of an optical switching device according to a second embodiment of the present invention.

FIG. 13 is a graph illustrating the driving power for driving the switching device shown in FIG. 12 wherein the driving power for the switching device shown in FIG. 1 is also shown for comparison.

FIG. 14 is a graph illustrating the elastic force (spring force) and the electrostatic force in the optical switching device shown in FIG. 12 as a function of the moving distance (displacement) of the switching part.

FIG. 15 is a timing chart illustrating the operation of driving the optical switching device shown in FIG. 12 by a driving voltage together with a varying bias voltage.

FIG. 16 is a schematic diagram illustrating an optical switching device using evanescent light according to a third embodiment of the present invention, wherein FIG. 16(a) illustrates an on-state in which the switching part is at a first position and FIG. 16(b) illustrates an off-state in which the switching part is at a second position.

FIG. 17 is a schematic diagram illustrating the structure of the switching part, seen from the side of the address electrode, of the optical switching device shown in FIG. 16.

FIG. 18 is a cross-sectional view illustrating a series of steps in the moving process from the on-state (first position) to the off-state (second position) in the optical switching device shown in FIG. 16.

FIG. 19 is a graph illustrating the distance between the address electrode and the base electrode of the optical switching device shown in FIG. 16 as a function of time, wherein FIG. 19(a) illustrates an on-to-off transition and FIG. 19(b) illustrates an off-to-on transition.

FIG. 20 is a schematic diagram illustrating another example of the construction of the optical switching device according to the third embodiment.

FIG. 21 is a schematic diagram illustrating still another example of the construction of the optical switching device according to the third embodiment.

FIG. 22 is a schematic diagram illustrating still another example of the construction of the optical switching device according to the third embodiment.

FIG. 23 is a schematic diagram illustrating still another example of the construction of the optical switching device according to the third embodiment.

FIG. 24 is a schematic diagram illustrating still another example of the construction of the optical switching device according to the third embodiment.

FIG. 25 is a schematic diagram illustrating still another example of the construction of the optical switching device according to the third embodiment.

FIG. 26 is a cross-sectional view of the optical switching device shown in FIG. 25.

FIG. 27 is a schematic diagram illustrating the optical switching device shown in FIG. 16, wherein the switching part is at rest in the second position in such a manner that the switching part is tilted with respect to a first direction.

FIG. 28 is a schematic diagram illustrating a modification of the optical switching device shown in FIG. 27.

FIG. 29 is a schematic diagram illustrating another modification of the optical switching device shown in FIG. 27.

FIG. 30 is a schematic diagram illustrating an optical switching device according to a fourth embodiment of the present invention, in which the center of gravitation is shifted.

FIG. 31 is a schematic diagram illustrating an optical switching device according to a fifth embodiment of the present invention, in which an address electrode is formed to be asymmetric in shape.

FIG. 32 is a schematic diagram illustrating a modification of the optical switching device according to the firth embodiment shown in FIG. 5.

FIG. 33 is a schematic diagram illustrating another modification of the optical switching device according to the firth embodiment shown in FIG. 5.

FIG. 34 is a schematic diagram illustrating still another modification of the optical switching device according to the firth embodiment shown in FIG. 5.

FIG. 35 is a schematic diagram illustrating an optical switching device including divided electrodes, according to a sixth embodiment of the present invention.

FIG. 36 is a schematic diagram illustrating an operating process in the optical switching device shown in FIG. 35, wherein a state in which the switching part is at the first position and a state just after the switching part started to move from the first position are shown.

FIG. 37 is a schematic diagram illustrating an operating process in the optical switching device shown in FIG. 35, wherein a state in which the switching part is in motion and a state in which the switching part comes to rest at the second position are shown.

FIG. 38 is a timing chart illustrating a process of controlling the optical switching device shown in FIG. 35.

FIG. 39 is a schematic diagram illustrating a modification of the optical switching device according to the sixth embodiment shown in FIG. 35, wherein a state in which the switching part is at the first position and a state just after the switching part started to move from the first position are shown.

FIG. 40 is a schematic diagram following FIG. 39 and illustrating a state in which the switching part is in motion and a state in which the switching part comes to rest at the second position.

FIG. 41 is a timing chart illustrating a process of controlling the optical switching device shown in FIGS. 39 and 40.

FIG. 42 is a schematic diagram illustrating an optical switching device using a piezoelectric device.

FIG. 43 is a schematic diagram illustrating a conventional optical switching device using a liquid crystal.

BEST MODE FOR CARRYING OUT THE INVENTION

First Embodiment

General Construction of Optical Switching Device

FIG. 1 illustrates in cross section the general construction of an optical switching device 1 acting as a spatial optical modulator according to the present invention and also the general construction of an image display device 2 constructed by disposing a plurality of optical switching devices 1 in a two-dimensional array fashion. FIG. 2 is a view mainly illustrating in an enlarged fashion a switching part of the optical switching device. In this optical switching device 1 according to the present invention, if the switching part 30 having a light transmissive extraction plane 32 is placed such that the extraction plane 32 is brought into contact with the total reflection plane 22 of a light guide 20 capable of totally reflecting input light 10 by its total reflection plane 22 thereby transmitting the input light 10, then evanescent light is extracted. The extracted light is reflected by the switching part 30 toward the light guide 20 and emitted to the outside as output light 11 through the output plane 21 of the light guide 20. In this optical switching device 1, the incident light 10 is modulated (turned on and off at a high speed in response to a small displacement of the switching part 30 equal to or smaller than a wavelength. To displace the switching part 30 in such a manner, the switching part 30 is driven by a driving part 40 by means of electrostatic force and spring force. The driving part 40 is controlled by electric power supplied from a controller 70. The light guide 20, the switching part 30, the driving part 40 for driving the switching part 30, and a silicon substrate 70 on which an integrated circuit for controlling the driving part 40 are each constructed in the form of layers disposed one on another.

That is, the optical switching device 1 of the present embodiment has a multilayer structure in which the respective functional parts are disposed one on another.

The construction of the optical switching device 1 is described in further detail below. The optical guide (light guide, cover glass) 20 of the optical switching device 1 is made of glass or transparent plastic which is highly transmissive to incident light 10. The incident light 10 is incident at a proper angle with respect to the total reflection plane 22 so that the incident light 10 is totally reflected by the total reflection plane 22. If the extraction plane 23 of the switching part 30 is placed at a position P1 (a first position or an on-position) which is in close proximity to or in intimate contact with the total reflection plane 32 so that evanescent light can be extracted, as is the case with a switching device 1a shown in FIG. 2, then the incident light 10 is extracted from the light guide 20 into the switching part 30. The switching part 30 includes a triangular microprism 34 serving as a light outputting member disposed such that the flat extraction plane 32 of the microprism 34 faces the total reflection plane 22 of the light guide. Light extracted through the basal plane or the extraction plane 32 is reflected by a reflection plane 34a of the microprism 34 in a direction substantially perpendicular to the total reflection plane 22. The reflected light passes through the light guide 20 and is output to the outside through the output plane 21.

On the other hand, if the switching part 30 is moved away from the first position such that the extraction plane 32 comes to a position (a second position or an off-position) apart from the total reflection plane 22 as is the case with a switching device 1b shown in FIG. 2, the incident light 10 is totally reflected by the total reflection plane 22 and thus no evanescent light is extracted from the light guide 20. In this case, no output light 11 is obtained.

FIG. 3 shows examples of transmittance of evanescent waves. If a transparent element is placed in close proximity to a plane at which light is totally reflected, leakage of an evanescent wave toward the transparent element occurs and thus light passes through the plane. The transmittance of the evanescent wave varies depending on the refractive index of a medium and the incidence angle. In FIG. 3, L1 is a transmission curve representing the evanescent wave transmittance (in %) plotted as a function of the distance (in $\mu$m) between the total reflection plane 22 and the extraction plane (transparent element) 32 for light with a wavelength $\lambda$ of 500 nm incident at 50°. Similarly, characteristic curves L2, L3, and L4 represent transmittance for light incident at 60°, 70°, and 80°, respectively. These characteristic curves have a similar tendency. That is, when the extraction plane 32 comes to a position (first position) as close as 0.1–0.05 $\mu$m or less to the total reflection plane 22, the transmittance becomes about 50%. On the other hand, if the extraction plane 32 moves to a position (second position) which is 0.2 $\mu$m or more apart from the total reflection plane 22, the transmittance drops to 10% or lower. If the extraction plane 32 further moves away until the distance from the total reflection 22 becomes greater than 0.3 $\mu$m, the transmittance becomes nearly equal to 0%. This means that transition between the on-state represented by the optical switching device 1a in FIG. 2 and the off-state represented by the optical switching device 1b can be achieved by moving the extraction plane 32 by a distance as small as 0.2 to 0.3 $\mu$m. Thus, it is possible to control pixels at a high speed using the optical switching device 1 of the present embodiment thereby obtaining an image with high contrast. Because the extraction plane 32 needs to be moved by only a small distance, electrodes for driving the switching part 30 having the extraction plane are allowed to be located close to each other. As a result, it is possible to reduce the driving voltage applied between the electrodes to generate electrostatic force for moving the switching part 30. Thus, it is possible to provide an image display device 2 capable of operating at a high speed with a low power consumption to display a high-contrast image.

Construction of Driving Part

The driving part 40 for driving the switching part 30 is described in further detail below. A base electrode 62 is disposed on the lower side of the switching part 30 such that the base electrodes 62 faces the silicon substrate 70. An electrode 60 is disposed on the upper surface of the silicon substrate 70 such that the electrode 60 opposes the base electrode 62. Electrostatic force is generated by the combination of these electrodes 60 and 62 thereby driving the switching part 30. The driving part 40 also includes yokes (supporting member) 50 formed of thin elastic films extending from posts 44 disposed in peripheral areas of the switching part 30 to the switching part 30. Thus, in the switching device 1 of the present embodiment, by the electrostatic force Fs generated by electrostatic driving means composed of a pair of electrodes 60 and 62 and the elastic force Fg of the yokes 50, the switching part 30 can be moved to the first position P1 represented by the switching device 1a and the second position P2 represented by the switching device 1b.

The switching part 30 which is moved in the above-described manner is supported by the yokes 50 via a spacer 42. The spacer 42 is generally T-shaped in cross section. More specifically, the central portion of the spacer 42 extends toward the surface 71 of the substrate 70 and there is a narrow gap (first space) between the lower surface 42a of the spacer 42 and the substrate surface 71. In contrast, the portions (peripheral portions) 42b on both sides of the spacer 42 is spaced more widely from the substrate surface 71. That is, there is a wide gap (second space) between the peripheral portions 42b and the substrate surface 71. The electrodes 62 and 60 are located opposite each other via the first space 45 which is narrow. In the second space 46 which is wide, there are disposed the yokes 50 serving as a spring member such that the spacer 42 is connected via the yokes 50 to posts 44 disposed at boundaries between adjacent switching devices 1 whereby the switching part 30 is elastically supported and positioned by the yokes 50 via the spacer 42.

As represented by the optical switching devices 1a and 1b in FIG. 2, the second space 46 formed by the T-shaped spacer 42 allows the spring member 50 in the form of a plate to be deformed. This allows the spring member 50 to be properly disposed without needing expansion of the gap (first space) between the electrodes 60 and 62. As a result, the distance between the electrodes 60 and 62 forming electrostatic driving means can be set to a small value which allows reductions in the driving voltage and power consumption.

Furthermore, by employing the T-shaped spacer 42, the second space 46 is formed below the prism 34, that is, below the switching part 30, and the spring member 50 can be disposed in this second space 46. This makes it possible to dispose all portions constituting the driving part 40 including the spring member 50 in the layer under the switching part 30, and thus the optical switching device 1 can be constructed in a multilayer fashion as described above. In this structure, because the spring member 50 is disposed in the layer of the driving part 40, there is no necessity for creating a space in the layer of the optical switching part 30 between adjacent optical switching devices 1a and 1b to dispose the spring member 50 therein. This makes it possible to increase the area of the prism 34. As a result, it is possible to obtain a high effective area ratio (aperture ratio) through which light is extracted from the light guide 20 and thus it is possible to provide a high-brightness optical switching device capable of outputting a large amount of light.

Furthermore, in the optical switching device 1 of the present embodiment, the posts 44 are disposed in the layer of the driving part 40 such that the switching part 30 is supported by the driving part 40. Therefore, it is not required that the light guide 20 have a structure formed by means of etching or the like for supporting the prism 34. In the structure of the present embodiment, therefore, the total reflection plane 22 of the light guide 20 becomes a flat plane opposing a plurality of optical switching devices 1. Thus, the light guide 20 can be constructed into a simple shape. Furthermore, because there is no spring member 50 in the switching part 30, spaces between adjacent switching parts 30 can be minimized. That is, the optical switching devices 1*a* and 1*b* can be disposed substantially without being spaced from each other. Therefore, by employing the optical switching device of the present embodiment, it is possible to provide an image display device 2 capable of forming a seamless or nearly-seamless image formed of pixels located close to each other substantially without being spaced from each other such that boundaries between adjacent pixels cannot be perceived.

Furthermore, in the optical switching device 1 of the present embodiment, when the optical switching device is in the on-state, the extraction plane of the microprism 34 is urged not by electrostatic force but by force of the spring member 50 into contact with the total reflection plane 22 of the light guide 20, as represented by the optical switching device 1*a*. In the on-state, the spring member 50 has a small displacement 51 that causes the prism 34 to be pressed against the total reflection plane 22. Although electrostatic force can be easily controlled by electric power, the electrostatic force which urges the extraction plane 32 against the total reflection plane 22 varies if the supplied voltage varies. As can be seen from FIG. 3, if the gap between the extraction plane 32 and the total reflection plane 22 increases to 0.1 to 0.15 $\mu$m owing to a reduction in the urging force due to a reduction in the voltage, the transmittance drops to 20% or lower and thus a reduction in the on-off contrast occurs. In contrast, because the force obtained by the spring member 50 is a mechanical force, it is stable regardless of variations in voltage. In the switching device 1 of the present embodiment, in view of the above, the on-state is obtained using stable driving force generated by the spring member 50, and the off-state is obtained using electrostatic driving force which can be easily controlled. This makes it possible to provide an optical switching device which can be controlled in a highly reliable fashion to stably output light.

Furthermore, the spring member 50 is set to have a displacement (bending) 51 in the on-state so that the extraction plane 32 is urged by force with a proper magnitude into contact with the total reflection plane 22. Thus, even if the gap between the light guide and the switching part or the gap between the optical switching part and the driving part varies owing to vibrations, a temperature change, or changes in other factors with time, the change in the gap does not result in a reduction in the on-off contrast. Furthermore, in the switching device 1 of the present embodiment, because the spring member 50 is disposed in the wide space 46 provided by the T-shaped spacer 42 as described above, the spring member 50 can be displaced within the space 46. The displacement 51 of the spring member 50 is preferably set to a value approximately equal to the gap in the off-state, that is, in the range from 0.1 to 0.2 $\mu$m.

In the present embodiment, the spring member 50 is made of a thin film 49 of boron-doped silicon such that the spring member 50 has electrical conductivity. The part of this thin-film 49 located in the wide space 46 serves as the spring member 50, whereas the part of the thin-film 49 in the narrow space 45 is fixed to the spacer 42 so that it serves as the electrode 62.

Construction of Supporting Member (Spring Member)

In the present embodiment, as described above, the driving part 40 of the optical switching device 1 is constructed of the supporting member (spring member or yoke) 50 having elastic force and the elastic driving means including the electrodes 60 and 62 such that the driving part 40 can drive the switching part at a high speed. Of these elements, it is important that the spring member 50 has a proper elastic modulus. If the elastic modulus is too great, a very large force is required to move the spring member 50 even by a small distance. Thus, a large electrostatic force is needed and a corresponding high driving voltage is required. Conversely, if the elastic modulus is too small, the spring member 50 cannot provide a force large enough to urge the extraction plane 32 of the prism 34 into contact with the total reflection plane 22. The desirable size of the optical switching device 1 used to form a pixel of the image display device 2 is several ten $\mu$m to several hundred $\mu$m. In such a micromachine, it is important that the effective length of the spring member 50 is maximized so as to minimize its elastic modulus. To this end, in the optical switching device 1 of the present embodiment, the spring member 50 is disposed in the wide space 46 provided by the T-shaped spacer 42 so as to achieve a large effective length. Furthermore, the width of the spring member 50 is reduced and the effective length is increased.

Furthermore, by forming the spring member 50 using the boron-doped silicon thin-film 49 which is electrically conductive, it becomes possible to use the spring member 50 also as the electrode 62. Alternatively, another electrically conductive thin-film such as an Al film, Pt film, or Ag film may also be employed to form the spring member 50 which also serves as the electrode.

FIG. 4 illustrates the driving part 40 of the optical switching device 1 of the present embodiment seen from below (seen from the side of the substrate 70). In order to form the spring member 50 having parts (shaded with vertical lines for clear illustration) radially extending from the posts 44 located at four corners toward the lower surface 42*a* of the spacer 42, the silicon thin-film 49 is cut so as to form large openings at boundaries with neighboring switching devices. The generally rectangular-shaped part of the silicon thin-film 49 remaining on the lower surface 42*a* serves as the electrode 62 (diagonally shaded for clear illustration). By forming the spring member 50 into the shape of a plate with a small width as described above, its effective length can be increased, and thus the driving voltage required can be reduced. When the spring member with such a small width is employed in the image display device, parts of the spring member at boundaries with adjacent optical switching devices can be small enough in width so that on-off operations of the optical switching devices forming the respective pixels do not interfere with one another.

FIG. 5 illustrates another example of a spring member 50 different from that described above. In this example, slits 58 are formed in a silicon thin-film 49 such that they radially extend from a spacer 42 toward the posts 44 thereby forming a long and narrow spring member 50 and also forming an expanded electrode 62a radially extending from the electrode 62 disposed on the lower surface of the spacer 42, thus expanding the area of the electrode 62. The expansion of the area of the electrode 62 makes it possible to drive the switching part 30 by a smaller driving voltage.

FIG. 6 illustrates still another example of a spring member 50 different from those described above. Of a plurality of optical switching devices 1 two-dimensionally arranged to form an image display device, four optical switching devices 1 seen from the side of the silicon substrate 70 are shown in FIGS. 6(a) and 6(b). In this example, slits 58 are formed in the silicon thin-film 49 such that they extend in directions parallel to the boundaries between adjacent optical switching devices 1 thereby forming spring members 50 each extending in a spiral fashion around the respective spacers 42, that is, along the boundaries of the respective optical switching devices 1. By employing the spring members 50 extending along the boundaries, it becomes possible to further increase the effective length of the each spring member 50, and it also becomes possible to expand the bottom surface 42a of each spacer 42 thereby allowing the area of each electrode 62 to be expanded. As a result of the above effects, it becomes possible to greatly reduce the driving voltage. In the example shown in FIG. 6(b), the length of each slit 58 is further increased so that each spring member 50 extends in a spiral fashion along two sides of boundaries of each switching device 1 thereby achieving a greater effective length of the spring member 50 and thus achieving a further reduction in the driving voltage. It is also possible to further increase the length of the slit 58 so as to obtain a spring member 50 with a greater effective length extending along boundaries.

FIG. 7 illustrates still another example of a spring member 50. In this example, the elastic modulus of each spring member 50 is reduced by reducing the thickness of central part 55 between the part directly connected with the spacer 42 and the part connected with the post 44 thereby making it possible to reduce the driving voltage required. Thus, the elastic modulus of the spring member 50 can be reduced by using any one of techniques described above or a combination of any of those techniques, thereby making it possible to reduce the driving voltage which is applied between the electrodes 60 and 62 to generate electrostatic force for moving the optical switching part 30. This allows the optical switching device 1 to operate with low electric power consumption, and thus the total power of the image display device 2 can be reduced.

In this embodiment, the optical switching device 1 is constructed in the form of a multilayer structure consisting of the light guide 20, the optical switching part 30, and the driving part 40 which are laminated in this order, wherein the optical switching part 30 is formed to be of a reflective type so that extracted light is output to the outside in the same direction as that in those parts are laminated, that is, toward the light guide 20, without passing through the driving part 40. Therefore, the driving part 40 can be designed without having to consider optical characteristics. This allows the driving part 40 to be designed to have an optimum structure in which all elements required for supporting and driving the optical switching part 30 are implemented. Thus, the optical switching part 30 and the light guide 20 can be constructed in very simple forms. Furthermore, the layers in which the light guide 20, the optical switching part 30, and the driving part 40 are respectively implemented can be designed independently of each other. More specifically, the light guide 20 can be constructed using an element in the form of a plate with a flat surface serving as the total reflection plane 22. The switching part 30 can be constructed using a light outputting member 34 such as a prism with a wide extraction plane 32. The driving part 40 can be constructed using a high-reliability mechanism capable of stably performing on/off operations at a high speed. Thus, the present invention can provide an optical switching device capable of dealing with a large amount of light without producing a loss, and also can provide an optical switching device capable of providing a high-quality image with high on-off contrast.

In the optical switching device 1 of the present embodiment, the driving part 40 may be produced on a silicon integrated circuit substrate on which circuits such as a driving circuit are formed. Such a production of the driving part 40 may be accomplished using a semiconductor processing technique such as an etching process suitable for microfabrication or a technique for producing a micromachine. Using such a technique, a high density of integration of a plurality of optical switching devices 1 may be easily realized. Thus, using optical switching devices according to the present invention, it is possible to provide a high-resolution image display device 2 in the form of a thin shape.

FIG. 8 illustrates a projector 6 using an image display device 2 according to the present invention. In this specific example, the projector 6 includes an integrated circuit chip 5 on which optical switching parts 30 and driving parts 40 as well as a driving circuit are formed is attached to the total reflection plane 22 of a light guide 2. The light guide 20 of the image display device 2 has a surface 81 through which light is input. Light rays of three primary colors, red, green, and blue (RGB), or cyan, magenta, and yellow are emitted from a light source toward the surface 1. In this example, the light source 80 includes a white metal halide lamp 80a and a three-color separation filter 80b rotated by a motor. After being color-separated through the three-color separation filter 80b, light rays are collimated through a collimator lens 80c and input into the light guide 20 through the incident surface 81. When the incident light 10 reaches the total reflection plane 22, it is reflected by the respective optical switching devices formed on the integrated circuit chip 5 and output as an output light 11 to the outside through the light guide 20. The output light 11 is projected through a projection lens 85 onto a screen or the like so as to form a desired image thereon. A part of the incident light 10 which were not converted by any optical switching device into the output light 11 is totally reflected toward a reflection plane 82 located opposite the incident surface 81. The light is reflected by the reflection plane 82 and transmitted again in the light guide 20 toward the optical switching devices.

In the present image display device 2, as described above, a color image is projected by operating the optical switching devices formed on the integrated circuit chip 5 in synchronization with the incident light which is input in a time division fashion. Alternatively, white light may be employed as the incident light 10, and a color image may be projected using optical switching devices having a light extraction part with wavelength selectivity.

FIG. 9 illustrates another example of an optical switching device according to the present invention. In this example, the optical switching device 1 also includes a light guide 20, an optical switching part 30, and a driving part 40 which are laminated in this order on the substrate of an integrated circuit 70. Herein, similar parts to those described above are denoted by similar reference numerals, and they are not described in further detail. In other embodiments which will be described later, similar parts will also be denoted by similar reference numerals and they will not be described in further detail.

In this example of the optical switching device 1, a thin film 49 extending between a post 44 and a spacer 42 and serving as both a spring member 50 and an electrode 62 is supported by an auxiliary post 40 extending from the light guide 20 such that distance between an extraction plane 32 and a total reflection plane 22 is maintained substantially uniform over the entire optical switching device 1. In this example, neither opening nor slit is formed in the thin film 49 so that the layer of the switching part 30 is hermetically enclosed between the thin film 49 and the light guide 20. The pressure in the switching part 30 is adjusted to be negative with respective to the ambient atmosphere so that the thin film 49 is brought into intimate contact with the auxiliary post 48 thereby ensuring that when an image display device 2 is formed by disposing a plurality of optical switching devices 1 into the form of a two-dimensional array, the distance between the thin film 49 and the total reflection plane 22, that is, the distance between the extraction plane 32 of the optical switching part 30 attached to the thin film 49 and the total reflection plane of the light guide 20, is maintained substantially uniform. As a result, switching is performed in a highly reliable fashion over all pixels of the image display device 2 composed of a plurality of optical switching devices 1, thereby ensuring that high contrast is obtained for all pixels. The auxiliary post 48 is not necessarily required to be disposed in all switching devices of respective pixels. Auxiliary posts 48 may be disposed for every proper number of switching devices or may be disposed at random locations.

Furthermore, because the pressure in the region in which the switching part 30 is disposed is adjusted to be negative, the extraction plane 32 of the optical switching part 30 is urged by the ambient pressure toward the total reflection plane 22. Therefore, in the optical switching device 1 in the present example, both the ambient pressure and the force provided by the spring member 50 are used to bring the extraction plane 32 into intimate contact with the total reflection plane 22 thereby ensuring high contrast.

Furthermore, in the optical switching device 1 in this specific example, the spacer 42 disposed between the spring member 50 and the prism 34 is formed into not a T-shape but an inverted trapezoidal shape. The inverted trapezoidal-shaped spacer 42 can also provide a wide space 46 in which the spring member 50 is disposed and a narrow space 45 in which the electrodes 60 and 62 are disposed.

Furthermore, in addition to the switching part 30, the driving part 40 may also be hermetically enclosed so that the entire region surrounded by the light guide 20 and the silicon substrate 70 is hermetically enclosed and so that the pressure in this region is adjusted to be negative. By reducing the pressure in this region, it becomes possible to reduce flow resistance against motion, in switching operations, of the prism 34, the spring member 50, and other elements of the optical switching part 30 and the driving part 40. As a result, resistance due to a damper effect or the like is greatly reduced. Thus, it becomes possible to increase the driving speed in the on-off operation and reduce the driving force required. As a result, it becomes possible to provide a switching device and an image display device capable of operating at a high speed with low power consumption. If the gas in the hermetically enclosed space described above is replaced with a gas containing no moisture, and if the pressure is adjusted to be negative with respect to the external pressure, it becomes possible to remove moisture which can result in adsorption. This is another advantage obtained in addition to those described above. If an inert gas is employed, alterations due to oxidation or the like can be avoided.

Controlling the Driving Part

The method of controlling the driving part 40 of the optical switching device according to the present embodiment is described in further detail below. As shown in FIG. 2, the switching device of the present embodiment has a stopper 65 disposed between the electrodes 60 and 62. When a driving voltage Vd is supplied to the electrode 60 from the driving control part 70 formed on the silicon substrate, and thus the switching part 30 is moved toward the second position P2 by an electrostatic force Fs generated between the electrodes 60 and 62, the switching part 30 is stopped by the stopper 65 at the position where the stopper 65 is located. This ensures that the electrodes 60 and 62 are spaced from each other by a proper distance (gap) G without being brought into intimate contact with each other. In addition to the effect of preventing the electrodes from colliding with each other when the switching part 30 moves, the stopper 65 also has the effect of preventing the electrostatic force from becoming infinite at the stopping position and thus allowing high-speed control using a low voltage, as will be described in further detail below.

FIG. 10 illustrates the relationship between the electrostatic force Fs and the elastic force (spring force) Fg in the driving part 40 of the present switching device 1. Electrostatic forces Fs obtained by driving voltages Vd of 10, 20, 30, 40, and 50 V are plotted. In the switching device 1 shown in FIG. 10, the distance between the electrodes 60 and 62 is 0.5 $\mu$m, and the stopper 65 is adjusted such that the distance between the electrodes 60 and 62 becomes equal to the gap G of 0.1 $\mu$m when the electrostatic force Fs is applied. The yoke 50 is adapted to have a displacement of 0.5 $\mu$m (initial displacement x0) at the first position P1. If the position of the switching part 30 is represented by the displacement x of the yoke 50, when the switching part 30 moves from the first position P1 to the second position P2 (the stopper position), the displacement x changes from the initial value x0 of 0.5 $\mu$m to 0.9 $\mu$m. That is, the switching part 30 moves by a distance do of 0.4 $\mu$m. As a result of this movement, an elastic force Fg given by equation (1) is generated. When the switching part 30 is in the range of do, if the driving voltage Vd is applied, the electrostatic force Fs varies with the distance d in the range of 0.5 $\mu$m as given by equation (2).

The driving voltage Vd required to move the switching part 30 from the first position P1 to the second position P2 is discussed below. In order to move the switching part 30 from the first position P1 to the second position P2 against the spring force Fg, it is required to apply a driving voltage Vd between the electrode 60 and 62 so as to generate an electrostatic force Fs which is always greater than the spring force Fg. This means that the driving voltage Vd should be so great that the electrostatic force Fs does not have equilibrium with the spring force Fg. In the example shown in FIG. 10, 50 V is required to generate an electrostatic force Fs without having equilibrium. Thus, if 50 V is applied as the driving voltage Vd, then the switching part 30 can be moved to the second position P2. However, in the present switching device 1, because the yoke (spring member) 50 has the initial displacement x0 set as a deformation 51 at the first position P1, the switching part 30 can be moved without causing any problem using a driving voltage Vd having an equilibrium point in the range where the displacement x is lower than the initial displacement x0. That is, because the electrostatic force Fs varies in inverse proportion to the square of the distance (d−x), if there is an initial displacement x0 and if the distance between the electrodes (d−x) is effectively smaller than the displacement x of the yoke, then a lower voltage may be employed as the driving voltage Vd. In the specific example shown in FIG. 10, 40 V may be employed as the driving voltage Vd. When the driving voltage Vd is equal to 40 V, the spring force Fg and the electrostatic force Fs become equal to each other at equilibrium points s1 and s2 within the range in which the displacement x is smaller than the initial displacement x0, and thus the switching part 30 stops at either equilibrium point. Therefore, 40 V cannot be employed as the driving voltage. However, if the displacement x is limited within a range grater than the initial displacement x0, then the electrostatic force Fs is always greater than the spring force Fs and thus there is no equilibrium point in this range. In this case, 40 V can be employed as the driving voltage Vd.

As described above, the introduction of the initial displacement x0 allows the switching part 40 to be stably maintained at the first position P1. Furthermore, the initial displacement x0 allows the driving voltage to be reduced from 50 V to 40 V.

Furthermore, the initial displacement x0 creates a spring force Fg at the first position P1. Therefore, a bias voltage Vb which creates an electrostatic force smaller than the above-described spring force Fg can be applied between the electrodes 60 and 62. For example, in FIG. 10, if 10 V is employed as the bias voltage Vb, then an electrostatic force Fs with a value denoted by B1 in FIG. 10 is created by this bias voltage Vb at the first position P1. Therefore, when the bias voltage Vb is applied, the difference Fk1 between the spring force Fg at the first position P1 and the electrostatic force Fs is exerted as a holding force on the switching part 30, and thus the switching part 30 is stably held at the point P1. When the bias voltage Vb is applied, if a driving voltage Vd equal to 30 V is further applied, then the electrostatic force Fs is generated by the overall voltage of 40 V, and thus the switching part 30 can be driven. This means that the driving voltage Vd can be further reduced by 10 V.

The bias voltage Vb may be applied in common to switching devices 1 forming the image display device 2 shown in FIG. 1. For example, when the reference voltage of the driving voltage Vd is equal to 0 V, and a high level of the driving voltage Vd is applied to the electrode 60 of the switching devices 1, if −10 V is applied to the base electrode 62 used in common for all switching devices 1, then this voltage applied to the base electrode 62 has the effect equivalent to +10 V applied to the electrode 60. That is, the bias voltage Vb equivalently equal in polarity to the driving voltage Vd can be applied. Instead, the driving control part (controller) 70 may be adapted to produce a bias voltage Vb which causes the reference voltage of the driving voltage Vd to increase by 10 V.

Furthermore, in the switching device 1 in this example, when the switching part 30 is at the second position P2, a gap G is produced by the stopper between the electrodes 60 and 62, whereby the electrostatic force Fs is prevented from becoming infinitely large. When the bias voltage Vb is set to 10 V, an electrostatic force Fs equal to a value denoted by C1 in FIG. 10 is created by the bias voltage at the second position P2. In this case, the electrostatic force Fs at the second position P2 is smaller than the spring force Fg. This means that when the driving voltage Vd is removed, the remaining electrostatic force created by the bias voltage Vb at the second position becomes smaller than the spring force Fg, and thus the switching part 30 is moved by the spring force Fg from the second position P2 to the first position P1. Therefore, also in the case where the bias voltage Vb is applied, it is possible to turn on and off the switching part 30 simply by controlling the driving voltage Vd.

When the electrostatic force created by the bias voltage Vb at the second point P2 is smaller than the spring force Fg as in this example, it is possible to continuously apply the bias voltage with a fixed value to all switching devices. This makes it very simple to control the bias voltage Vb. That is, it is possible to apply the bias voltage Vb without needing a complicated configuration for the controller 70, thereby making it possible to reduce the driving voltage Vd by a value equal to the bias voltage Vb. This allows the controller 70 to have a lower breakdown voltage and a simpler configuration. As a result, it becomes possible to reduce the size of the controller 70 and produce the controller 70 at low cost. Furthermore, the power supply voltage for the driving voltage can be reduced, and thus the power consumption can be reduced. On the other hand, the holding force Fk1 is large enough to stably hold the switching part 30 at the first position P1. Furthermore, because there is no need to change the moving length d0 of the switching part 30, it is possible to obtain sufficiently high contrast. Still furthermore, there is no need to change the elastic modulus K of the yoke 50, and thus the driving speed of the switching part 30 is maintained at substantially the same value. As can be seen from FIG. 10, because the electrostatic force Fs created by the bias voltage Vb quickly decreases in inverse proportion to the square of the distance, the application of the bias voltage Vb does not cause a significant change in the speed at which the switching part 30 moves from the second position P2 to the first position P1.

Now, a bias voltage equal to 20 V is discussed. At the first point P1, the electrostatic force Fs created by the bias voltage Vb (equal to 20 V) has a value denoted by B2 in FIG. 10. In this case, the holding force given by the difference between the electrostatic force Fs and the spring force Fg becomes equal to Fk2 which allows the switching part 30 to be stably held. On the other hand, the electrostatic force Fs required to drive the switching part 30 can be obtained by applying a driving voltage Vd equal to 20 V so that the overall voltage becomes 40 V. Therefore, it is possible to further reduce the driving voltage Vd by 10 V compared with the previous example. However, the bias voltage equal to 20 V causes the electrostatic force Fs at the second position P2 to become greater than the spring force Fg. As a result, the switching part 30 does not return from the second position P2 to the first position P1 when the driving voltage Vd is turned off. To move the switching part 30 from the second position P2, it is required to reduce the bias voltage to 0 V or a value, for example, 10 V, which allows the electrostatic force to become smaller than the spring force Fg. The change of the bias voltage Vb may be performed when the switching part 30 is moved from the second position P2 to the first position P1. Alternatively, the change of the bias voltage may be performed periodically in synchronization with a clock signal by which the switching part 30 is driven. The change in the bias voltage Vb at the first position P1 bring about no effects other than an increase in the holding force Fk2 which does not cause any problem. On the other hand, when the switching part 30 is held at the second position P2, the removal of the bias voltage Vb does not cause the switching part 30 to move because the driving voltage Vd is applied. In the case where the bias voltage Vb is changed periodically in synchronization with the clock signal or the like, changing the bias voltage Vb can be accomplished by equally changing the voltage of the base electrode 62 of a plurality of switching devices 1 disposed in the form of an array as shown in FIG. 1. Therefore, it is possible to further reduce the driving voltage Vd without needing a more complicated controlling circuit for controlling the bias voltage.

FIG. 11 is a timing chart illustrating an operation of controlling the switching part 30 by the driving voltage Vd and the bias voltage Vb. At time t1, if the bias voltage Vb is reduced from 20 V to 10 V and the driving voltage Vd is reduced to 0 V, then the switching part 30 is moved by the spring force Fg from the second position P2 to the first position P1. When the bias voltage Vb is increased from 10 V and 20 V at time t2, the switching part 30 is still held stably at the first position P1 because the spring force Fg at the first position P1 is still greater than the electrostatic force created by the bias voltage Vb of 20 V. When one clock period has elapsed from time t1, that is, at time t3, a driving voltage Vd of 20 V is applied, and the bias voltage Vb is reduced to 10 V at the same time. As a result, the electrostatic force Fs varies, at time t3, to a value created by a voltage difference of 30 V between the electrodes. Therefore, the switching part 30 remains at the same position. However, when the bias voltage Vb is increased at time t4, the voltage difference between the electrodes becomes equal to 40 V, and the electrostatic force Fs increases to a corresponding value. As a result, switching part 30 moves from the first position P1 to the second position P2. At time t5 after one clock period has elapsed from time t3, the driving voltage Vd becomes 0 V, and the switching part 30 moves from the second position P2 to the first position P1 in a similar manner as at time t1. By varying the bias voltage Vb at intervals equal to clock periods so that the electrostatic force at the second position P2 becomes smaller than the spring force Fg, the bias voltage Vb greater than the spring force Fg may be applied and it is possible to move the switching part 30 in response to the driving voltage Vd. Thus, this technique allows the driving voltage Vd to be reduced by an amount equal to the bias voltage Vb. Therefore, the controller 70 for controlling the driving voltage Vd can be formed in a still simpler fashion, and the controller 70 is allowed to have a lower breakdown voltage. Furthermore, the power supply voltage for the driving voltage can be reduced, and thus the power consumption can be reduced.

After that, at time t6, the driving voltage Vd goes to a high level, and, as a result, the switching part 30 moves to the second position. If the driving voltage Vd is maintained at the same value at time t7 after one clock period has further elapsed, a reduction in the bias voltage Vb occurring at the same time does not cause the switching part 30 to move because the 30 V is applied between the electrodes and thus the electrostatic force Fs is greater than the spring force Fg. If the driving voltage Vd is switched to 0 V at time t8, then the switching part 30 moves to the first position P1. In the case where no driving voltage Vd is applied at time t9 after one clock period has further elapsed, a change in the bias voltage Vb occurring at the same time does not cause the switching part 30 to move because the electrostatic force Fs at the first position P1 is smaller than the spring force Fg. As described above, in the case where the bias voltage Vb is increased and reduced periodically, the motion of the switching part 30 can also be controlled absolutely correctly by the driving voltage Vd. In this example, when the driving voltage Vd is switched to the high level, the motion of the switching part 30 is delayed by a period in which the bias voltage Vb is changed. However, the period of time during which the bias voltage should be at the changed value can be set to a very small period required for the switching part 30 to start moving, the delay does not cause a significant effect in displaying an image.

In this specific example, the bias voltage Vb is varied between 10 V and 20 V. Alternatively, the bias voltage Vb may be varied between 0 V to 20 V. However, because the electrostatic force Fs is prevented by the stopper 65 from becoming infinitely large at the second position P2, the switching part 30 can be moved, as described above, by reducing the bias voltage to 10 V so as to reduce the electrostatic force Fs to a value smaller than the spring force Fg. That is, by varying the bias voltage Vb between 10 V and 20 V, it becomes possible to simplify the circuit used to control the bias voltage, and it also becomes possible to reduce electric power consumed when the base voltage is varied.

The above described values for the driving voltage and the bias voltage were employed by way of example and not by way of limitation. Different values may be employed to achieve similar effects as long as they satisfy the conditions described above. Furthermore, the values employed herein for the driving voltage and the bias voltage were determined under the conditions assumed in FIG. 10, and thus the values which may be employed in this invention for the driving voltage and the bias voltage are not limited to those described above.

Second Embodiment

FIG. 12 illustrates another embodiment of an optical switching device 1 according to the present invention. In this embodiment, the optical switching device 1 also extracts an evanescent wave and outputs the extracted light as an output light 12. The optical switching device 1 includes a light guide 20, a reflective type optical switching part 30, a driving part 40, and a controller 70, which are disposed in this order into a multilayer structure. Herein, similar parts to those in the previous embodiment are denoted by similar reference numerals and they are not described in further detail. In this embodiment of the optical switching device 1, the driving part 40 includes a pair of electrodes 64 and 66 (E1) for moving the switching part 30 from a second position P2 to a first position P1 (hereinafter this pair of electrodes will be referred to as a first pair of electrodes) as well as a pair of electrodes 60 and 62 (E2) for moving the switching part 30 from the first position P1 to the second position P2 (hereinafter this pair of electrodes will be referred to as a second pair of electrodes). A horizontally oriented U-shaped cutout 38 is formed on each side wall of a buffer member 35 for supporting the prism on the spacer 42. An auxiliary post 47 extending from a post 44 extends into each space 38. An electrode 66 is fixed to the post 47 and an electrode 64 serving as a base electrode (common electrode) is fixed to each side of the buffer member 45. In this embodiment of optical switching device 1, electrostatic driving means including the first and second pairs of electrodes E1 and E2 performs both on-to-off and off-to-on switching operations. Therefore, it is possible to controls the operations in a stabler fashion. Thus, it is possible to provide an optical switching device 1 having higher reliability.

In the optical switching device 1 of the present embodiment, the yoke 50 is adapted to be brought into equilibrium at a center position P3 between the first position P1 and the second position P2, that is, the displacement x of the yoke 50 becomes equal to 0 at the center position P3. The switching part 30 is moved by an elastic force Fg provided by the yoke 50 from the first position P1 to the center position. After that, the switching part 30 is further moved to the second position P2 by an electrostatic force Fs provided by the second pair of electrodes E2 consisting of the electrodes 60 and 62. In an opposite direction, the switching part 30 is moved by the elastic force Fg from the second position P2 to the center position P3, and further to the first position P1 by an electrostatic force Fs provided by first pair of electrodes E1 consisting of the electrodes 64 and 66. At the first position P1, the electrostatic force Fs provided by the first pair of electrodes E1 serves as a holding force. When the switching part 30 is at the first position P1, the total reflection plane 22 serves as a stopper, and thus the distance between the electrodes 64 and 66 is controlled to have a gap G. This ensures that the electrostatic force Fs at the first position P1 is limited within a particular range as at the second position P2.

In the case of the system in which the yoke serving as the spring member 50 has an equilibrium state at the center position P3 between the first and second positions, the switching part 30 is moved by the first and second pairs of electrodes E1 and E2 of the driving part 40 from the center position to the first position P1 or to the second position P2, the stroke lengths of the driving operations performed by the respective pairs of electrodes E1 and E2 serving as the electrostatic driving means become one-half the distance d0 between the first and second position. Therefore, it is possible to reduce the length along which the electrostatic force is exerted by half without having to change the moving distance d0 of the switching part 30. As a result, as can be understood from equation (2), it is possible to reduce the distance d by half. Thus, it is also possible to reduce the driving voltage Vd for obtaining the same electrostatic force Fs by half Furthermore, because the electrostatic force Fs at the first position P1 can be used as the holding force, it is not required that the yoke 50 have an initial displacement x0 to provide a spring force Fg serving as a holding force. Therefore, an electrostatic force opposing the force corresponding to the initial displacement x0 also becomes unnecessary. As a result, it becomes possible to further reduce the driving voltage Vd.

Referring now to FIG. 13, the optical switching device 1 is described in further detail below. In FIG. 13, if the yoke has a displacement x equal to 0 at the first position P1, and a displacement x equal to 0.5 μm at the second position P2, this driving system does not have a holding force at the first position P1. The switching part 30 can be moved by the spring force Fg from the second position P2 to the first position P1. On the other hand, by applying an electrostatic force Fs having no equilibrium point with the spring force Fg over the range from the first position P1 to the second position P2, it is possible to move the switching part 30 from the first position to the second position P2. In the example shown in FIG. 13, if a driving voltage Vd equal to 20 V is applied, the switching part 30 can be moved against the spring force Fg. This situation corresponds to the case where, in the switching device described above with reference to FIG. 10, a sufficiently large holding force is not provided by the spring force Fg at the first position P1. That is, a driving voltage Vd equal to 20 V is required to drive the switching part 30 against the spring force which is too small as the holding force.

On the other hand, in the switching device 1 including two pairs of electrodes E1 and E2 according to the present embodiment, the core may have a displacement x equal to 0 at the center position P3 as represented by in square brackets and may have a displacement x equal to 0.25 at the first position P1 or the second position P2. The second pair of electrodes E2 consisting of the electrodes 60 and 62 moves the switching part 30 from the center position P3 to the second position P2 against the spring force Fg. Similarly, the first pair of electrodes E1 consisting of the electrodes 64 and 66 moves the switching part 30 from the center position P3 to the first position P12 against the spring force Fg. The manner in which the switching part 30 is driven is similar for the pairs of electrodes E1 and E2. Therefore, the operation is described herein for the pair of electrodes E2 by way of example. To move the switching part 30 from the center position P3 against the spring force Fg, it is required to apply a driving voltage Vd which produces an electrostatic force Fs having no equilibrium point in the range between the center position P3 and the second position P2. In this specific example, if 7 V is applied as the driving voltage Vd, the switching part 30 is moved from the center position P3 to the second position P2. Thus, in the switching device 1 of the present embodiment, the switching part 30 is driven by alternately applying a driving voltage Vd between the pair of electrodes E1 and the pair of electrodes E2. This allows the driving voltage Vd to be reduced from 20 V employed in the previous example to 7 V which is as small as one-third the previous value. The switching part 30 can also be moved from the center position P3 to the first position P1 by means of an electrostatic force Fs and can be held at the first position P1 by the electrostatic force Fs. Thus, a holding force for holding the switching part 30 at the first position P1 is obtained.

Also in this embodiment, the driving voltage Vd may be further reduced by applying a bias voltage in a similar manner as in the previous embodiment. FIG. 14 illustrates, in an enlarged fashion, the spring force Fg and the electrostatic force Fs shown in FIG. 13, wherein electrostatic forces Fs obtained by Vd=5 V and 2 V are also shown. When 2 V is applied as the bias voltage Vb between the electrodes 60 and 62 and also between the electrodes 64 and 66, if 5 V is applied as the driving voltage Vd at the center position P3, then an electrostatic force Fs is created by an overall voltage of 7 V. This means that the switching part 30 can be driven by applying a driving voltage Vd as small as 5 V. At the first position P1 and the second position P2, the spring force Fg is greater than the electrostatic force Fs created by the bias voltage Vb of 2 V. Therefore, the switching part 30 can be driven simply by turning on and off the 5 V driving voltage Vd. Because the two pairs of electrodes E1 and E2 are supplied with the same bias voltage Vb, the electrostatic forces Fs created by the bias voltage Vb are balanced at the center position P3. Therefore, in practice, the center position P3 does not vary. If the switching part 30 starts to move toward either position, the distance between the other pair of electrodes increases, and the electrostatic force Fs decreases in inverse proportion to the square of the distance. Therefore, once the switching part 30 starts to move such that the distance of either one of the pairs of electrodes decreases, the effect of the bias voltage Vb applied between the other pair of electrodes becomes negligible. The bias voltage Vb described above may be supplied by applying a voltage in common to both the base electrode 62 of the second pair of electrode E2 and the base electrode 64 of the first pair of electrodes E1 wherein the base electrodes 62 and 64 move together with the switching part 30. Applying a bias voltage with equivalently the same polarity as that of the driving voltage Vd may be accomplished by applying a voltage lower than the reference voltage of the driving voltage to both the base electrodes 62 and 64. More specifically, when the reference voltage of the driving voltage is 0 V, a bias voltage Vb equal to, for example, −2 V is applied in common to the base electrodes 62 and 64.

The bias voltage Vb may be increased to 4 V. In this case, if 3 V is applied as the driving voltage Vd, then an electrostatic force Fs is created by an overall voltage of 7 V. This means that the switching part 30 can be driven by applying a driving voltage Vd as small as 3 V. At the center position P3, the bias voltages Vb applied between the two pairs of electrodes are balanced. Therefore, only an electrostatic force Fs created by 3 V is effective at the center position P3. However, the spring force Fg at the center position P3 is equal to 0. Therefore, once the switching part 30 starts to move, the effect of the other pair of electrodes becomes negligible as described above and the switching part 30 can reach the first or second point without encountering equilibrium with the spring force Fg.

On the other hand, at the first position P1 and the second position P2, the electrostatic force Fs created by the bias voltage of 4 V is greater than the spring force Fg. Therefore, the switching part 30 does not start to move even if the driving voltage Vd is turned off. To make the switching part 30 start to move, it is required to decrease the bias voltage Vb, in synchronization with a clock signal, to 0 V or 2 V so that the spring force Fg becomes greater than the electrostatic force Fs. When the 4 V bias voltage Vb is decreased and increased in synchronization with the clock signal, if a driving voltage Vd equal to 3 V is alternately applied to the first and second pairs of electrodes, then the switching part 30 is moved. Thus, in the switching device 1 of the present embodiment, the driving voltage can be reduced from a very high value such as 50 V which is widely employed to 3 V which is low enough to be employed in a semiconductor circuit. This allows the controller 70 to be constructed in a very simple fashion. Furthermore, electric power consumed by the controller 70 can be greatly reduced.

FIG. 15 is a timing chart illustrating an operation of controlling the switching part 30 of the switching device 1 of the present embodiment, using the driving voltage Vd and the bias voltage Vb. At time t11, the bias voltage Vb is reduced from 4 V to 2 V, and the driving voltage Vd2 applied to the second pair of electrodes E2 serving to drive the switching part 30 toward the second position P2 is turned off (from 3 V to 0 V). As a result, the overall voltage between the second pair of electrodes E2 decreases from 7 V to 2 V, and thus the spring force Fg becomes greater than the electrostatic force Fs. As a result, the switching part 30 moves from the second position P2 toward the center position P3. At time t12, the driving voltage Vd1 applied to the first pair of electrodes E1 serving to drive the switching part 30 toward the first position P1 is turned on (from 0 V to 3 V), and the bias voltage Vb is increased to 4 V. As a result, the overall voltage between the first pair of electrodes E1 becomes 7 V, and thus the switching part 30 is moved to the first position P1 and held at that position. At this time, the bias voltage Vb causes the second pair of electrodes E2 to have an overall voltage of 4 V. However, the electrostatic force Fs created by the second pair of electrodes E2 is substantially negligible, because the distance between the second pair of electrodes E2 become large.

At time t13, after one clock period has elapsed from time t11, the bias voltage Vb is reduced from 4 V to 2 V, and the driving voltage Vd1 applied to the first pair of electrodes E1 is turned off. As a result, the switching part 30 starts to move from the first position P1 toward the center position P3. At time t14, the driving voltage Vd2 applied to the second pair of electrodes E2 is turned off, and the bias voltage Vb is increased to 4V. As a result, the overall voltage between the second pair of electrodes E2 becomes 7 V, and thus the switching part 30 is moved to the second position P2 and held at that position.

At time t15, after one clock period has elapsed from time t13, the bias voltage Vb is reduced and the driving voltage Vd2 is turned off. Subsequently, the driving voltage Vd1 is turned on. In response, the switching part 30 moves from the second position P2 to the first position P1. In this situation, when the bias voltage Vb is reduced at time t16 after one clock period has elapsed from time t15, if the driving voltage Vd1 is at the off-level, then the switching part 30 is still held at the first position P1 because the overall voltage between the first pair of electrodes E1 is equal to 5 V at this time. On the other hand, if, at time t17, the driving voltage Vd1 is turned off and subsequently the driving voltage Vd2 is turned on, the switching part 30 moves to the second position. After that, when the bias voltage Vb is reduced from 4 V to 2 V at times t18 and t19 in synchronization with the clock signal, the switching part 30 is maintained at the second position P2 because the driving voltage Vd2 is at the on-level. If the driving voltage Vd2 is turned off at time t20 and if the driving voltage Vd1 is subsequently turned on, the switching part 30 moves from the second position P2 to the first position P1.

In the switching device 1 of the present embodiment, as described above, the switching part 30 can be moved by changing the driving voltage Vd between 0 V and 3 V. In this method, the bias voltage is required only to be changed between 2 V and 4 V at intervals equal to clock periods. In the switching device 1 of the present embodiment, therefore, the voltage required to drive the switching part 30 can be greatly reduced to a level which allows the switching part 30 to be driven by a battery of a widely used type. Correspondingly, it also becomes possible to drive the image display device including a plurality of switching devices shown in FIG. 1 by a voltage as low as can be supplied by a battery. The reduction in the driving voltage makes it possible to reduce the voltage levels controlled by the controlling circuit. Furthermore, it is allowed to reduce the breakdown voltage of the controlling circuit. Thus, it becomes possible to use a conventional semiconductor integrated circuit to directly drive the switching device and the image display device including switching devices. Furthermore, the power supply voltage is allowed to be low, and thus the power consumption can be greatly reduced. On the other hand, the characteristics of the switching device, such as the elastic modulus of the yoke 50, the moving length of the switching device, the ability of holding the switching part 30 at the on-position, etc., are maintained. Thus, it is possible to provide a high-contrast, high-speed, and high-reliability switching device at low cost. Furthermore, by disposing such switching devices into the form of an array, it becomes possible to provide an image display device capable of displaying a high-resolution and high-brightness image at a high speed with low power consumption at low cost.

The driving method disclosed herein may be applied not only to optical switching devices using an evanescent wave but also to various types of spatial light modulation devices in which incident light is modulated or the polarization orientation or the phase of the incident light is changed by changing the position of a switching part, such as a spatial light modulation device in which a flat-plane element serving as a switching part is moved in a parallel direction, a spatial light modulation device in which the angle of a flat-plane element is varied to turn on and off light as is in a micro mirror device, etc.

Controlling the Attitude of the Switching Part

Second Embodiment

FIG. 16 illustrates another optical switching device 2 different from those described above. Also in the optical switching device of the present embodiment, optical switching operation is performed using an evanescent wave. Similar parts to those in the previous embodiments are denoted by similar reference numerals and they are not described in further detail here. Also in the optical switching device 1 of the present embodiment, if the extraction plane 32 of a switching part 30 comes to a position (first position), which is parallel to a total reflection plane 22 (facing in a first direction) and which is close to the total reflection plane 22, or which is in intimate contact with the total reflection plane 22, as shown in FIG. 16(*a*), and if, as a result, it becomes possible for the extraction plane 32 to extract evanescent light, then incident light 10 is extracted from a light guide 20 into the switching part 30. The extracted light is then output as output light 11 to the outside via a microprism 34 in a substantially vertical direction. If the switching part 30 moves away from the first point and the extraction plane 32 comes to a position (second position) apart from the total reflection plane 22 as shown in FIG. 16(*b*), the incident light 10 is totally reflected by the total reflection plane 22 and thus no light is extracted as evanescent light from the light guide 20. Therefore, no output light 11 is obtained.

The motion of the switching part of the optical switching device is controlled by electrostatic driving means of a driving part 40 wherein the electrostatic driving means includes an electrode and a yoke realized by a spring member. In the optical switching device of the present embodiment, the switching part is designed to move in an asymmetrical fashion about the center of the switching part. To this end, the yokes 50 and 52 on the left and right sides, respectively, of the figure are formed to be different from each other in the terms of the material, the thickness, and/or the width.

FIG. 17 illustrates an example in which the yokes 50 and 52 are different from each other in width. In FIG. 17, the structure of the switching part 30 seen from below (from the side of the driving part 40) is shown. The switching part 30 having a generally rectangular and symmetric shape is supported by posts 44 via yokes 50 and 52 radially extending in four directions symmetric about the geometric center 14*a*. If a geometric center line 14 is assumed to extend in a vertical direction in the figure through the geometric center 14*a* of the optical switching device 1, two yokes 50 disposed in the region 12*a* left to the geometric center line 14 and two yokes 52 disposed in the region 12*b* right to the geometric center line 14 are equal in terms of the material and thickness but different in terms of the width. More specifically, the width W of the yokes 50 is smaller than the width W of the yokes 52. As a result, the yokes 50 and 52, which are parts of the driving part 40 and which serve to elastically support the switching part 30, are different from each other in elastic force or in spring modulus. More specifically, the elastic force in the region 12*a* on the left is smaller than that in the region 12*b* on the right side. That is, in the present optical switching device, the switching part 30 is supported by the yokes (supporting members) 50 and 52 whose elastic modulus is different between the left and right regions. On the other hand, the switching part itself is symmetric in shape in a left-to-right direction, and thus the geometric center 14*a* and the center of gravitation 14*b* are coincident with each other. Thus, the switching part 30 is supported by supporting members having an elastic modulus asymmetric in the left-to-right direction about the center of gravitation. As a result, when electric power is supplied between the electrodes 62 and 60 serving as the electrostatic driving means of the driving part 40 to drive the switching part 30 by means of electrostatic force, forces different between left and right regions are exerted on the switching part 30. As a result, when the switching part 30 moves in response to the forces, the attitude of the switching part 30 is not maintained parallel to the total reflection plane 22 but becomes tilted.

FIG. 18 illustrates various steps through which the switching part 30 in the present example moves in a tilted fashion. In FIG. 18(*a*), the switching part 30 shown in FIG. 16(*a*) is at the first position. At this first position, the extraction plane 32 of the switching part 30 is in contact with the total reflection plane 22 of the light guide 20, and the extraction plane 32 faces in a first direction A, that is, upward direction in the figure. That is, at the first position, the optical switching device 1 is in an on-state in which output light 11 is output. When the switching part 30 is at the first position, no electric power is supplied from the power supply 61 to the electrodes 62 and 60 of the driving part 40, and the switching part 30 is urged by elastic forces generated by the yokes 50 and 52 against the total reflection plane 22 of the light guide 20 so that the extraction plane 32 is maintained in substantially intimate contact with the total reflection plane 22.

If electric power is supplied to the electrodes 62 and 60 of the driving part 40 by turning on the power supply 61, then an electrostatic force is generated between the electrodes 62 and 60, and the switching part 30 is drawn toward the electrode 60 on the substrate 60, as shown in FIG. 18(*b*). In this example, because the electrode 62 of the switching part 30 and the electrode 60 on the substrate 70 are formed to be symmetric in area, shape, and distance about the geometric center line 14, an electrostatic force symmetric in the left-to-right direction is exerted on the switching part 30. However, elastic forces produced by the yokes 50 and 52 against the electrostatic force are different between the left and right sides because there is a difference in the elastic modulus due to the difference in the width between the yokes 50 and 52. Thus, the resultant driving force exerted on the switching part 30 becomes different between the regions left and right to the geometric center line 14. As a result, in an early stage of the moving process in which the switching part 30 moves from the first position toward the second position as shown in FIG. 18(*b*), the driving force in the left region 12*a* is greater than that in the right region 12*b*. As a result, the part of the switching part 30 in the left region 12*a* starts to move earlier, and the part in the right region 12*b* starts to move later. Thus, the extraction plane 32 tilts with respect to the first direction A in the early stage of the moving process.

After the extraction plane 32 started to tilt, the extraction plane 32 gradually separates from the total reflection plane 22 starting from the left portion, and a space 17 is created between the extraction plane 32 and the total reflection plane 22 as shown in FIG. 18(*b*). A fluid present around the switching part 30, that is, air 16 in this specific example, flows into the space 17. In this way, the switching part 30 starts to move in a direction X opposite to the first direction A toward the second position. After the switching part 30 started to move, the space 17 gradually expands to the right and becomes great in size, and air 16 flows into the expanding space 17. In the case where the switching part 30 starts to move with the extraction plane 32 tilting as described above, the space created between the extraction plane 32 and the total reflection plane 22 in the early stage is very small in volume, and thus the volume of air flowing into the space is very small. As a result, air resistance is very small. However, if the switching part 30 starts to move with the extraction plane 32 facing in the first direction A and being maintained parallel to the total reflection plane 22, a very large space is created in the early stage of the moving process because the entire extraction plane 32 separates at the same time from the total reflection plane 22, and a very large volume of air flows into the space. In this case, a very large air resistance occurs. In the present example, to avoid such a problem, the orientation of the extraction plane 32 is tilted with respect to the first direction A in the early stage of the moving process thereby reducing the air resistance. This allows a reduction in the driving force required in the early stage of the moving process, and the time required for the switching part 30 to start to move can be reduced.

In the optical switching device 1 using an evanescent wave in the present example, if a small gap is created between the extraction plane 32 and the total reflection plane 22, and if the orientation of the extraction plane 32 changes, then the amount of extracted evanescent light drastically decreases to a very low level, and the direction of the output light changes. Therefore, a quick transition occurs from an on-state in which output light is output in a predetermined direction to an off-state in which no output light is output or output light is output in a different direction. That is, the tilting of the extraction plane 32 in the early stage of the moving process allows a great increase in the speed of transition from the on-state to the off-state.

The switching part 30 is tilted with respect to the forward direction X during the movement as shown in FIG. 18(b). As a result, the switching part 30 moves forward while the lower surface of the switching part 30, that is, the electrode 62, is tilted against the fluid present in front of the electrode 62 in the moving direction X. Thus, air 16 flows smoothly along the surface, tilted with respect to the moving direction, of the electrode 62 of the switching part 30. As a result, the air resistance is small. On the other hand, if the switching part 30 is moved while maintaining the orientation of the extraction plane 32 in the first direction A and thus maintaining the electrode 62 perpendicular to the moving direction X, air 16 is compressed between the electrodes 62 and 60 and a great air resistance occurs. As described above, air resistance which occurs during the movement can be reduced by tilting the extraction plane 32 of the switching part 30 thereby increasing the moving speed.

FIG. 18(d) illustrates a second state in which the switching part 30 shown in FIG. 16(b) has come to rest at a position closest to the electrode 60 on the substrate. In the optical switching device 1 in the present example, when the switching part 30 is at this second position, the extraction plane 32 faces in the direction A as at the first position. However, in the final stage of the moving process just before the switching part 30 stops at the second position, the extraction plane 32 is still tilted with respect to the first direction A as shown in FIG. 18(c). The space between the electrodes 62 and 60 gradually decreases in volume starting from the region 12a left to the geometric center line 14. As the space 17 gradually decreases in volume from left to right, air between the electrodes 62 and 60 smoothly flows into the right region 12b and further into an outside region from the space between the electrodes 62 and 60. Thus, also in the final stage of the moving process, the resistance caused by the fluid (air) 16 present between the electrodes 62 and 60 becomes very small, and therefore the switching part 30 can quickly reach the second position. Furthermore, the low air resistance in the final stage of the moving process allows the switching part 30 to stop at the final position in a stable fashion.

In the optical switching device 1 in the present example, if the electrostatic force produced between the electrodes 62 and 60 is eliminated by turning off the power supply 61, the elastic force provided by the yokes 50 and 52 of the driving part 40 makes the switching part 30 move from the second position shown in FIG. 18(d) to the first position shown in FIG. 18(a). In this process, the yokes 52 in the right region 12b produce an elastic force greater than the yokes 50 in the left region 12a. As a result, the right portion of the switching part 30 receives a greater driving force, and thus the extraction plane 32 is tilted to the left in the figure with respect to the first direction A at the start of the movement. Then, the switching part 30 moves from the second position to the first position passing reversely through the steps shown in FIGS. 18(a) to 18(d). Therefore, also in the process in which the switching part 30 moves from the second position to the first position, the resistance of air present around the switching part 30 can be reduced, and thus the moving speed can be enhanced. In the optical switching device 1 in the present example, as described above, when the switching part 30 moves in either direction in the on-off operation (modulating operation), the switching part 30 first tilts with respect to the first direction A and starts to separate. Then the switching part 30 moves while maintaining the tilted attitude. Before resting in the final position, the orientation of the switching part 30 changes toward the first direction A. Thus, in any step during the moving process, the switching part 30 receives a small resistance against air 16, and can move at a high speed. As a result, it is possible to provide an optical switching device or a spatial optical modulation device capable of responding at a high speed.

FIG. 19 illustrates the moving time of the present optical switching device 1, wherein the moving time of an optical switching device in which the switching part 30 is not tilted during the moving process is also shown for the purpose of comparison. FIG. 19(a) shows the distance (gap) d between the electrodes 60 and 62 as a function of switching time (elapsed time) in the process in which the switching part 30 moves from the first position to the second position, that is, in the process in which the on-state is switched into the off-state. In the case where the extraction plane 32 of the switching part 30 always faces in the first direction A during the entire moving process and the electrode 62 is maintained parallel to the electrode 60 during the entire moving process, the switching part 30 receives the electrostatic force Fs given by equation (2) described earlier, the elastic force Fg of the yokes 50 and 52 given by equation (1) described earlier, and the air resistance force Fs which is dominant in this case, and thus the switching part 30 moves along a curve 91a denoted by an alternating long and short dashed line.

In contrast, in the optical switching device 1 in the present example, the air resistance force Fa is reduced as described above and a large electrostatic force Fs is exerted on the switching part 30. As a result, the elapsed time T decreases by ΔT1 (=t2−t1) as represented by a solid line 90a, and an increase in the moving speed or the response speed of the switching part 30 is achieved.

FIG. 19(b) illustrates the moving process in which the switching part 30 is moved from the second position to the first position, that is, the off-state is switched into the on-state. When the switching part 30 moves from the second position to the first position, no electrostatic force Fs is exerted but the elastic force Fg provided by the yokes 50 and 52 and the air resistance force Fa are exerted on the switching part 30, as described above. In the case where the switching part 30 is moved while maintaining its orientation in the first direction A, a large air resistance force Fa is exerted on the switching part 30, and the switching part 30 moves along an alternating long and short dashed line 91b.

In contrast, in the optical switching device 1 in the present example, because the air resistance force Fa is reduced, the moving time is reduced by ΔT2 (=t5−t4) as represented by a solid line 90b. Thus, the optical switching device 1 in the present example has an improved moving speed for both the on-to-off transition and the off-to-on transition and, therefore, has an improved overall response speed.

As described above, the response speed can be increased by tilting the extraction plane 32 thereby reducing the air resistance when the switching part 30 is moved from the first position to the second position or in the opposite direction. The tilting of the switching part 30 during the moving process can be accomplished by exerting a driving force asymmetric about the center of gravitation of the switching part 30 upon the switching part 30. To this end, in the present example, the yokes 50 and 52 in the regions left and right, respectively, to the geometric center line 14 passing through the center of gravitation 14b are formed to be different in width so that they have different spring moduli thereby achieving asymmetry in the elastic force exerted by the left and right yokes 50 and 52 upon the switching part 30. However, the factors which may be employed to vary the spring modulus of the yokes are not limited to the width of the yokes. For example, it is possible to adjust the spring modulus by varying the thickness U of the yokes 50 and 52 as shown in FIG. 20. In the example shown in FIG. 20, the yoke 50 in the region 12a left to the geometric center line 14 has a thickness U smaller than the yoke 52 in the region 12b right to the geometric center line 14 so that the yoke 50 has a smaller spring modulus than the yoke 52, as in the previous example. Thus, also in the optical switching device 1 shown in FIG. 20, the switching part 30 operates in a similar manner as the previous example, and, therefore, the response speed is improved.

Instead of varying the spring modulus of the yokes 50 and 52 by varying the width W or the thickness U of the yokes 50 and 52 thereby varying the cross section of the yokes, the spring modulus may also be varied by varying the material quality of the yokes 50 and 52 as shown in FIG. 21. In the optical switching device 1 shown in FIG. 21, the yoke 50 in the left region 12a and the yoke 52 in the right region 12b are formed of materials having different spring moduli. More specifically, when a boron-doped silicon film is employed as the material, the boron concentration may be varied or another impurity may be doped so as to vary the spring modulus. Instead of the silicon film, another thin film such as an organic resin thin-film may also employed as a yoke material to achieve a different spring modulus.

Another technique of varying the spring modulus of the left and right yokes 50 and 52 is, as shown in FIG. 22, to stick an additional thin film of the same or different material as or to the material of the yoke to one of the yokes 50 and 52. In the optical switching device 1 shown in FIG. 22, the yoke 52 in the right region 12b is formed of two layers 52a and 52b whose material is different from each other, whereas the yoke 50 in the other region 12a is formed of a single material. By this technique, it is possible to adjust the spring modulus of the yokes 50 and 52 disposed on the left and right sides, respectively, so that the switching part 30 can be moved in a tilted fashion.

In the examples described above, the spring modulus of the yokes 50 and 52 is varied to obtain asymmetry in the elastic force exerted on the switching part 30. Alternatively, the yokes 50 and 52 on the left and right sides may be disposed at different locations so that the spring modulus becomes asymmetric about the center of gravitation 14b of the switching part 30.

FIG. 23 corresponds to FIG. 17 and represents the optical switching device 1 in which one yoke 50 is disposed in the region 12a left to the geometric center line 14 and two yokes 52 are disposed in the right region 12b. In this technique, because the yokes 50 and 52 are disposed such that a greater number of yokes are disposed in the right region 12b than in the left region 12a, the elastic force in the right region 12b becomes greater than in the left region 12a. The distribution of the elastic force asymmetric in the left-right direction allows the switching part 30 to be tilted with respect to the first orientation (direction) during the moving process, and thus a low air resistance is obtained, as in the previous examples.

FIG. 24 illustrates an example in which yokes 52 are disposed only in the region 12b right to the geometric center line 14 and no yoke is disposed in the left region 12a such that the switching part 30 is supported by the yokes 52 disposed in the right region 12b. In this optical switching device 1, because the switching part 30 is elastically supported only in the right region 12b, a driving force asymmetric about the geometric center line 14 is exerted on the switching part 30. Therefore, as in the previous examples, the switching part 30 is tilted in the early and final stages of the moving process, and thus the air resistance becomes low during the moving process. Thus, it is possible to provide an optical switching device 1 with a high response speed.

In FIG. 24, yokes are disposed only in one region 12b on one side of the geometric center line. Herein, the number of yokes 50 or 52 is not limited to the value employed in this specific example, and the shape and the material thereof are not limited to those employed in the above example. For example, the switching part 30 may be supported by one yoke. FIGS. 25 and 26 show an example in which the switching part 30 is supported by one yoke. In this example, the switching part 30 is supported by a single yoke 50 disposed in a region 12a opposite to the region employed in FIG. 24. Also in this example, the driving force becomes asymmetric about the geometric center line 14, and thus the switching part 30 is tilted during the moving process.

In any example described above, the electrodes 62 and 60 becomes parallel to each other and the extraction plane 32 faces in substantially the same direction as the first direction A as shown in FIGS. 16(b) or 18(d) when the switching part 30 is at the second position which is the possible closest limit to the electrode 60. Alternatively, the extraction plane 32 may have an angle with respect to the first direction A when the switching part 30 is at the second position.

FIG. 27 shows an example in which the switching part 30 becomes tilted in the final stage of the moving process, and remains in the tilted state after the switching part 30 comes to rest at a position where the electrostatic force Fs provided between the electrodes 62 and 60 is balanced with the elastic force Fg of the yoke 52. That is, the yokes 50 and 52 of the optical switching device 1 in the present example are formed such that the spring modulus of the yoke 50 in the left region 12a is smaller than the spring modulus of the yoke 52 in the right region 12b so that when the electrostatic force Fs is applied, the portion of the switching part 30 in the left region 12a is stopped by the stopper 65 such that the electrode 62 comes into close proximity to the electrode 60 whereas balance of force for the portion of the switching part 30 in the right region 12b is achieved before the electrode 62 comes in close proximity to the electrode 60. As a result, the switching part 30 comes at rest in a tilted position.

If the switching part 30 is at rest in such a tilted position, the time required to move the switching part 30, in the final stage of the moving process, from the tilted position to a position where the electrode 62 becomes parallel to the electrode 60 becomes unnecessary. Furthermore, in the early stage of the moving process, there is no need for the time to separate the electrode 62 from the electrode 60 into the tilted position. At the second position, the extraction plane 32 is not required to be parallel to the total reflection plane 22. The tilted attitude at the second position cause no problem associated with the performance of the optical switching device (spatial optical modulation device). Because the switching part 30 is in the tilted position when it starts to move, the switching part 30 can quickly move without encountering a large air resistance. As described above, by placing the switching part 30 in the tilted fashion at the second position, the air resistance during the moving process can be reduced and the time required to move the orientation of the switching part 30 can be deleted. As a result, the response time can be reduced. Thus, it is possible to provide an optical switching device capable of operating at a very high speed.

FIG. 28 illustrates another example of an optical switching device 1 in which the switching part 30 is adapted to come to rest in a tilted state at the second position. To this end, in this example, the optical switching device has left and right stoppers 65a and 65b for supporting the switching part 30 at the second position wherein the stoppers 65a and 65b are formed to be different in height so that the stroke of the switching part 30 becomes asymmetric in a left-to-right direction about the geometric center line 14 of the switching part 30. If such stoppers 65a and 65b different in height are disposed, the right portion of the electrode 62 of the switching part 30 comes into contact with the stopper 65b before the left portion comes into contact with the stopper 65a. As a result, the switching part 30 is tilted. This ensures that the switching part 30 is always tilted at the second position even if the yokes 50 and 52 or the electrodes 62 and 60 are symmetric in the left-to-right direction, and thus the air resistance becomes small when the switching part 30 starts to move from this state or when the switching part 30 comes to rest into this state in the final stage of the moving process. As a result, the moving time of the switching part 30 is reduced. Thus, it is possible to provide an optical switching device capable of responding at a high speed. As in the previous examples, the stopper 65a or 65b serves to prevent the electrode 62 of the switching part from directly coming into contact with the electrode on the substrate thereby preventing those electrodes from being short-circuited and also preventing those electrodes from becoming impossible to be separated from each other owing to adherence due to an electric charge.

FIG. 29 illustrates an optical switching device 1 in which a stopper 65c is disposed on only one side of the electrode 60 on the substrate. In stead of forming the stoppers 65 to have a height asymmetric between the left and right sides about the center of gravitation (geometric center line) of the switching part 30, the locations of the stoppers 65 may be asymmetric in the left-to-right direction about the geometric center line 14 so that the switching part 30 can come to rest in a tilted state at the second position. In the case where the stoppers 65 are formed to be asymmetric, there is a possibility that the electrode 62 and the electrode 60 come into contact with each other. Thus, in the present example, the outer surface of the electrode 62 is coated with an insulating layer 69 to prevent the electrode 62 and the electrode 60 from coming into direct contact with each other.

Fourth Embodiment

In the above examples, in order to exert a driving force asymmetric about the center of gravitation of the switching part 30 thereby moving the switching part 30 in a tilted fashion, the spring modulus or the location of the yoke 50 or 52 is adjusted so as to obtain an asymmetric distribution of electric force. Alternatively, the center of gravitation 14b of the switching part 30 may be shifted to a location which causes the driving force to become asymmetric about the center of gravitation 14b.

FIG. 30 illustrates an optical switching device 1 in which a weight (balance) is added to the part of the switching part 30 left to the geometric center line 14 such that the center of gravitation 14b is shifted to a point in the left region 12a. In the present optical switching device 1, because the center of gravitation 14b is at a point shifted to left from the geometric center line 14 passing through the geometric center 14a, the mass is different between the left and right regions 12a and 12b. If the switching part 30 is designed to move in a vertical direction, the difference in mass between the left and right regions 12a and 12b results in a difference in acceleration of gravity, that is, a difference in weight. Therefore, even when there is no difference in elastic force Fe and electrostatic force Fs between the left and right regions 12a and 12b, a greater weight in the left region 12a causes the switching part 30 to tilt during the moving process as in the previous embodiment. In the case where the optical switching device 1 is placed such that the switching part 30 moves in a horizontal direction, a difference in acceleration during the moving process occurs owing to the difference in mass upon which the elastic force Fe and the elastic force Fs are exerted. As a result, also in this case, the switching part 30 moves in a tilted fashion.

Thus, also in the optical switching device 1 in this example, the switching part 30 is tilted during the early stage, the main stage, and the final stage of the moving process, and thus the resistance of the fluid (air in most cases, but may be an inert gas such as nitrogen) present around the switching part 30 becomes small. Therefore, it is possible to provide an optical switching device capable of responding at a high speed as in the previous embodiments.

Fifth Embodiment

It is also possible to make the distribution of the driving force exerted upon the switching part 30 asymmetric about the center of gravitation 14b by adjusting the distribution of the electrostatic force Fs thereby ensuring that the switching part 30 is tilted when it moves. As described earlier, the electrostatic force Fs varies in proportion to voltage V and the area of electrodes and in inverse proportion to the square of the distance between the electrodes. Therefore, it is possible to obtain an asymmetric electrostatic force by making any of these factors asymmetric about the center of gravitation 14b.

FIG. 31 corresponds to FIG. 17 described earlier. In FIG. 31, an electrode 62 having a shape asymmetric in the left-to-right direction about the geometric center line 14 is disposed on the lower surface 37 of a switching part 30 so that the electrostatic force Fs becomes asymmetric about the center of gravity 14b. More specifically, the electrode 62 in this example has a generally trapezoidal shape with a greater area in the left region 12a than in the right region 12b. As a result, the electrostatic force generated in the left region 12a becomes greater than that generated in the right region 12b. Therefore, when the switching part 30 is moved from the first position to the second position using the electrostatic force, the portion of the switching part 30 receiving a greater magnitude of electrostatic force first starts to move, and thus the switching part 30 moves in a tilted fashion as in the previous embodiments. On the other hand, in the movement from the second position to the first position, no electrostatic force is exerted on the switching part 30 of the optical switching device 1 in the present embodiment. Therefore, if the elastic forces generated by the yokes 50 and 52 are equal for the left and right regions, then the switching part 30 moves while maintaining its attitude substantially parallel.

If the shape of the electrode 62 of the switching part is different from the shape of the lower surface 37 of the switching part 30, it becomes difficult to electrically connect the electrode 62 to the yokes 50 and 52 via which electric power is supplied to the electrode 62. In the present embodiment, to avoid the above problem, a connecting electrode 62t is formed along an edge of the lower surface 37 of the switching part 30, and the electrode 62 is electrically connected to the yoke 52 via the connecting electrode 62t.

FIG. 32 illustrates another example having an electrode 62 whose area is different between the regions 12a and 12b left and right to the geometric center line 14. In this optical switching device 1, the electrode 62 of the switching part is generally T-shaped. A generally rectangular-shaped electrode 62a with a size slightly greater than the lower surface 37 is disposed on the lower surface 37 in the left region 12a, and a square-shaped electrode 62b continuously extending from the electrode 62a and having an area approximately one-half that of the electrode 62a is disposed at the center of the right area of the lower surface 37 in the right region 12b. In the present example, and also in other example in which the electrode 62 is formed to be asymmetric in shape and in area about the geometric center line 14 of the switching part 30 so that the electrostatic force generated by the electrode 62 becomes different between the left area 12a and right area 12b, the switching part 30 can be moved in a tilted fashion as described above. This makes it possible to provide an optical switching device having a low air resistance and capable of responding at a high speed. Instead of the electrode 62 of the switching part, the electrode 60 on the substrate may be asymmetric in shape, or both electrodes 62 and 60 may be asymmetric in shape, so as to achieve an asymmetric electrostatic force distribution.

FIG. 33 illustrates an example in which, instead of forming the electrode 62 or 60 in an asymmetric shape, the electrodes 62 and the electrodes 60 are formed such that the distance d between the electrode 62 and the electrode 60 becomes asymmetric about the geometric center line 14. In this specific example of optical switching device 1, the electrode 62b in the right region 12b has a greater thickness than the electrode 62a in the left region 12a. As a result, when the switching part 30 is in the on-state at the first position, the distance d between the electrode 60 and the electrode 62b in the right region 12b is smaller than the distance d in the left region 12a. Therefore, when electric power is supplied between the electrode 62 and the electrode 60, the electrostatic force in the right region 12b becomes greater than that in the left region 12a. Thus, in the present example of optical switching device, when the switching part 30 moves from the first position to the second position, separation occurs first in the right region 12b, as opposed to the previous examples, and the switching part 30 moves in a tilted fashion, On the other hand, when the switching part 30 reaches the second position in the final stage of the movement, the electrode 62b with the greater thickness in the right region first collides with the electrode 60 and then the electrode 61a in the left region collides with the electrode 60. Thus, the switching part 30 comes to rest in a state in which the switching part 30 is tilted to a direction different from that in the early stage of the movement. When the switching part 30 moves from this second position to the first position, the electrostatic force is turned off and thus the switching part 30 moves to the first position by means of the elastic force provided by the yokes 50 and 52. In this moving process, because the switching part 30 is in the tilted state at the second position, the tilted orientation is maintained during the early stage and the following moving process. When the switching part 30 reaches the first position, the extraction plane 32 of the switching part 30 collides with the total reflection plane 22 of the light guide 20. As a result, the orientation of the switching part 30 changes from the tilted direction to a direction in which the switching part 30 comes in intimate contact with the total reflection plane 22. Thus, the switching part 30 comes into the on-state.

In this example of the optical switching device 1, as described above, the switching part 30 is tilted in the early stage, the main stage, and the final stage of the movement and comes to rest in the tilted state at the second position. As a result, a high moving speed and a short on-off switching time can be achieved. Thus, it is possible to provide an optical switching device capable of responding at a high speed.

In this example, as described above, the electrode 62 is formed so as to have a thickness different between the left and right regions, and the switching part 30 stops when the electrode 62 collides with the electrode 60. This can cause a problem of a short circuit or the like due to a direct contact between the electrode 62 and the electrode 60. To avoid the above problem, the electrode 62 is coated with an insulating material 69 so as to prevent the electrodes 62 and 60 from coming into direct contact.

FIG. 34 illustrates an example in which, instead of the electrode 62 of the switching part, the electrode 60 on the substrate is formed so as to have an asymmetric thickness. More specifically, in this example of the optical switching device 1, the electrode 60b in the region 12b right to the geometric center line 14 has a greater thickness than the electrode 60a in the left region 12a. Therefore, as in the example described above with reference to FIG. 16, when the switching part 30 is at the first position, the distance d between the electrode 60 and the electrode 62 in the right region 12b is smaller than in the left region 12a, and thus a greater electrostatic force is generated in the right region 12b than in the left region 12a. As a result, switching part 30 tilts and starts to move while maintaining the tilted state, as in the previous example.

When switching part 30 stops at the second position, the switching part 30 collides with the electrode 60 whose height is different between the left and right regions and tilts owing to the height difference of the electrode 60. Thus, the switching part 30 comes to rest in the tilted state. Therefore, also in this example, when the switching part 30 moves from the second position to the first position, the switching part 30 moves while maintaining the tilted state. Thus a reduced air resistance is obtained in both directions, and, therefore, an improvement in the response speed is achieved.

Sixth Embodiment

In the previous embodiment, an asymmetric electrostatic distribution is obtained by forming the electrode 62 or 60 such that the shape thereof or the distance therebetween becomes asymmetric. A driving force asymmetric about the center of gravitation of the switching part 30 may also be exerted on the switching part 30 by controlling the timing of applying an electrostatic force.

FIG. 35 illustrates an optical switching device 1 in which the electrode 62 of the switching part 30 is divided into two parts 62a and 62b so that an electrostatic force may be applied at times different between the regions 12a and 12b left and right to the geometric center line 14. In this example, the electrode 62 is divided along the geometric center line 14 into two electrodes 62a and 62b which are symmetrical to each other about the geometric center line 14. By supplying electric power to the electrodes 62a and 42b at different times, a driving force having a distribution asymmetric about the geometric center line 14 can be exerted on the switching part 30.

FIGS. 36 and 37 schematically represent the operation of the present example of optical switching device 1. FIG. 38 is a timing chart representing the operation (control) of supplying electric power from power supplies 61a and 61b to the respective electrodes 62a and 62b. When no electric power is supplied from the power supplies 61a and 61b to the left and right electrodes 62a and 62b, the switching part 30 is urged by the yokes 50 and 52 of the driving part 40 such that the extraction plane 32 is in an on-state (at the first position) in which the extraction plane 32 is in intimate contact with the total reflection plane 22 as shown in FIG. 36(a).

When the power supply 61a is turned on at time t31 thereby supplying electric power to the electrode 62a in the left region 12a, an electrostatic force is generated in the left region 12a. When the electrostatic force reaches a certain magnitude at time t12, the switching part 30 starts to move in a tilted fashion as shown in FIG. 36(b). As a result of the tilting of the extraction plane 32 with respect to the total reflection plane 22, a gap (space) 17 is created and thus the switching part 30 comes into an off-state. As the space 17 gradually increases in volume, air 16 smoothly flows into the space 17, and thus the switching part 30 quickly moves without encountering a large air resistance.

When the power supply 61b is turned on to supply electric power to the electrode 62b in the right region 12b at time t33 after time T10 has elapsed since time t31, an electrostatic force is exerted on the switching part 30 also in the right region 12b. As a result, the switching part 30 tilted at a certain angle further receives a separation force in the right region and moves toward the second position while maintaining the angle as shown in FIG. 37(a). Because the tilted angle of the switching part 30 with respect to the moving direction is maintained during the movement, the air resistance becomes small and thus the switching part 30 can move at a high speed. This allows the switching part 30 to respond at a required speed with reduced electrostatic force. That is, the optical switching device 1 can be driven with less electric power consumption.

When the switching part 30 approaches the electrode 60 toward the second stopping position as shown in FIG. 37(b), the switching part 30 comes into a substantially parallel state from the tilted state in the final stage of the movement from FIG. 37(a) to FIG. 37(b). Thus, during this final stage of the movement, air between the electrode 60 and the electrode 62 is smoothly transferred to the outside thereof Therefore, also in this example of optical switching device 1, as described above, the switching part 30 is in the tilted state in the early, intermediate, and final stages of the movement, and thus the response speed can be further improved and the driving power of the optical switching device can be reduced.

In the process of moving the switching part 30 from the second position to the first position, if electric power to the electrode 62b in the right region 12b is turned off at time t14, the electrostatic force in the right regions 12b is eliminated and the switching part 30 is tilted by the elastic force provided by the yoke 52 and the switching part 30 starts to move. When the electric power to the electrode 62a in the left region 12a is turned off at time t35 after time T11 has elapsed since t14, the switching part 30 moves from the second position toward the first position while maintaining the properly tilted angle. When the switching part 30 reaches the first position at time t36, the extraction plane 32 becomes parallel to the total reflection plane 22 and comes into intimate contact with the total reflection plane 22. Thus, the optical switching device 1 in the present example comes into the on-state in which incident light is modulated and output as output light.

In the optical switching device 1 in the present example and also in those according to the previous embodiments, as described above, the switching part 30 can be moved at a high speed from the on-position to the off-position and from the off-position to the on-position within a fluid ambient such as air or inert gas thereby achieving a spatial optical modulation device capable of responding at a high speed with low power consumption without needing a vacuum ambient.

FIGS. 39 and 40 illustrate an example in which the electrode 60 on the substrate is divided into left and right portions. FIG. 41 is a timing chart representing the process of supplying voltages to the electrodes 60a and 60b in the left and right regions wherein the voltages are varied in magnitude with time. In the present example of the optical switching device 1, as shown in FIG. 30(a), the electrode 60 is divided into electrically isolated electrodes 60a and 46b in the left and right regions 12a and 12b left and right to the geometric center line 14, so that electrostatic forces generated in the regions 12a and 121b can be controlled by separately controlling electric power supplied from the power supply 61 to the respective electrodes. To this end, the power supply 61 includes a power supply unit 61a connected to the left electrode 60a and a power supply unit 61b connected to the right electrode 60b. Furthermore, there is provided a control unit 61c for controlling the voltages supplied from the respective power supply units 61a and 61b to the electrodes 60a and 60b. Also in the present optical switching device 1 as in the previous example, when no electric power is supplied to the electrodes 62 and 60, the switching part 30 is maintained in the off-state at the first position by the elastic force provided by the yokes 50 and 52.

At time t41, a voltage V1 is supplied from the power supply unit 61a to the left electrode 60a thereby supplying electric power thereto, and a voltage V2 is supplied from the power supply unit 61b to the right electrode 60b thereby supplying electric power thereto, wherein the voltage V1 supplied to the left electrode 60a is set to a value greater than the voltage V2 supplied to the right electrode 60b so that a greater electrostatic force is exerted on the switching part 30 in the left region 12a than in the right region 12b. As a result, the driving force becomes asymmetric in the left-to-right direction about the center of gravitation 14b of the switching part 30. Thus, the switching part 30 starts to tilt and move as shown in FIG. 39(b). That is, the extraction plane 32 separates starting from the left region 12a and thus it tilts. Thus, also in the present optical switching device 1 as in the previous embodiments, the switching part 30 can be moved smoothly without encountering a large air resistance.

Furthermore, at time t42, substantially equal voltages V3 are supplied to the left and right electrodes 60a and 60b from the power supply unit 61a and 61b under the control of the control unit 61c, thereby moving the switching part 30 to the second position while maintaining the properly tilted angle, as shown in FIG. 40(a). When the electrode 62 collides with a stopper 65e, the switching part 30 stops at the second position as shown in FIG. 40(b). In this final stage of the movement, the switching part 30 comes into a parallel state from the tilted state in a similar manner as in the previous embodiments, and air is quickly removed from the space and the switching part 30 finally comes to rest. In the present optical switching device 1, the electrodes 60a and 60b on the substrate are formed in a non-flat shape having a protruding part 65e serving as the stopper thereby preventing the electrode 62 of the switching part from coming into intimate contact with the electrode 60a or 60b on the substrate.

When the switching part 30 is moved from the second position to the first position, the electric power to the right base electrode 60b is turned off at time t43 and the electric power to the left base electrode 60a may be gradually reduced as shown in FIG. 41 so that the right part of the switching part 30 in the region 12b immediately starts to move by means of the elastic force provided by the yoke 52 whereas the electrostatic force generated between the base electrode 60a and the electrode 62 and exerted on the left part of the switching part 30 in the region 12a gradually decreases. Therefore, also when the switching part 30 starts to move from the second position, the switching part 30 is first tilted to a proper angle, and then it is moved toward the first position while maintaining the tilted state. Thus, also in the movement from the second position to the first position, a reduction in air resistance is achieved and the switching part 30 can be moved at a high speed.

The optical switching devices 1 described above operate as a spatial optical modulation device capable of turning on and off incident light. A single optical switching device 1 may be utilized in a separate fashion, or a plurality of optical switching devices may be disposed in an array fashion so as to obtain various devices such as an image display device for use in various applications such as an optical communication, optical operation, optical recording, etc. By tilting the switching part from the orientation in the on-state at the start of the moving process, it is possible to greatly reduce the resistance of the fluid present around the switching part. This allows the spatial optical modulation device according to the present invention to be used in air or an inert gas ambient such as a nitrogen ambient. Thus, the spatial optical modulation device can operate at a high speed and respond at a high speed in a highly reliable fashion. The reduction in the fluid resistance allows a reduction in electric power required to drive the spatial optical modulation device.

The method of controlling the attitude disclosed herein may be applied not only to optical switching devices using an evanescent wave but also to various types of spatial optical modulation devices in which incident light is modulated by moving a flat plane element corresponding to the extraction plane of the switching part so as to vary the interference characteristics, or by varying the polarization direction or the phase of reflected light.

Although in the above-described embodiments, the yokes formed of the thin film are used as the elastic member, an elastic member in another form such as a coil spring may also be employed. Furthermore, also in the above-described embodiments, the driving part is realized in the form of a combination of the supporting member (yoke or spring member) for the elastic support and the electrostatic driving means. A piezoelectric device may also be employed as a driving source for driving the switching part. FIG. 42 illustrates an example in which a piezoelectric element 99 is employed. In this optical switching device 1, instead of a microprism, a reflective type light outputting member 36 including a plurality of reflecting elements is employed as the optical switching part 30. In this optical switching device 1, therefore, evanescent light captured by the extraction plane 32 in the on-state is scattered by the light outputting member 36 at proper angles toward the light guide 20. This makes it possible to form an image which can be seen from a wide range of viewing angles.

In the present optical switching device 1, the driving source for driving the switching part 30 uses electrostriction produced by the piezoelectric element 99 instead of electrostatic force. The piezoelectric element 99 employed in the present example is of the bimorph type including two layers which have different polarization directions and which are disposed in the form of a two-layer structure. When electric power is applied to the piezoelectric element 99, it stretches into a straight form from a bent state, and thus the yoke or the spring member 50 is drawn by the piezoelectric element 99. As a result, the optical switching device 1 is turned off. If the electric power is turned off, the piezoelectric element 99 goes into the bent state in which an elastic force is generated by the piezoelectric element 99. In this state, the optical switching part 30 is urged by the elastic force provided by the piezoelectric element 99 and the yoke 50 toward the light guide 20. Thus, an optical switching device with a high contrast can be obtained.

Because the optical switching device 1 according to the present invention is formed in the multilayer structure consisting of the layer of the light guide 20, the layer of the switching part 30, and the layer of the driving part 40, it is possible to flexibly combine an optical switching part 30 and a driving part 40 according to any of embodiment disclosed above so as to realize an optical switching device suitable for use in a particular application. The application of the optical switching device according to the present invention is not limited to image display devices but may be applied to a wide variety of applications such as a line-shaped light valve for use in an optical printer, an optical spatial modulator for use in a three-dimensional hologram memory, and applications in which conventional optical switching devices using a liquid crystal are currently employed. In particular, the optical switching device according to the present invention is suitable for use in devices which require an optical switching device capable of operating at a higher speed and capable of outputting a higher intensity of light than can be achieved by conventional optical switches using a liquid crystal. The optical switching device according to the present invention may be produced by a microfabrication technique into a form smaller in size and thickness and higher in integration density than can be achieved in the conventional optical switching devices using a liquid crystal.

In the optical switching device according to the present invention, as described above, the extraction plane is brought into contact with the light guide having the total reflection plane capable of totally reflecting light thereby transmitting the light, so that evanescent light leaking through the total reflection plane is captured thereby forming an image. The light guide, the reflective type optical switching part, and the driving part are laminated in this order so as to realize an optical switching device capable of reflecting the extracted light by the optical switching part in a substantially vertical direction toward the light guide thereby outputting high intensity light without creating a loss in the driving part. The employment of the multilayer structure allows the respective layers of the light guide, the optical switching part, and the driving part to be separately designed into optimum forms. Furthermore, layers having various different functions and structures may be arbitrarily combined into the multilayer structure. In particular, by positioning the optical switching part the driving part and forming a space in which the elastic spring member is disposed, it becomes possible to form the light guide into a flat shape and it also becomes possible to increase the area of the extraction plane of the optical switching part. This makes it possible to provide a high-brightness and high-contrast optical switching device with a large aperture ratio. Using such an optical switching device according to the present invention, it is possible to provide an image display device capable of forming a high-quality image.

Furthermore, by applying a bias voltage with a value within a proper range which allows the switching part to be held at the on-position, the driving voltage can be reduced without causing degradation in the characteristics of the switching part. Furthermore, by forming a two pairs of electrodes for creating electrostatic force, the driving voltage can be further reduced by several-tenths or one order of magnitude. This allows the switching part to be moved at a high speed. Thus, it is possible to provide a spatial optical modulation device which can be driven by a low voltage and which can respond in a short time, that is, can respond at a high speed.

Such a great reduction in the driving voltage allows the switching device or the image display device to be directly driven by a semiconductor controlling device. As a result, the cost of the switching device and the image display device can be greatly reduced. Furthermore, the reduction in the driving voltage allows a great reduction in the power consumption of the switching device and the image display device. Therefore, it becomes possible to employ a power source having a limitation in output power such as a battery to drive the high-speed switching device using an evanescent wave and the image display device. Thus, the optical switching device capable of extracting an evanescent wave by moving the switching part thereby modulating light according to the present invention is very useful in various applications.

Furthermore, by tilting the orientation of the extraction plane or the flat plane element at the first position from the first direction, it is possible to reduce the resistance of air or fluid such as an inert gas present around the switching part. This allows a reduction in the force required to move the switching part against the resistance. Therefore, it becomes possible to move the switching part at a still higher speed using electrostatic force or the like. Thus, it is possible to provide a spatial optical modulation device capable of responding at a high speed. The reduction in the force required to move the switching part against the resistance also allows a reduction in the power consumption. As a result, it is possible to provide an optical switching device capable of responding at a high speed under common environmental conditions such as in air.

Industrial Applicability

The optical switching device according to the present invention is capable of operating at a high speed and providing a high contrast. This allows the optical switching device according to the present invention to be used in a wide variety of applications such as an image display device, a line-shaped light valve for use in an optical printer, an optical spatial modulator for use in a three-dimensional hologram memory, etc. The optical switching device according to the present invention is not only applicable to applications in which conventional optical switching devices using a liquid crystal are currently employed, but also advantageously applicable in particular to devices which require a higher speed and a higher intensity of light than can be achieved by conventional optical switches using a liquid crystal.

What is claimed is:

1. An optical switching device comprising:
   a light guide including a total reflection plane capable of totally reflecting light thereby transmitting the light;
   a switching part including a light-transmissive extraction plane capable of extracting evanescent light leaking through said total reflection plane and reflecting the extracted light toward said light guide; and
   driving means for moving said switching part to a first position at which said extraction plane is within an extraction range which allows an evanescent light to be extracted and a second position at which said extraction plane is out of said extraction range,
      wherein said light guide, said switching part, and said driving means are disposed in this order in a direction in which light is output, and
      wherein said driving means includes:
         a supporting member for elastically supporting said switching part; and
         electrostatic driving means for driving said switching part by an electrostatic force acting between at least one pair of electrodes, and
      wherein when no electrostatic force is generated by said electrostatic driving means, said supporting member is capable of pressing said switching part at said first position toward said light guide.

2. An optical switching device according to claim 1, wherein said light guide, said switching part, and said driving means are placed one on another into the form of a multilayer structure.

3. An optical switching device according to claim 1, wherein said light guide is a member in the form of a flat panel including no structure on the total reflection plane.

4. An optical switching device according to claim 1, wherein said driving means is disposed on an integrated circuit substrate.

5. An optical switching device according to claim 1, wherein said switching part includes a microprism or a light-dispersive light outputting member for reflecting light extracted through said extraction plane.

6. An optical switching device according to claim 1, wherein said supporting member is a spring member adapted to have a residual deformation when said switching part is at said first position.

7. An optical switching device according to claim 1, wherein said switching part is supported by said supporting member via a spacer, said spacer serving to reduce the distance between said electrodes and provide a space in which said supporting member is allowed to be elastically deformed.

8. An optical switching device according to claim 7, wherein said supporting member is a spring member in the form of a plate one end of which is supported by a post disposed near a boundary of said switching part, and the other end of which is connected to said switching part, and wherein said spacer is T-shaped or inverted trapezoidal-shaped in cross section.

9. An optical switching device according to claim 8, wherein said spring member has a slit or an opening formed near said boundary.

10. An optical switching device according to claim 8, wherein said spring member is in the form of a plate having a small width and radially extending from said switching part, said one end of the spring member being connected to said post disposed near the boundary.

11. An optical switching device according to claim 8, wherein said spring member is in the form of a plate including a part extending in a spiral fashion along said boundary.

12. An optical switching device according to claim 8, wherein said spring member is in the form of a plate with a reduced thickness central part.

13. An optical switching device according to claim 8, further comprising an auxiliary supporting member for supporting said spring member from the side of said light guide,
  wherein said spring member is in the form of a plate which allows the side where said switching part is disposed to be substantially hermetically enclosed, and wherein the side where said switching part is disposed has a lower pressure than the side where said driving means is disposed.

14. An optical switching device according to claim 8, wherein the inside of said optical switching device includes a hermetically enclosed space, said driving means being disposed in said hermetically enclosed space such that said driving means is capable of driving said switching part in an ambient with a low pressure.

15. An optical switching device according to claim 8, further comprising a plurality of posts disposed at regular intervals or at random near said boundary.

16. An optical switching device according to claim 8, wherein said spring member is an electrically conductive member and at least a part of said electrically conductive member also serves as an electrode of said electrostatic driving means.

17. An optical switching device according to claim 1, further comprising driving control means for applying to said electrostatic driving means a driving voltage for driving said switching part and a fixed bias voltage which is equal in polarity to said driving voltage and which provides a holding force capable of stably holding said switching part at least at said first position by means of electrostatic force or elastic force.

18. An optical switching device according to claim 17, further comprising a stopper for assuring a minimum gap between said electrodes at one of said first and second positions at which the holding force is provided by said driving voltage,
  wherein said driving control means applies said bias voltage which produces a force smaller than the elastic force of said supporting member at the position of said stopper.

19. An optical switching device according to claim 17, wherein said driving control means periodically applies said bias voltage which produces an electrostatic force smaller than the elastic force provided, at said first or second position, by said supporting member.

20. An optical switching device according to claim 19, further comprising a stopper for assuring a minimum gap between said electrodes at one of said first and second positions at which the holding force is provided by electrostatic force generated by said electrostatic driving means, and
  wherein said driving control means periodically applies said bias voltage which produces a force smaller than the elastic force of said supporting member at the position of said stopper.

21. An optical switching device according to claim 17, wherein said switching part is moved by said supporting member from the second position to the first position and held at the first position by the elastic force of said supporting member,
  and wherein said driving control means applies a driving voltage to said electrostatic driving means when said switching part is moved from said first position to said second position, said driving voltage resulting in no equilibrium only in the range between said first and second positions.

22. An optical switching device according to claim 17, wherein:
  said supporting member is capable of supporting said switching part at a substantially central position between said first and second positions when no electrostatic force is exerted on said switching part;
  said electrostatic driving means includes a first pair of electrodes for holding said switching part at said first position and a second pair of electrodes for holding said switching part at said second position; and
  said driving control means alternately applies a driving voltage to said first and second pairs of electrodes.

23. An optical switching device comprising:
  a light guide including a total reflection plane capable of totally reflecting light thereby transmitting the light;
  a switching part including a light-transmissive extraction plane capable of extracting evanescent light leaking through said total reflection plane and reflecting the extracted light toward said light guide; and
  driving means for moving said switching part to a first position at which said extraction plane is within an extraction range which allows an evanescent light to be extracted and a second position at which said extraction plane is out of said extraction range,
    wherein said light guide, said switching part, and said driving means are disposed in this order in a direction in which light is output, and
    wherein said driving means includes:
      a supporting member for elastically supporting said switching part; and
      electrostatic driving means for driving said switching part by an electrostatic force acting between at least one pair of electrodes, and
    wherein said supporting member is capable of moving said switching part from said second position to said first position by means of elastic force and holding said switching part at said first position,
    and wherein said optical switching device further comprises driving control means for applying a driving voltage to said electrostatic driving means when said switching part is moved from said first position to said second position, said driving voltage resulting in no equilibrium only in the range between said first and second positions.

24. An optical switching device according to claim 1, wherein:
  said supporting member is capable of supporting said switching part at a substantially central position between said first and second positions when no electrostatic force is exerted on said switching part;
  said electrostatic driving means includes a first pair of electrodes for holding said switching part at said first position and a second pair of electrodes for holding said switching part at said second position; and
  said optical switching device includes driving control means for alternately applying a driving voltage to said first and second pairs of electrodes.

25. An optical switching device comprising:
a light guide including a total reflection plane capable of totally reflecting light thereby transmitting the light;
a switching part including a light-transmissive extraction plane capable of extracting evanescent light leaking through said total reflection plane and reflecting the extracted light toward said light guide; and
driving means for moving said switching part to a first position at which said extraction plane is within an extraction range which allows an evanescent light to be extracted and a second position at which said extraction plane is out of said extraction range,
wherein said light guide, said switching part, and said driving means are disposed in this order in a direction in which light is output, and
wherein in an early, intermediate, or final stage of the moving process, said driving means tilts the orientation of the extraction plane of said switching part with respect to a first direction in which said extraction plane faces when said switching part is at said first position.

26. An optical switching device according to claim 25, wherein said driving means is capable of applying a driving force with a distribution asymmetric about the center of gravitation of said switching part upon said switching part.

27. An optical switching device according to claim 26, wherein the center of gravitation of said switching part is located at a point shifted from the geometric center of said switching part.

28. An optical switching device according to claim 26, wherein said driving means includes a supporting means for elastically supporting said switching part, said supporting means including a part which is asymmetric about the center of gravitation of said switching part in terms of the distribution of the elastic modulus.

29. An optical switching device according to claim 26, wherein said driving means includes a first electrode disposed on said switching part and a second electrode disposed at a location opposing said first electrode, and wherein said driving means includes a part which is asymmetric about the center of gravitation of said switching part in terms of the shape of said first electrode, the shape of said second electrode, or the distance between said first and second electrodes.

30. An optical switching device according to claim 26, wherein said driving means includes a first electrode disposed on said switching part and a second electrode disposed at a location opposing said first electrode, and wherein said first or second electrode is divided into a first part and a second part which are asymmetric in shape to each other about the center of gravitation of said switching part,
and further wherein said optical switching device further comprises a driving control means power supply capable of supplying electric power to said first and second parts of the first or second electrode such that the timing of supplying the electric power is different between said first and second parts or such that voltages supplied to said first and second parts are different from each other.

31. An optical switching device according to claim 25, wherein the extraction plane of said switching part is tilted with respect to said first direction at said second position.

32. An optical switching device according to claim 31, wherein said driving means includes a supporting means for elastically supporting said switching part, said supporting means including a part which is asymmetric about the center of gravitation of said switching part in terms of the distribution of the elastic modulus.

33. An optical switching device according to claim 31, wherein said driving means includes a first electrode disposed on said switching part and a second electrode disposed at a location opposing said first electrode, said driving means including a part which is asymmetric about the center of gravitation of said switching part in terms of the distance between said first and second electrodes.

34. An optical switching device according to claim 31, further comprising a supporting post that said switching part is in contact with at said second position, said supporting post including a part which is asymmetric about the center of gravitation of said switching part in terms of the distance between said supporting post and said switching part.

35. An image display device comprising a plurality of optical switching devices, each of said plurality of optical switching devices comprising:
a light guide including a total reflection plane capable of totally reflecting light thereby transmitting the light;
a switching part including a light-transmissive extraction plane capable of extracting evanescent light leaking through said total reflection plane and reflecting the extracted light toward said light guide; and
driving means for moving said switching part to a first position at which said extraction plane is within an extraction range which allows an evanescent light to be extracted and a second position at which said extraction plane is out of said extraction range,
wherein said light guide, said switching part, and said driving means are disposed in this order in a direction in which light is output, and
wherein said driving means includes:
a supporting member for elastically supporting said switching part; and
electrostatic driving means for driving said switching part by an electrostatic force acting between at least one pair of electrodes, and
wherein when no electrostatic force is generated by said electrostatic driving means, said supporting member is capable of pressing said switching part at said first position toward said light guide, and
wherein said plurality of optical switching devices are two-dimensionally arranged wherein said light guide is connected such that said light guide can transmit white light or three-color light.

36. A method of controlling an optical switching device, said optical switching device comprising: a light guide including a total reflection plane capable of totally reflecting input light thereby transmitting the light; at least one switching part being in contact at a first position with the total reflection plane of said light guide, said switching part serving to extract evanescent light leaking through the total reflection plane, said switching part being capable of moving to a second position apart from said first position; a supporting member for elastically supporting said switching part; and electrostatic driving means including at least one pair of electrodes for driving said switching part, said method including:
a control step for applying to said electrostatic driving means a driving voltage for driving said switching part and a fixed bias voltage which is equal in polarity to said driving voltage and which provides a holding force capable of stably holding said switching part at least at said first position by means of electrostatic force or elastic force, and
wherein said switching part is adapted to be moved by said supporting member from said second position to said first position and held at said first position by the elastic force of said supporting member, and wherein, in said control step, when said switching part is moved from said first position to said second position, said driving voltage is applied to said electrostatic driving means such that said driving voltage results in no equilibrium only in the range between said first and second positions.

37. A method of controlling the optical switching device, according to claim 36, wherein said optical switching device further comprises a stopper for assuring a minimum gap between said electrodes at one of said first and second positions at which the holding force is provided by said driving voltage, and wherein, in said control step, said bias voltage is selected such that the electrostatic force generated by said bias voltage when said switching part is at the stopper position is smaller than the elastic force of said supporting member.

38. A method of controlling the optical switching device, according to claim 36, wherein, in said control step, said bias voltage is periodically applied such that the electrostatic force generated by said bias voltage becomes smaller than the elastic force of said supporting member when said switching part is at said first or second position.

39. A method of controlling the optical switching device, according to claim 36, wherein said optical switching device further comprises a stopper for assuring a minimum gap between said electrodes at one of said first and second positions at which the holding force is provided by electrostatic force generated by said electrostatic driving means, and wherein, in said control step, said bias voltage is periodically applied such that the electrostatic force generated by said bias voltage becomes smaller than the elastic force of said supporting member when said switching part is at said stopper position.

40. A method of controlling the optical switching device, according to claim 36, wherein said supporting member supports said switching part at a substantially central position between said first and second positions when no electrostatic force is exerted on said switching part, and said electrostatic driving means includes a first pair of electrodes for holding said switching part at said first position and a second pair of electrodes for holding said switching part at said second position, and wherein, in said control step, said driving voltage is alternately applied to said first and second pairs of electrodes.

* * * * *